US010747837B2

(12) United States Patent
Goldenstein et al.

(10) Patent No.: US 10,747,837 B2
(45) Date of Patent: Aug. 18, 2020

(54) CONTAINING DISINFORMATION SPREAD USING CUSTOMIZABLE INTELLIGENCE CHANNELS

(71) Applicant: CREOpoint, Inc., San Francisco, CA (US)

(72) Inventors: Jean-Claude Goldenstein, San Francisco, CA (US); James E. Searing, New Hope, PA (US); Edward J. Finn, Cliffside Park, NJ (US)

(73) Assignee: CREOPOINT, INC., Cliffside Park, NJ (US)

( * ) Notice: Subject to any disclaimer, the term of this patent is extended or adjusted under 35 U.S.C. 154(b) by 0 days.

(21) Appl. No.: 16/268,329

(22) Filed: Feb. 5, 2019

(65) Prior Publication Data
US 2019/0179861 A1    Jun. 13, 2019

Related U.S. Application Data

(63) Continuation-in-part of application No. 15/642,890, filed on Jul. 6, 2017, now Pat. No. 10,223,465, which
(Continued)

(51) Int. Cl.
*G06F 16/9535* (2019.01)
*G06F 16/2457* (2019.01)
(Continued)

(52) U.S. Cl.
CPC ........ *G06F 16/9535* (2019.01); *G06F 16/248* (2019.01); *G06F 16/24575* (2019.01); *G06F 16/367* (2019.01)

(58) Field of Classification Search
CPC ............... G06F 16/9535; G06F 16/951; G06F 17/2785; G06F 16/24578; G06F 16/7844;
(Continued)

(56) References Cited

U.S. PATENT DOCUMENTS

| 7,162,473 B2 | 1/2007 | Dumais et al. |
| 7,577,655 B2 | 8/2009 | Curtiss et al. |

(Continued)

FOREIGN PATENT DOCUMENTS

| CN | 103136330 B | 9/2015 |
| EP | 2973066 A1 | 1/2016 |

(Continued)

OTHER PUBLICATIONS

"U.S. Appl. No. 14/772,598, Examiner Interview Summary dated May 21, 2018", 3 pgs.
(Continued)

*Primary Examiner* — Shyue Jiunn Hwa
(74) *Attorney, Agent, or Firm* — Schwegman Lundberg & Woessner, P.A.

(57) ABSTRACT

Techniques are provided for rating the veracity of content distributed via digital communications sources by creating an ontology and selecting keywords for a topic of the content, creating a customizable intelligence channel for the topic, and extracting from the customizable intelligence channel a first list of potential experts on the topic sorted by at least relevance and influence. The list of experts may be supplemented by mining trusted media sources to extract a second list of potential experts or witnesses on the topic. The first and second lists of potential experts are evaluated as a function of at least one of professionalism, reliability, proximity, experience, responsiveness, and lack of self-interest in the topic to identify a short list of experts. The content is provided to the short list of experts, who are polled about the veracity of the content to create a veracity score for delivery with the content.

11 Claims, 23 Drawing Sheets

Related U.S. Application Data is a continuation of application No. 14/772,598, filed as application No. PCT/US2014/023384 on Mar. 11, 2014, now abandoned.

(60) Provisional application No. 61/776,587, filed on Mar. 11, 2013.

(51) Int. Cl.
*G06F 16/248* (2019.01)
*G06F 16/36* (2019.01)

(58) Field of Classification Search
CPC ...... G06F 16/285; G06F 16/353; G06F 16/95; G06F 16/24; G06F 16/355; G06F 16/20; G06F 16/29; G06F 16/3346; G06F 16/35; G06F 16/367; G06F 16/735; G06F 16/78; G06F 16/954; G06F 40/40; G06F 16/38; G06F 40/253; G06F 40/30; G06F 16/40; G06F 21/64; G06F 2221/2115; G06F 40/10; G06F 40/20
See application file for complete search history.

(56) References Cited

U.S. PATENT DOCUMENTS

| | | | |
|---|---|---|---|
| 7,669,123 | B2 | 2/2010 | Zuckerberg et al. |
| 7,856,445 | B2 | 12/2010 | Gross |
| 8,126,882 | B2 | 2/2012 | Lawyer |
| 8,166,026 | B1 | 4/2012 | Sadler |
| 8,185,448 | B1 | 5/2012 | Myslinski |
| 8,516,100 | B1 | 8/2013 | Oliver |
| 8,688,701 | B2 | 4/2014 | Ghosh et al. |
| 8,862,492 | B1 | 10/2014 | Kulshreshtha et al. |
| 9,195,996 | B1* | 11/2015 | Walsh ............... H04L 51/32 |
| 9,280,597 | B2 | 3/2016 | Ghosh et al. |
| 9,342,851 | B2 | 5/2016 | Musil |
| 9,454,562 | B2 | 9/2016 | Myslinski |
| 9,672,555 | B1 | 6/2017 | Dillard et al. |
| 9,721,288 | B2 | 8/2017 | Abou Mahmoud et al. |
| 10,033,537 | B2 | 7/2018 | Heppe et al. |
| 10,068,258 | B2 | 9/2018 | Kendall et al. |
| 2002/0103789 | A1 | 8/2002 | Turnbull et al. |
| 2004/0122846 | A1 | 6/2004 | Chess et al. |
| 2004/0267700 | A1 | 12/2004 | Dumais et al. |
| 2007/0192300 | A1 | 8/2007 | Reuther et al. |
| 2009/0157667 | A1 | 6/2009 | Brougher et al. |
| 2010/0100537 | A1 | 4/2010 | Druzgalski et al. |
| 2010/0205541 | A1* | 8/2010 | Rapaport ............ G06Q 10/10 715/753 |
| 2010/0275128 | A1 | 10/2010 | Ward et al. |
| 2011/0173214 | A1 | 7/2011 | Karim |
| 2011/0212430 | A1* | 9/2011 | Smithmier ............ G09B 5/06 434/322 |
| 2012/0254333 | A1* | 10/2012 | Chandramouli ........ G06F 40/40 709/206 |
| 2012/0317593 | A1 | 12/2012 | Myslinski |
| 2013/0117677 | A1* | 5/2013 | St. Jacques, Jr. ......... G06F 3/00 715/738 |
| 2013/0218596 | A1 | 8/2013 | Gome et al. |
| 2015/0169770 | A1 | 6/2015 | Brandstetter |
| 2016/0019301 | A1 | 1/2016 | Goldenstein et al. |
| 2016/0239496 | A1 | 8/2016 | Motte et al. |
| 2016/0321260 | A1 | 11/2016 | Owens et al. |
| 2016/0328453 | A1 | 11/2016 | Galuten |
| 2016/0350675 | A1 | 12/2016 | Laks et al. |
| 2017/0139920 | A1 | 5/2017 | Ball et al. |
| 2017/0177717 | A1 | 6/2017 | Raniere |
| 2017/0308614 | A1 | 10/2017 | Goldenstein et al. |
| 2018/0239832 | A1 | 8/2018 | Galuten |
| 2018/0365562 | A1 | 12/2018 | Volkova |
| 2019/0066230 | A1 | 2/2019 | Dange |
| 2019/0147062 | A1 | 5/2019 | Kim et al. |
| 2019/0164173 | A1 | 5/2019 | Liu et al. |
| 2019/0391972 | A1 | 12/2019 | Bates et al. |

FOREIGN PATENT DOCUMENTS

| | | |
|---|---|---|
| GB | 2572230 A | 9/2019 |
| GB | 2572324 A | 10/2019 |
| KR | 10201610416 A | 1/2016 |
| WO | WO-2014164746 A1 | 10/2014 |
| WO | WO-2019229519 A1 | 12/2019 |
| WO | WO-2019236470 A1 | 12/2019 |

OTHER PUBLICATIONS

"U.S. Appl. No. 14/772,598, Final Office Action dated Feb. 28, 2018", 21 pgs.
"U.S. Appl. No. 14/772,598, Non Final Office Action dated Aug. 10, 2017", 21 pgs.
"U.S. Appl. No. 14/772,598, Preliminary Amendment filed Sep. 3, 2015", 3 pgs.
"U.S. Appl. No. 14/772,598, Response filed Jan. 10, 2018 to Non Final Office Action dated Aug. 1, 2017", 18 pgs.
"U.S. Appl. No. 15/642,890, Examiner Interview Summary dated May 21, 2018", 3 pgs.
"U.S. Appl. No. 15/642,890, Examiner Interview Summary dated Dec. 13, 2017", 3 pgs.
"U.S. Appl. No. 15/642,890, Final Office Action dated Mar. 7, 2018", 33 pgs.
"U.S. Appl. No. 15/642,890, Non Final Office Action dated Sep. 11, 2017", 41 pgs.
"U.S. Appl. No. 15/642,890, Notice of Allowance dated Oct. 9, 2018", 22 pgs.
"U.S. Appl. No. 15/642,890, Preliminary Amendment filed Jul. 6, 2017", 15 pgs.
"U.S. Appl. No. 15/642,890, Response filed Dec. 11, 2017 to Non Final Office Action dated Sep. 11, 2017", 27 pgs.
"European Application Serial No. 14779027.3, Communication pursuant to Article 94(3) EPC dated Jan. 5, 2018", 8 pgs.
"European Application Serial No. 14779027.3, Extended European Search Report dated Oct. 20, 2016", 8 pgs.
"European Application Serial No. 14779027.3, Response filed May 5, 2016 to Communication Pursuant to Rules 161(2) and 162 EPC dated Nov. 6, 2015", 9 pgs.
"European Application Serial No. 14779027.3, Response filed May 12, 2017 to Extended European Search Report dated Oct. 20, 2016", 15 pgs.
"International Application Serrial No. PCT/US2014/023384, International Preliminary Report on Patentability dated Sep. 24, 2015", 9 pgs.
"International Application Serial No. PCT/US2014/023384, International Search Report dated Jul. 1, 2014", 2 pgs.
"International Application Serial No. PCT/US2014/023384, Written Opinion dated Jul. 1, 2014",7 pgs.
"Korean Application Serial No. 10-2015-7028749, Office Action dated Oct. 20, 2015", with English translation, 2 pgs.
"Korean Application Serial No. 10-2015-7028749, Response filed Dec. 21, 2015 to Office Action dated Oct. 20, 2015", with English translation of claims.
"International Application Serial No. PCT/US2020/016855, International Search Report dated May 18, 2020", 2 pgs.
"International Application Serial No. PCT/US2020/016855, Written Opinion dated May 18, 2020", 5 pgs.

* cited by examiner

FAKE OR FACT? CREOBOARD (FOR ILLUSTRATION ONLY)

GROWING SUSPICIOUS OF ONLINE "NEWS"? SO WERE WE! CREOPOINT DYNAMIC TRUST SCORE PROVIDES AN INNOVATIVE WAY OF ASSESSING THE VERACITY OF NEWS. WOULDN'T YOU WANT TO QUICKLY FIND OUT WHAT INDEPENDENT SUBJECT MATTER EXPERTS ARE SAYING ABOUT THE PROBABILITY THIS IS FAKE OR FACT?

*"ROBOT WAS KILLED BY A SELF-DRIVING TESLA CAR" - CES JANUARY 6, 2019*

WARNING: 86% PROBABILITY THIS IS FAKE
PER CREOPOINTS EXPERTS

HOME | U.K. | NEWS | SPORTS | U.S. SHOWBIZ | AUSTRALIA | FEMAIL | HEALTH | SCIENCE | DAILYMAILTV

VIDEO HOME | GAMES

MOST RECENT

PROMOBOT ROBOT IS KILLED BY A SELF-DRIVING TESLA IN CAR ACCIDENT

VIDEO: PROMOBOT ROBOT IS KILLED BY A SELF-DRIVING TESLA IN CAR ACCIDENT

A SELF-DRIVING TESLA MODEL S DRIVES BY AND DESTROYS A PROMOBOT V4 MODEL IN A CAR ACCIDENT IN LAS VEGAS, NEVADA. THE ROBOT WAS BEING PREPARED FOR THE COMPANY'S BOOTH AT CES-2019

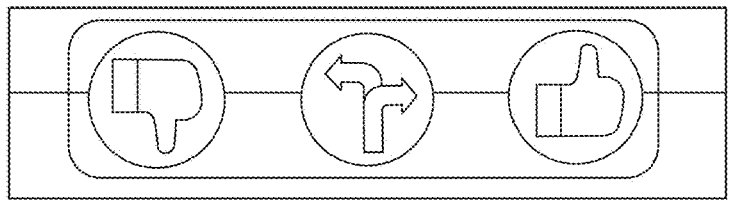

WITH ONE OF THE COLORS LIT
BASED ON VERACITY SCORE IN THIS CASE RED
FOLLOWED BY SELECTED HEADLINES WITH LINKS DEBUNKING THE CLAIM, E.G.
HTTPS://WWW.WIRED.COM/STORY/TESLA-PROMOBOT-PAVE-SELF-DRIVING-EDUCATION
QUOTE FROM LCI TV REPORTER
WARNING ABOUT THE CREDIBILITY OF THE INITIAL SOURCE

FIG. 16

CONTAINING DISINFORMATION SPREAD USING CUSTOMIZABLE INTELLIGENCE CHANNELS

CROSS-REFERENCE TO RELATED APPLICATIONS

This application is a continuation-in-part of U.S. patent application Ser. No. 15/642,890, filed Jul. 6, 2017, which is a continuation application of U.S. patent application Ser. No. 14/772,598 filed Sep. 3, 2015, which is the National Stage of International Application No. PCT/US2014/023384 filed Mar. 11, 2014, which claims the benefit of and priority to U.S. Provisional Application No. 61/776,587 filed Mar. 11, 2013, the entireties of which applications are incorporated herein by reference for any and all purposes.

COPYRIGHT NOTICE AND PERMISSION

A portion of the disclosure of this document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The technical field generally relates to searching for and providing information, and more specifically relates to customizable provision of information and containing the spread of disinformation.

BACKGROUND

100+ social networks offer billions of people a growing ability to consume and produce news. Unfortunately, intentionally and verifiably false information (referred herein as "fake news") misleads readers, and these falsehoods that spread through social media "take root quickly and die hard." A person skilled in the art would appreciate the different types of fake news including disinformation, misinformation, fabricated hoaxes, satire, B.S. news, etc. Thought different in meaning, these terms are generally referred to herein as "fake news" for ease of description. This purported "news" impacts public confidence, public health and well-being, personal and organizational reputations, the markets and democracy.

Each day for example Facebook and Twitter publish hundreds of millions of new story link updates and tweets, including too many lies to imagine. If a lie in a story is picked up without critical context by multiple clickbait sites, dozens of other blogs, cross-posted over thousands of social media accounts and read by hundreds of thousands, then it becomes fake news. It does not help that algorithms sometimes favor sensational content over substance.

Fighting fake news is a race against time, similar to stopping a fire in its tracks before it spreads as wildfire and causes irreversible damage. Social networks and society are increasingly challenged by the difficulty of rapid detection and diffusion of disinformation, despite investments in machine learning, information literacy, third-party flagging, fact-checking programs, and news feed updates.

Fact checking is an intellectually demanding process that often requires hours and sometimes days to complete. In the case of disinformation impacting a company, the public relations firm Edelman reports "it takes an average of 21 hours before companies are able to issue meaningful external communications to defend themselves." Layers of organizational approvals lead to turnaround times too slow to work and the optimal prevention window is often missed. During that time, more damage is done in early reposts by many users, creating periods of confusion and uncertainty.

In addition, some extremists and hostile foreign governments are applying social engineering concepts to manipulate social media platform algorithms to further their agenda, potentially endangering brand perceptions reputations of long established companies, products, as well as the personal brand image of any person in the public eye.

Disinformation is not new. In the 1990s, Russian agents planted a story that the US had created the AIDS virus in a lab. However, "Falsehood flies, and the truth comes limping after it" is more relevant now than ever before. Rumors spread much faster due to the effect of social media operating as an echo chamber as more people became active communicators rather than passive receivers. The problem is compounded by the "4 Vs of news": growing Volume (from a few newspapers to billions of sources), Variety (e.g., Tweet, Instagram post, WhatsApp message, deepfake, etc.), and Virality (images, videos, or links that spread rapidly through a population by being frequently shared with a number of individuals)—decreasing their Veracity.

A 2018 Gallup/Knight Foundation survey about perceived accuracy and bias in the news media shows that Americans believe that 64% of the news and information they see on social media is inaccurate. Edelman's 2019 Trust Barometer reported that 73% of the people surveyed are worried that fake news is being used as a weapon.

Fake news proliferation is an adversarial attack on our information ecosystem and a new breed of cybersecurity threat. It is partly a function of information overload and the failure to have sufficient filtering tools. To date, techniques to conveniently address information overload have been found to be impractical. Also, previous attempts at filtering at scale and other approaches have fallen short. The frustrations are often centered on solutions that are "too little, too late," similar to trying to clean up the internet by building a firewall or attempting to purify the entire Ganges river when pervasive pollution, or vitriol, is in the air and the public's cognitive infrastructure is under siege.

Improved filtering techniques and alternative methods are needed to promptly contain the threats and help slow or halt the spread of potentially damaging fake news in a high-stakes information war. These efforts remain a critical and urgent need in the art.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

A system is described herein for creating "customizable real time intelligence channels" that enables time starved people to more conveniently get to the point about their topics, brands and personalities of interest. This is generally accomplished by filtering traditional and social media to:

Remove duplicates ("old news" identified with Natural Language Processing are not displayed, which will help decrease social reinforcement and contagiousness—therefore popping the "filter bubble");

Identify traditional and social media sources with the highest relevance and influence; and Allow users to delete some news content or even ban bad or fake news sources.

To contain the spread of fake news, in sample embodiments described herein, these unique capabilities are expanded by adding a hybrid human expert network augmented by AI. A practical method to reduce this potentially harmful content enables a networked platform of relevant active experts (rather the current "wisdom" of the crowds, one of the causes of the infocalypse).

Recent MIT Sloan research indicates lay people lazily judge around 40% of legitimate news stories as false and 20% of fabricated news stories as true (Academy of Sciences—David Rand, January 2019 "Fighting misinformation on social media using crowdsourced judgments of news source quality"). The CREOpoint system enables the preparation and creation of a visible and shareable measuring stick, namely, the probability that news content (e.g., a breaking news story, deepfake video, doctored photo, viral WhatsApp message, or forged document) is fake. A CREOpoint Veracity Score (called CREOScore) is assigned to the evaluated news content. For example, a minimum CREOScore means the panel of experts is completely convinced that the news content is a fake. The Veracity Score can be transposed to develop a "Fake News Warning." For example, a CREOpoint Veracity Score of 14 out of 100 would correspond to a high 86 (100−14) fake news indicator, and a red warning would be automatically enabled.

Fighting fake news is a race against time with similarities to the more established and regulated fields of pandemics, wildfire and aircraft structure crack propagation. Sharing the CREOWarning early and intervening before the news content has spread past a tipping point (similar to fire extinguishers quickly used by professional firefighters to stop a damaging wildfire) helps:

Combat fake news with the AI indicators of unreliability and the consensus of crowdsourced experts;

Provide confidence to society about the level of veracity of news content;

Quickly share warnings to enable the public to make more informed decisions before disinformation has gone viral;

Raise some doubt to encourage readers to pause, be skeptical, and use more critical thinking; and Decrease the consequences of fake news on elections, democracy, public confidence, organizational and personal reputations, public health and well-being, and product or equity markets.

Sample embodiments described herein are further directed to a computer-implemented method of rating the veracity of content distributed via digital communications sources. The methods include the steps of creating an ontology and selecting keywords for at least one topic of the content and creating a customizable intelligence channel for the at least one topic of the content. A first list of potential experts on the at least one topic of the content is extracted from the customizable intelligence channel and sorted by at least relevance and influence. Trusted media sources are also mined for the at least one topic of the content to extract a second list of potential experts on the at least one topic of the content. The first and second lists of potential experts on the at least one topic of the content are provided to a database, and the potential experts are rated and ranked as a function of at least one of professionalism, reliability, proximity, experience, responsiveness, and lack of self-interest in the at least one topic of the content to identify a short list of experts. The content is provided to the short list of experts for evaluation, and the short list of experts are polled about the veracity of the content to create a veracity score. The veracity score is then delivered with the content.

In sample embodiments, the method further includes creating a third list of potential experts and any local witnesses on the at least one topic of the content based on at least one of a relationship and a proximity of the potential experts to a breaking story on the at least one topic of the content and providing the third list of potential experts to the database to complement the polling. The polling of the short list of experts about the veracity of the content to create a veracity score may occur in near real-time.

In other sample embodiments, delivering the veracity score with the content comprises at least one of issuing a pre-populated press release, initiating a social media and press campaign including the veracity score and at least one of a warning and denial if the content is not completely true, issuing a quote from an expert from the short list of experts, issuing a quote from a local witness to the at least one topic of the content, and issuing a quote from an influencer on the at least one topic of the content and related reassuring metrics including information about trustworthiness of sources of the content. A fake news warning also may be presented with the veracity score and content along with insights and metrics relating to the content. In the sample embodiments, the veracity score, content, fake news warning, insights and metrics relating to the content are delivered via an interactive interface enabling a user to select the types of sources by level of trust or proximity to the news content or user.

In other sample embodiments, providing the first and second list of potential experts on the at least one topic of the content to a database includes predetermining a list of experts who could best crowdsource veracity signals for a given topic of content. Also, mining trusted media sources for the at least one topic of the content to extract a second list of potential experts on the at least one topic of the content may be performed upon the release of a new story.

In still other sample embodiments, the methods include incentivizing experts to be active in near real-time when consulted by compensating experts based on how accurate their predictions are and creating a decentralized register including expert trust ratings.

In yet other sample embodiments, the methods include creating at least one customizable intelligence channel for at least one topic of the content relating to potential sources of fake news and the semantics of fake news content.

In yet other sample embodiments, a decision matrix is created to evaluate a breaking news story to decide whether the news story is a candidate for determining a veracity rating based on at least one of the nature of the breaking news story, a source of the news story, and whether a relevant population of experts readily exists.

In yet other sample embodiments, the methods include modifying the veracity score to reflect the behavior of additional experts and trusted sources in sharing and commenting upon a breaking new story.

In yet other sample embodiments, the methods further include benchmarking the veracity scores to create a predictive fake news spread containment model and iterating to revise the model and overall performance of the model over time.

Any one of the foregoing examples may be combined with any one or more of the other foregoing examples to create a new embodiment within the scope of the present disclosure.

BRIEF DESCRIPTION OF THE DRAWINGS

Aspects of a customizable, real time, intelligence channel are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms and should not be construed as limited to the example embodiments set forth herein. Like numbers refer to like elements throughout.

FIG. 16 illustrates a sample CREOBoard presentation of an evaluated news feed.

DETAILED DESCRIPTION

Figure 1:
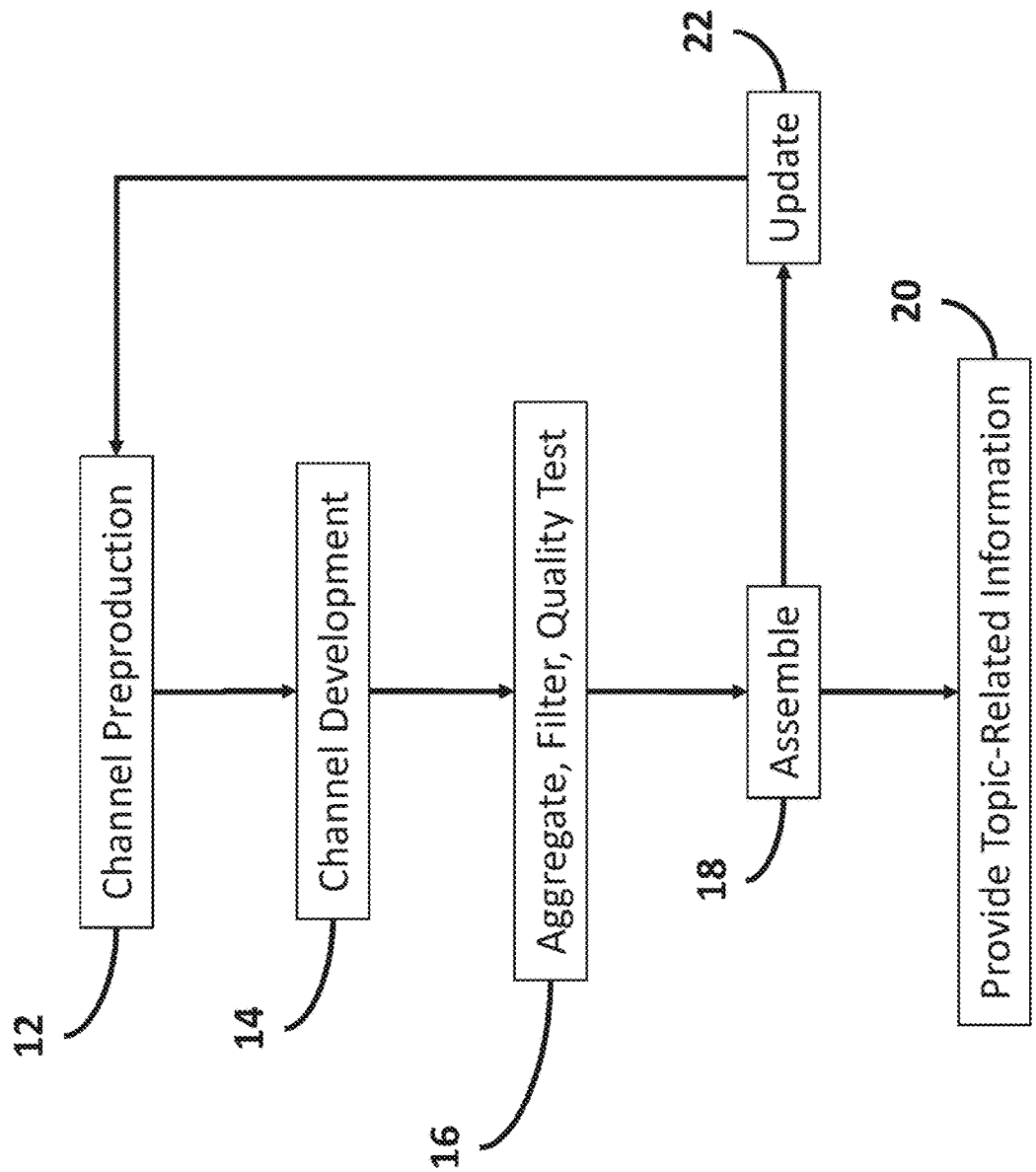
FIG. 1 is flow diagram of an example process for generating a customizable, real time, intelligence channel and providing information via the intelligence channel.

It should be understood at the outset that although an illustrative implementation of one or more embodiments are provided below, the disclosed systems and/or methods described with respect to FIGS. 1-18 may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the following description, reference is made to the accompanying drawings that form a part hereof, and in which is shown by way of illustration specific embodiments which may be practiced. These embodiments are described in sufficient detail to enable those skilled in the art to practice the systems and methods described herein, and it is to be understood that other embodiments may be utilized, and that structural, logical and electrical changes may be made without departing from the scope of the present disclosure. The following description of example embodiments is, therefore, not to be taken in a limited sense, and the scope of the present disclosure is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Customizable, Real-Time Intelligence Channel

A customizable, real time intelligence channel as described herein may enable a user to keep apprised of, and/or deliver to others, selected topics by identifying and delivering relevant information culled from, for example, greater than hundreds of thousands of relevant sources while filtering out irrelevant and/or redundant information. In an example embodiment, an intelligence channel may provide the ability to identify, isolate, and access the most reliable, relevant sources for a topic, and deliver a stream of targeted, focused information pertaining to the topic. A topic may comprise any appropriate topic, and is not limited to any genre, category, or the like.

As described herein, an intelligence channel may be generated for a topic. The topic may be selected from predetermined topics, a topic may be selected from topic already available online, a topic may be provided by a user, a topic may be provided by a user and defined and developed through an iterative process that defines search terms, keywords, includes and excludes, language recognition capability and predefined filters, a topic may be a specific topic, a topic may be a specific topic for a specific user, or the like, or any appropriate combination thereof. Topics may be determined in any appropriate manner. For example, predictive data mining based on a user's email address, social graph, prior history of search or use of an intelligence channel, or the like, may be utilized to identify likely appropriate areas of interest and channels for the user.

In an example embodiment, predictive data mining may be utilized by identifying a user's home location, and accessing publicly available information to determine, for example, the income and interests of persons located in that area to predict interests of the user and recommend an intelligence channel. Predictive data mining also may rely, in whole or part, on prior use characteristics of the user or others related to the user by location, social media, or otherwise, to predict interests of the user and recommend an intelligence channel. Predictive data mining may be facilitated by the structure of a database, and the use of open source tools for the database, such as, for example, an open source non-SQL document database for big data analysis.

Sources of topic-related information may be determined in any appropriate manner. For example, a source of topic-related information may comprise any appropriate source, such as, an online source accessible via a Uniform Resource Locator (URL), social media, TWITTER, YOUTUBE, GOOGLE, FACEBOOK, YAHOO, BING, WIKIPEDIA, LINKEDIN, FLICKR, INSTAGRAM, PINTEREST, a photograph, an image, a publication, a forum, a blog, a forum, a video, a periodical, a research facility, an academic site, an industry specific site, a web site, a university, a feed, an RSS feed, or the like, or any appropriate combination thereof. A source(s) may be reviewed and the respective intelligence channel accordingly may be updated, or curated, based on, for example, crowdsourcing data, research by the subject matter experts, input from the user, or the like, or any appropriate combination thereof. A source(s) may be reviewed periodically, aperiodically, responsive to a request, responsive to an occurrence of an event, continuously, or the like, or any appropriate combination thereof.

Sources may be searched for topic-related information. Search results may be analyzed for redundant, irrelevant, immaterial, or the like, information. For example, search results may be analyzed for profanity, duplicate headlines, duplicate content, time wasters such as tweets dealing with social comments rather than topic-related items of interest, posts that are not in the user's language, posts that are not in a designated language or languages. dead hyperlinks to useless headlines, or the like, or any appropriate combination thereof. Analyzed search results may be filtered. Analyzed search results may be filtered to remove information from a source, remove a source, edit information from a source, or the like, or any appropriate combination thereof. In an example embodiment, sources and/or the level of filtering may be controlled by a user in real time, while topic-related information is being provided to the user. And filtered information may be refreshed and provided by the intelligence channel instantly, on demand. In an example embodiment, filtering may comprise a flexible noise-canceling algorithm(s) which may be updated to limit future sources of noise based on, for example, an analysis of usage and crowd sourced comments and input. Filtering also may be based on crowd-sourced determinations of authority and reliability of sources or items, based on user statistics and preferences.

FIG. 1 is flow diagram of an example process for generating a customizable, real time, intelligence channel and providing information via the intelligence channel. The example process depicted in FIG. 1, and as described in detail herein, may comprise any appropriate combination and/or sequence of channel preproduction (step 12), channel development (step 14), aggregating, filtering, and quality testing (step 16), assembling information for delivery (step 18), providing topic-related information (step 20), and updating contents of the intelligence channel (step 22).

Figure 2:
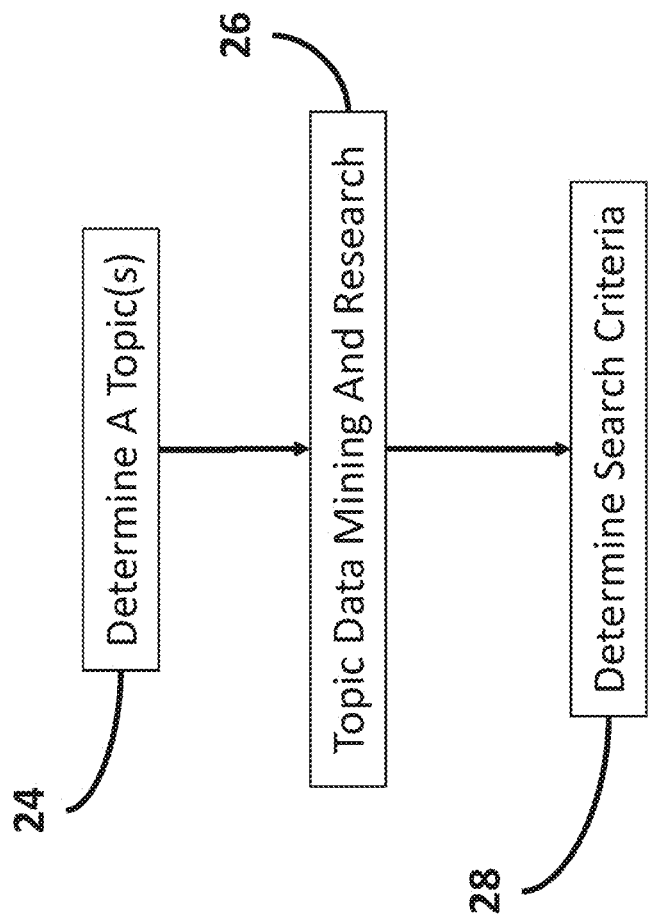
FIG. 2 is a flow diagram of an example process for intelligence channel preproduction.

FIG. 1 is described herein with reference to additional figures providing detail associated with each step depicted in FIG. 1. To that goal, as described above with reference to FIG. 1, channel preproduction may be performed at step 12. And FIG. 2 is a flow diagram of an example process for channel preproduction comprising any appropriate combination and sequence of determining a topic at step 24, topic data mining and research at step 26, and determining search criteria at step 28. A topic, or topics, may be determined at step 24. A topic may be selected from predetermined topics, a topic may be determined by a user, a topic may be a specific topic, a topic may be a specific topic for a specific user, or the like, or any appropriate combination thereof. Topics may be determined in any appropriate manner. A topic may comprise, for example, a company, an industry, a person, a group of persons, an asset, real property, intellectual property, a stock, a subject, a political entity, a city, a state, a country, a fashion trend, an activity, an event, an idea, an invention, a work, or the like, or any appropriate combination thereof. It is to be understood that there is no limitation on the type of a topic. In an example embodiment, a topic may use Boolean search expressions combining multiple topics; including some aspect(s) of a topic while excluding others. A Boolean topic search logic may link of ten or more Boolean terms, despite limitations on the number of search terms imposed by some search engines. It is to be understood however, that there is no limit on the number of terms included in a topic search.

Topic data mining and research may be performed at step 26. Any appropriate information may be analyzed to determine and/or suggest a topic to the user. For example, a user's assets, email, social media accounts, search engines, GOOGLE, BING, LINKEDIN, WIKIPEDIA, user profile information, a web site, a company web site, a government web site, an employer's web site, or the like, or any appropriate combination thereof, may be utilized to determine a topic. Predictive data mining may be utilized to identify likely appropriate areas of interest and channels for the user. In an example embodiment, predictive data mining based on a user's email address may be utilized to identify likely appropriate areas of interest and channels for the user. An email domain may be analyzed to identify an association, from which interest(s) may be determined. For example, it may be determined and/or inferred that a user with an @aol.com extension has had the email account for a long time but has not kept up with the times. As another example, it may be determined and/or inferred that a name like johndoe@gmail.com indicates an early adopter, or person@bakerlaw.com would likely have an interest in legal-related information, or one withan@woodcock.com extension would have a particular interest in IP law. It may be determined and/or inferred that a user with an xxx.fr email address may prefer information in the French language.

Search criteria may be generated, at step 28, to facilitate a determination of potential topic-related sources. Search criteria may be inclusive or exclusive. Inclusive search criteria may be utilized to search for information containing the inclusive search criteria. Exclusive search criteria may be utilized to exclude information containing the exclusive search criteria. Search criteria may comprise, for example, inclusive keywords, exclusive keywords, inclusive search terms, exclusive search terms, inclusive search phrases, exclusive search phrases, inclusive queries, exclusive queries, information indicative of a false positive search result, redundant information, or the like, or any appropriate combination thereof. Search criteria may be combined using Boolean operators to query many sources with differing application programming interfaces (API's) and semantic requirements. The API's, versions, and semantic structure requirements associated with any source may be determined for each source from, for example, a database library.

Figure 3:
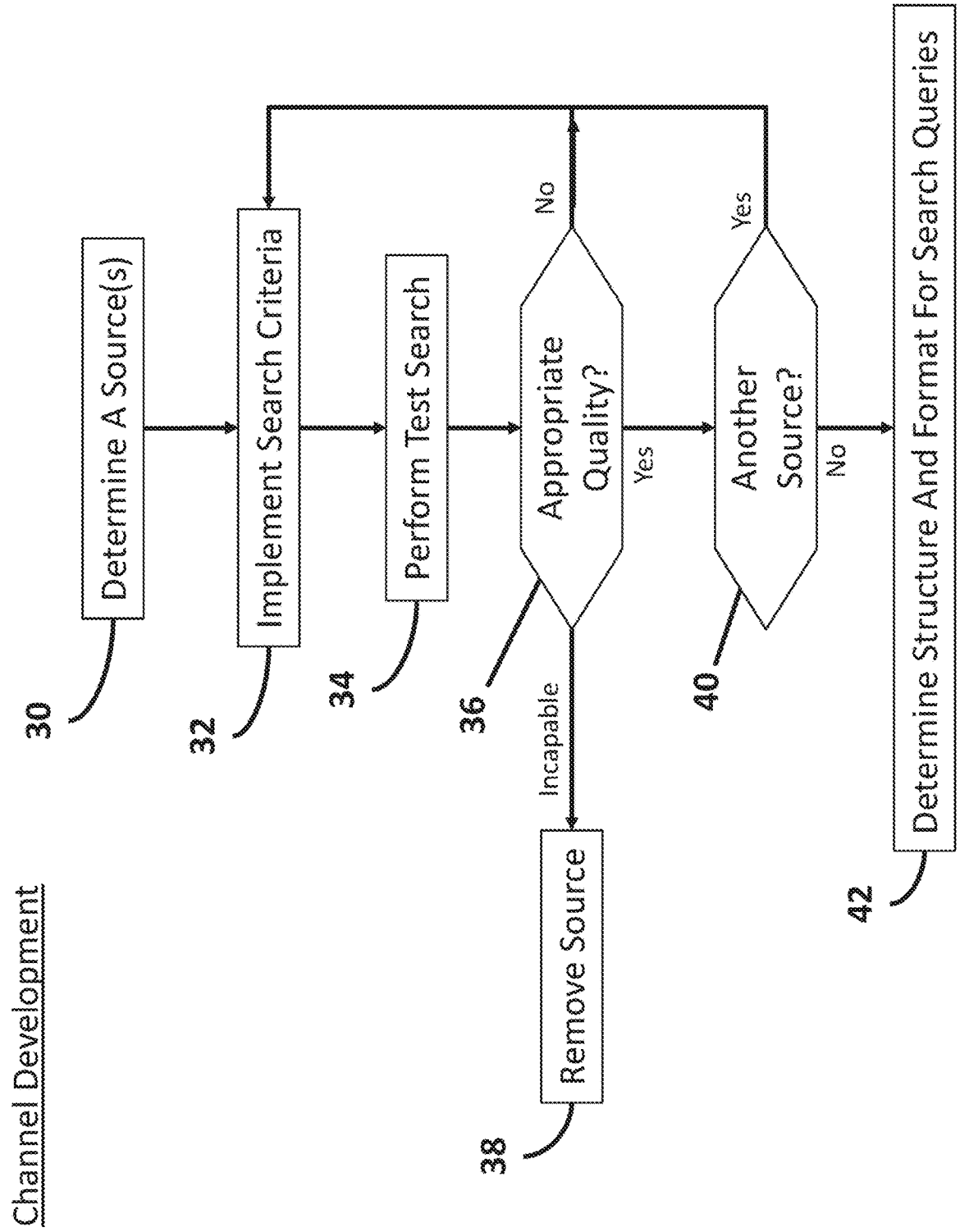
FIG. 3 is a flow diagram of an example process for intelligence channel development.

As described above, with reference to FIG. 1, channel development may be performed at step 14. And FIG. 3 is a flow diagram of an example process for channel development comprising any appropriate combination and sequence of determining a source, or sources at step 30, implementing search criteria at step 32, performing a test search or searches at step 34, determining a quality of results at step 36, removing a source from potential sources at step 38, determining if other sources exist at step 40, and determining a structure and format for search queries at step 42.

A source, or sources, of topic-related information may be determined at step 30. A source of topic-related information may comprise any appropriate source, such as, for example, social media, TWITTER, YOUTUBE, GOOGLE, FACEBOOK, YAHOO, BING, WIKIPEDIA, LINKEDIN, FLICKER, INSTAGRAM, PINTEREST, a photograph, an image, a publication, a forum, a blog, a forum, a video, a periodical, a research facility, an academic site, an industry specific site, a web site, a university, a library, audio, radio, television, a feed, and RSS feed, or the like, or any appropriate combination thereof. A source may include any data accessible in digital form through a URL and may include non-textual data such as that developed by sensors in buildings, homes, vehicles, appliances, and other monitoring devices and available digitally through a URL. Topic-related information may be selected and curated from all available sources. A source may be reviewed and, as described in more detail herein, the respective intelligence channel may be updated based on, for example, crowdsourcing data, research by the subject matter experts, input from a user, or the like, or any appropriate combination thereof.

In an example embodiment, an API for each source is determined. An API for a source may be unique for a respective source. That is, a source may have associated therewith a unique API, or any appropriate version thereof. A description of each API for each source may be stored, for example, in a database. Source may include individual websites, and accordingly, a database may be established to store API variations, even when websites may appear to use a common API.

Search criteria may be implemented, at step 32, to facilitate determination of a source, or sources, of topic-related information from potential sources. In an example embodiment, search criteria determined at step 28 may be implemented at step 32. Search criteria may be implemented on each prospective source. Search criteria may be implemented utilizing an appropriate semantic protocol, which may include appropriate Boolean terms and operators, required by a respective source. In an example embodiment, search criteria may be implemented utilizing an appropriate semantic structure and the digital format required by a respective source.

A test search, or searches, to assess the quality of information from a prospective source may be performed at step 34. Search results may be used in an iterative process in which search criteria that control the search may be altered until the prospective source produces the appropriate quality results. If a prospective source does not produce appropriate quality results, the prospective source may not be selected as a source of topic-related information for the intelligence channel. It may be determined, at step 36, if the quality of information from a prospective source is appropriate. If it is determined, at step 36, that the quality of the information from a prospective source is not appropriate, the process may proceed to step 32 to refine search criteria, and to implement refined search criteria, and proceed therefrom as described herein. If, after an appropriate attempt to refine search criteria and to adjust the quality of the information from a prospective source, it is not possible to improve the quality to an acceptable level, the prospective source may be remove from a list of prospective sources (e.g., no longer considered).

Quality initially may be determined during the channel development process to relate to the relevance of the returned items from a source to the topic. Keywords, include and exclude criteria as well as sources included or excluded may be adjusted to improve quality of an intelligence channel. Intelligence channel quality may be determined by crowdsourced information developed through the actions of intelligence channel users in visiting, deleting, or curating the source from the intelligence channel. As each user may rate an item, or delete an item from the user's intelligence channel, aggregate actions by users may be used to determine the quality of a source or particular item to the intelligence channel, as a source frequently visited may be deemed to be of high quality and one frequently curated out of the intelligence channel by users may be deemed to be of low quality. The quality determination within an intelligence channel may be applied in other intelligence channels, or not, as appropriate.

If it is determined, at step 36, that the quality of information from a prospective source is appropriate, it may be determined, at step 40, if another prospective source is to be tested. If it is determined, at step 38, that another prospective source is to be tested, the process may proceed to step 32 and proceed therefrom as described herein. If it is determined, at step 40, that there is not another source to be tested, a series of semantic protocol/digital format combinations for search queries for each source (selected from prospective sources) for a given channel topic may be determined at step 42. The semantic structure and digital format of each search query may be saved for future use. The final semantic structures and digital formats may be available for fusion with other intelligence channels in the development of new and/or additional intelligence channels.

Figure 4:
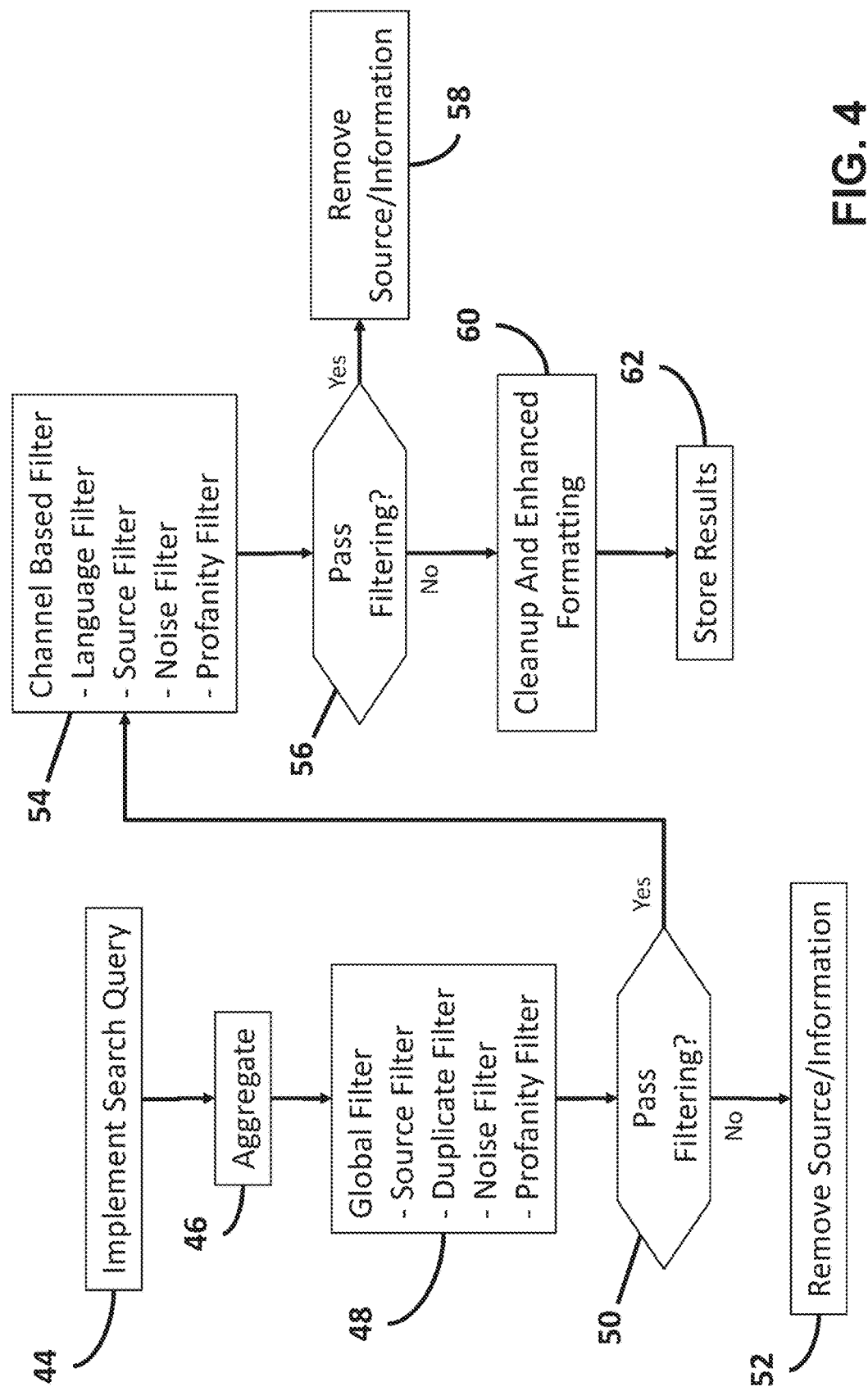
FIG. 4 is a flow diagram of an example process for aggregating, filtering, and quality testing.

As described above, with reference to FIG. 1, aggregating, filtering, and quality testing may be performed at step 16. And FIG. 4 is a flow diagram of an example process for aggregating, filtering, and quality testing comprising any appropriate combination and sequence of implementing a search query at step 44, aggregating information from sources at step 46, performing global filtering at step 48, determine information that has passed global filtering at step 50, removing a source and/or information that has not passed global filtering at step 52, performing channel based filtering at step 54, determine information that has passed channel based filtering at step 56, removing a source and/or information that has not passed channel based filtering at step 58, performing clean up and enhancing formatting at step 60, and storing results at step 62.

A search query may be implemented at step 44. The search query may be performed on each topic-related source of the intelligence channel. Each source may be queried with a search query comprising appropriate search parameters based on the user's selected topic. A search query may comprise search criteria as previously described. Each search query may be formatted to meet needs of a respective source. In an example embodiment, search queries comprising appropriate search parameters may be provided to each source in a format appropriate for each source. Accordingly, results (e.g., topic-related information) may be received from each source. For example, TWITTER allows a Boolean search structure which groups operations using parentheses to indicate orders of operations, so that APPLE AND (iPhone OR iPad or iPod). GOOGLE does not allow the use of parentheses in the semantic structure or to indicate an order of operations, so the same search must be structured as: "Apple iPhone", "Apple iPad", "Apple iPod".

Results may be aggregated at step 46. Aggregation may require data-normalization, as results may vary in their data structure. Sources may provide results in differing data structures or formats. Results may be mapped to a database based on the particular data structure employed by the source. Results may be aggregated using formatters which process incoming data using data mappings based on the source and may be stored in a standard data structure. Results may be stored (e.g., in a database). As additional searches are conducted, results may be added to (inserted into) stored results. A unique index to an item URL field may be generated. During storage of results, if an item is determined to be in the URL field, the URL field may be skipped (result not added to, or inserted into, stored results). During storage of results, if an item is determined not to be in the URL field, the results are added to the stored results.

Filtering may be performed prior to storage of results. Filtering may affect storage of results and aggregation. For example, an influencer blacklist may be performed before the insertion process. For website resources, the influencer may be the website itself. For example, huffingtonpost.com, for social media sources, the influencer is the actual user. Entire websites may be banned on domain level or top-level domain, e.g., .cn, .biz, .casino, etc., social media user on user level. Thus, items resulting from these influencer filters may be skipped and not stored. In an example embodiment, the results from each source may be combined and incorporated into a data stream. The data stream may be filtered.

The data stream may be globally filtered at step 48. Global filtering may comprise any appropriate combination of source filtering, duplicate filtering, noise filtering, or profanity filtering. Source filtering may be performed at step 48. Source filtering may be utilized to remove irrelevant sources and/or spam. In an example embodiment, source filtering may compare a dictionary of continuously updated domain names and social media usernames with the article source URL. If there is a match, the item may be tagged and identified for further review. If information does not pass source filtering, as determined at step 50, the source and/or information may be removed from the data stream at step 52. If information does pass source filtering, as determined at step 50, upon completion of global filtering, the process may proceed to step 54.

Duplicate filtering may be performed at step 48. Duplicate filtering may compare individual article headlines and/or articles to identify and remove duplicate articles. In an example embodiment, article may be compared in chronological order to identify and remove duplicates articles and/or article that are somewhat close (comprise duplicative information). If duplicates are identified, they may be removed. If information does not pass duplicate filtering, as determined at step 50, the source and/or information may be removed from the data stream at step 52. If information does pass duplicate filtering, as determined at step 50, upon completion of global filtering, the process may proceed to step 54. For example, many news items may be repeated, and many press releases may be printed in multiple publications. To avoid wasting a user's time, these duplicate items may be filtered out by headline and/or by content.

Noise filtering may be performed at step 48. Noise filtering may remove items that do not add value, that are irrelevant to the topic, or the like, or any appropriate combination thereof. In an example embodiment, noise filtering may identify items of limited relevance and/or items that lack substantive content. Noise filtering may remove items of limited relevance and/or items that lack substantive content from the data stream. If information does not pass noise filtering, as determined at step 50, the source and/or information may be removed from the data stream at step 52. If information does pass noise filtering, as determined at step 50, upon completion of global filtering, the process may proceed to step 54.

Profanity filtering may be performed at step 48. Profanity filtering may compare keywords, phrases, images, video, etc. (e.g., a dictionary) with articles obtained from a respective source to identity profanity in the article. In an example embodiment, the profanity filter (e.g., the dictionary) may be tailored for a particular user. For example, a parent may tailor the profanity filter to remove any information that the parent may determine to be inappropriate for children. If information does not pass profanity filtering, as determined at step 50, the source and/or information may be removed from the data stream at step 52. If information does pass profanity filtering, as determined at step 50, upon completion of global filtering, the process may proceed to step 54.

Channel based filtering may be performed on the data stream at step 54. In an example embodiment, channel-based filtering may comprise any appropriate combination of language filtering, source filtering, or noise filtering. As described herein, channel filtering operates strictly within a particular intelligence channel, while global filtering operates universally. For example, assume an intelligence channel in which the topic is high performance automobiles. The intelligence channel may include all manufacturers, but an intelligence channel could be filtered for use by General Motors to remove all other manufacturers.

Language filtering may be performed at step 54. Intelligence channels may be filtered by specific language. In an example embodiment, if a language is, or one or more specific languages are, designated, all nondesignated languages, as determined at step 56, may be filtered out at step 58. That is, all articles in a language other than a designated language, or languages, may be removed from the data stream at step 58. And, upon completion of channel-based filtering, the process may proceed to step 60. In an example embodiment, a nondesignated language may be translated to a designated language.

Source filtering may be performed at step 54. Source filtering may be utilized to remove irrelevant sources and/or spam. In an example embodiment, source filtering may compare a dictionary of continuously updated domain names and social media usernames with the article source URL. If there is a match, the item may be tagged and identified to be excluded or for further review. If information does not pass source filtering, as determined at step 56, the source and/or information may be removed from the data stream at step 58. If information does pass source filtering, as determined at step 56, upon completion of global filtering, the process may proceed to step 60.

Noise filtering may be performed at step 54. Noise filtering may remove items that do not add value, that are irrelevant to the topic, or the like, or any appropriate combination thereof. In an example embodiment, noise filtering may identify items of limited relevance and/or items that lack substantive content. Noise filtering may remove items of limited relevance and/or items that lack substantive content from the data stream If information does not pass noise filtering, as determined at step 56, the source and/or information may be removed from the data stream at step 58. If information does pass noise filtering, as determined at step 56, upon completion of global filtering, the process may proceed to step 60.

Profanity filtering may be performed at step 54. Profanity filtering may compare keywords, phrases, images, video, etc. (e.g., a dictionary) with articles obtained from a respective source to identity profanity in the article. In an example embodiment, the profanity filter (e.g., the dictionary) may be tailored for a particular user. For example, a parent may tailor the profanity filter to remove any information that the parent may determine to be inappropriate for children. Any article determined to contain profanity, may be removed from the data stream If information does not pass profanity filtering, as determined at step 56, the source and/or information may be removed from the data stream at step 58. If information does pass profanity filtering, as determined at step 56, upon completion of global filtering, the process may proceed to step 60.

Article cleanup and enhanced formatting may be performed at step 60. Advertisements may be removed from article content. Content may be formatted as needed in order to provide information via an intelligence channel. Semantic analysis of article content may be performed in order to select photographs, places, names, companies, addresses, and/or phone numbers in order to enhance channel definition, generate word clouds, and deliver enhanced content. Natural language processing may be employed to highlight elements of interest, such as names of persons or entities, monetary values, locations, or the like. Final results may be may be stored at step 62. In an example embodiment, stored results may be available for delivery to any user selecting that channel. Stored results may be available for combination with other channels. Stored results may be available for updating. In an example embodiment, if a result is combined and/or updated, a time associated with the combination and/or update may be stored. Users selecting the channel within a predetermined time interval may receive the stored information. A user inquiry received outside of the predetermined time interval may trigger anew inquiry in order to obtain fresh and timely results.

As described above, with reference to FIG. 1, assembly of information may be performed at step 18, topic-related information may be provided at step 20, and information may be updated at step 22. Assembled information may be provided via an intelligence channel via a customized interface. The interface may be in the form of a hub comprising a customized dashboard. Results received for each channel ordered by a user may be combined and delivered via the customized hub.

Figure 5:
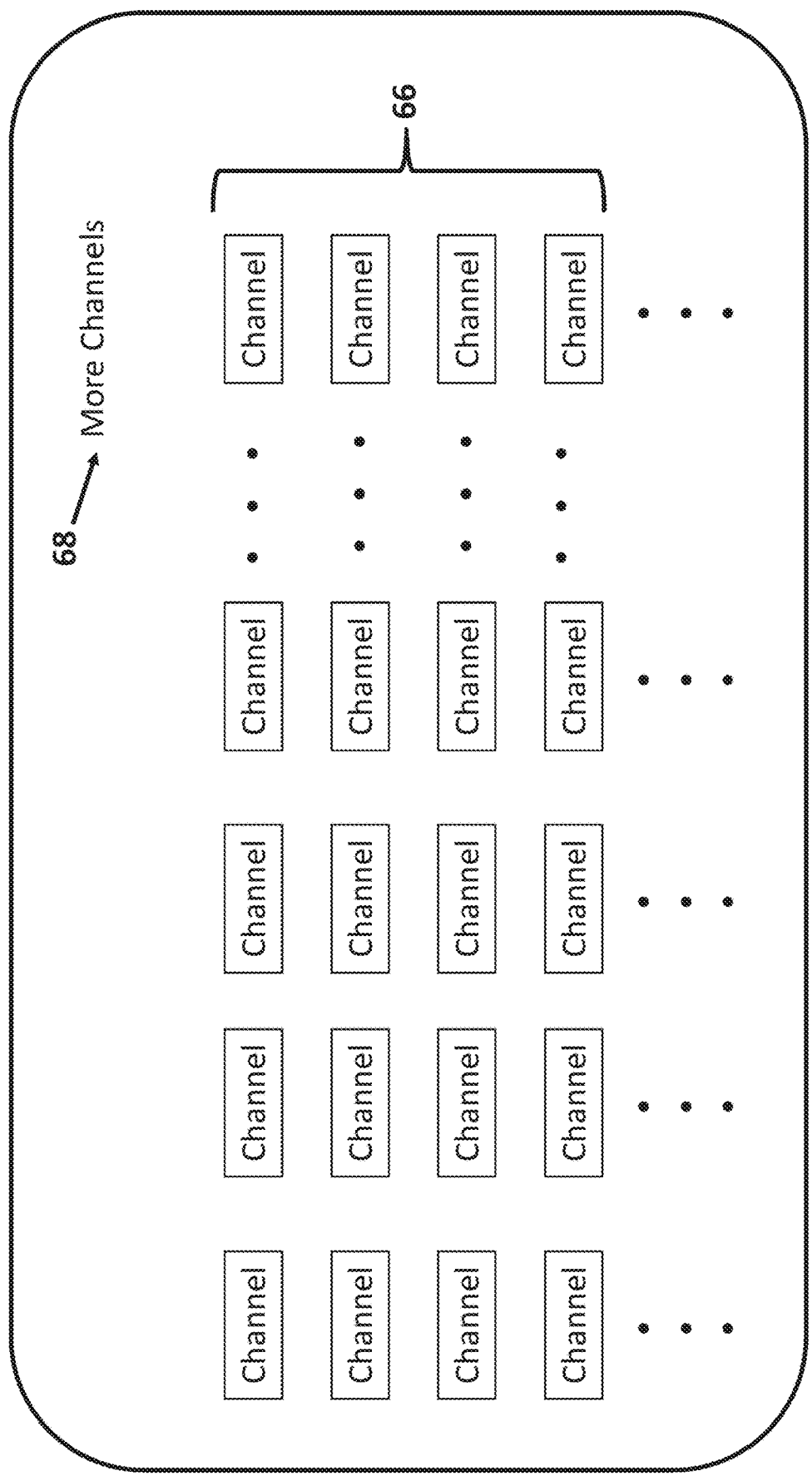
FIG. 5 depicts an example interface comprising a plurality of intelligence channels.

FIG. 5 depicts an example interface 64 comprising a plurality of intelligence channels 66. Each channel depicted in FIG. 5 represents a different intelligence channel. An intelligence channel may be a predetermined (predefined) channel provided by the system, an intelligence channel may be determined by a user, or any appropriate combination thereof. Thus, the plurality of intelligence channels 66 may represent a plurality of predetermined intelligence channels, a plurality of user-defined intelligence channels, a plurality of intelligence channels of a user's favorite list, or any appropriate combination thereof. As depicted in FIG. 5, more intelligence channels may be accessed by selecting item 68 labeled as "More Channels."

The interface 64 may be considered as a hub-like center, or e-store, via which a user may access intelligence channels. Channels and news may be delivered to the user through the hub like interface 64. The hub-like interface 64 may be presented in any appropriate manner and/or format. In an example embodiment, the hub-like interface 64 may be presented as "my Channels" page, or the like, which may be accessible by being displayed on all website pages. The hub-like center may be applied to channels already selected by a user or to additional channels which may be available.

An intelligence channel as rendered via the interface 64 may comprise any appropriate information that identifies the intelligence channel. For example, an intelligence channel may comprise an icon, text, video, sound, or any appropriate combination thereof that identifies the intelligence channel.

When an intelligence channel is selected, topic-related information may be provided via the intelligence channel. An intelligence channel may be selected in any appropriate manner. As described herein, selection of a rendering on an interface may be accomplished in any appropriate manner, such as, for example, clicking on a rendering, tapping a rendering, touching a rendering, making a gesture over a rendering, making a gesture proximate to a, providing an audio command, or the like, or any appropriate combination thereof. Accordingly, in an example embodiment, an intelligence channel may be selected via the interface 64 by clicking on the rendering of the intelligence channel, by tapping the rendering of the intelligence channel, by touching the rendering of the intelligence channel, by making a gesture over the rendering of the intelligence channel, by making a gesture proximate to the rendering of the intelligence channel, by providing an audio command, or the like, or any appropriate combination thereof.

Figure 6:
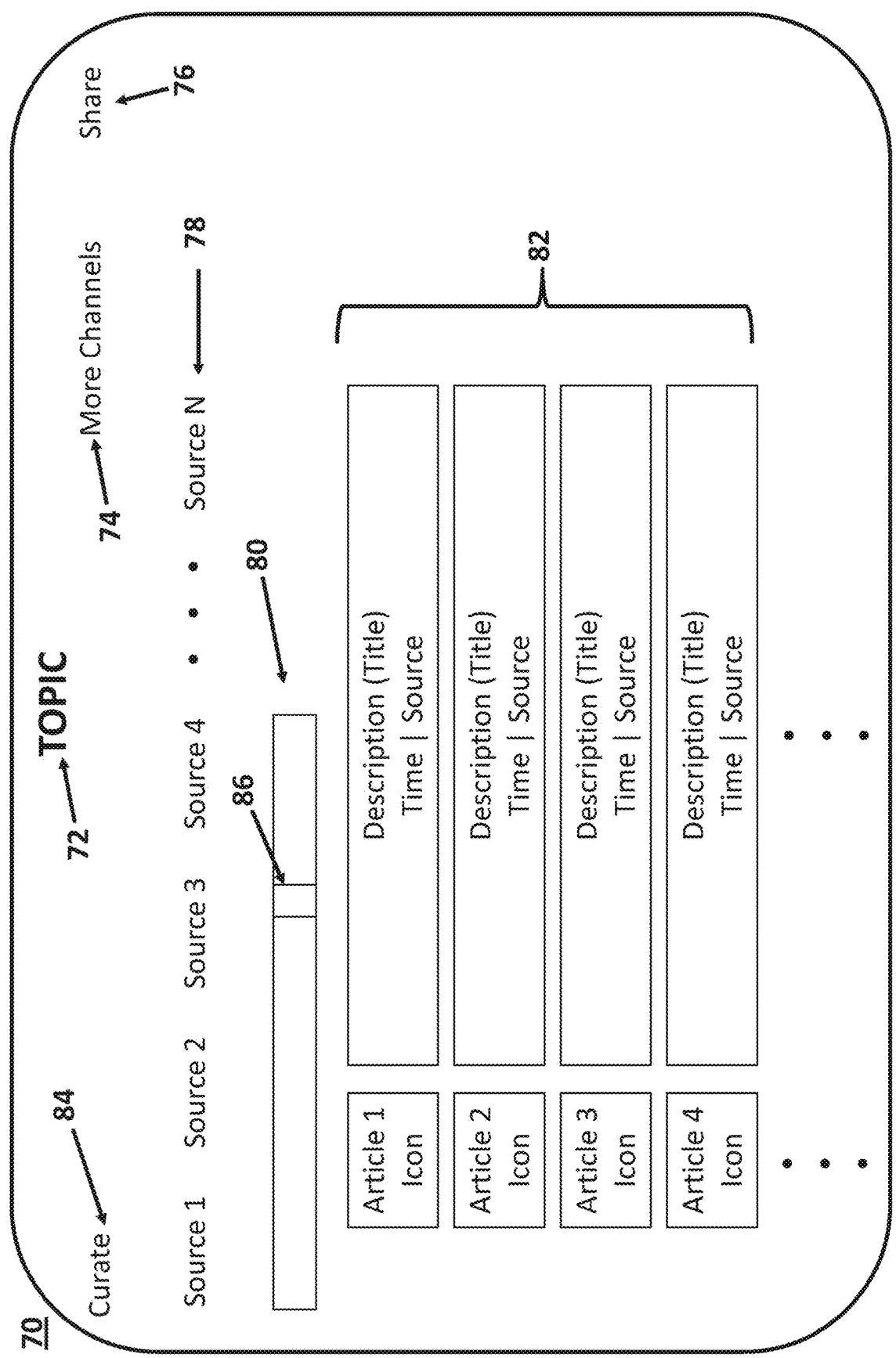
FIG. 6 depicts an example illustration of an intelligence channel interface.

When an intelligence channel is selected, topic-related information may be provided in real time. FIG. 6 depicts an example illustration of a user friendly, interactive, intelligence channel interface 70. In an example embodiment, interface 70 may comprise an interactive display of an apparatus, device, server, computer, or the like. In an example embodiment, interface 70 may comprise any appropriate combination of a selectable source portion or region 78, a portion or region allowing selection of more intelligence channels 74, a portion or region allowing sharing of the intelligence channel 76, an adjustable filter portion or region 80, and dynamically configurable content portion or region 82. In an example embodiment, the interface 70 may comprise a web page or the like. The topic may be rendered via the interface 70 as depicted by item 72. More channels may be accessed by selecting item 74.

The selectable source region 78 may provide individually selectable access to a plurality of sources of topic-related information (e.g., Source 1, Source 2, Source 3, Source 4, . . . Source N), wherein each source of the plurality of topic-related sources may comprise information related to a topic and may be individually selectable. The content region 82 may render topic-related information (e.g., Article 1, Article 2, Article 3, Article 4 . . . ) and provide access to a source of the rendered topic-related information. The adjustable filter region 80 may provide adjustable filtering of the dynamically configurable content region 82, wherein content of the content region 82 may be dynamically modified, in real time, based on the adjustable filtering of the filter render in filter region 80.

An intelligence channel may be shared by selecting item 76. An intelligence channel and/or information provided via an intelligence channel may be shared via, for example, email, social media, TWITTER, LINKEDIN, FACEBOOK, GOOGLE+, a social network, a news article, a test message, or the like, or any appropriate combination thereof.

Sources 78 of topic-related information may be rendered on the interface 70. Each rendering of a source may be selectable in a toggle-like fashion, wherein selection of a rendering of a source may allow information to be received from the source, and a subsequent selection of the source may prevent information from being received from the source. For example, Source 1 may represent TWITTER, Source 2 may represent GOOGLE, and Source 3 may represent a user-defined source. Selecting Source 1 may allow topic-related information from TWITTER to be received and rendered in the plurality of articles 82. A subsequent selection of Source 1 may prevent information from being received from TWITTER, and previously rendered articles from TWITTER would be removed from the plurality of articles 82. Similarly, selecting Source 2 may allow topic-related information from GOOGLE to be received and rendered in the plurality of articles 82. A subsequent selection of Source 1 may prevent information from being received from GOOGLE, and previously rendered articles from GOOGLE would be removed from the plurality of articles 82. And, selecting Source 3 may allow topic-related information from the user-defined source to be received and rendered in the plurality of articles 82. A subsequent selection of Source 3 may prevent information from being received from the user-defined source, and previously rendered articles from the user-defined source would be removed from the plurality of articles 82.

In an example embodiment, filter of topic-related information may be adjustable via the interface 70. For example, slider 80 may function as a filter. Selecting and moving control 86 to the left or to the right of slider 80 may more or less filter topic-related information based on influence of the source and/or relevance of the item. For example, selecting and moving the control 86 to the left end of slider 80 may allow less influential and/or less relevant topic-related information to be received. And selecting and moving the control 86 to the right end of slider 80 may allow only more influential and/or more relevant topic-related information to be received. Thus, in this example scenario, the left edge of slider 80 represents less restriction and the right edge of slider 80 represent more restriction. As slider 80 is adjusted via control 86, the information rendered in the plurality of articles 82 may accordingly be adjusted.

The functionality invoked via slider 80 may determine a combined ranking of each item by relevance and influence (referred to herein as myCREOrank). In an example embodiment, the slider 80 scale may allow positioning from left to right, from a position designated "All" which returns all items to the channel to the far-right position which may be designated "myCREOpicks", and returns only the most relevant items from the most influential sources. Slide 80 may be positioned at intermediate points to allow more or less relevant items from more or less influential sources to be shown. The myCREOrank filtering by influence and relevance may be based on an algorithm which may be applied to all items in the database which have been initially selected for inclusion in the channel, based on the search for topic-related keywords.

The myCREOrank may be calculated based on influencer online presence metrics and/or channel context. For influencer online presence metrics (Influencer), metrics may be obtained from social networks and/or various third-party services for each influencer, or the like. Influencer metrics may vary depending on Influencer type—a web site or a social network user. Example Influencer metrics may include TWITTER—number of posts user has made, number of followers, retweets etc., YOUTUBE—number of user videos, number of views each video has got, average number of views etc., Blog—number of posts, number of follower, number of reposts, links etc. Web page—Google Page rank, or the like, or any appropriate combination thereof.

To compare different Influencer metrics, Influencer metrics may be weighted based on various characteristics and returned as Score (0-100). The weighting methodology may be based on academic research, other publications, information available online, or the like, or any appropriate combination thereof. The weighting methodology may be subject to adjustment based on crowd-sourced information (i.e., the actions of users of the channel such as views and curation of items) and refinement. Thus, Score may represent online popularity.

Channel context (Relevance) may be indicative of highly ranked items related closely to the channel topic. A post by a highly ranked influencer may not be as relevant to a particular channel as a post from a generally less highly ranked influencer. Therefore, a relevance score may be determined by considering such items as the number of mentions of topic-related keywords in an item, a ratio of topic-related keywords to other words in the item, the number of mentions of topic-related keywords in the item headline, the ratio of topic-related keywords to other words in the headline, the number of views or Page rank of the item, and other factors. Relevance may consider crowd-sourced data such as views and curation by users of a particular channel on particular items or items sourced from particular sources or authors.

In an example embodiment, slider 80 may filter items returned by a search for a topic by utilizing an algorithm based on a weighted scale which may consider the perceived reliability of the source (e.g., the New York Times or Wall Street Journal would be deemed more reliable than an anonymous TWITTER™ post) and the authority of the author, which may be determined based on the number of previous items posted by the author. The slider 80 may adjust the weighting of the algorithm based on crowd-sourced data as some items are liked, not liked, curated out, recommended to be deleted, or viewed, or the like.

Topic-related information may be provided via a rendering of the plurality of articles 82. An article may be rendered in any appropriate manner. In an example embodiment, as depicted in FIG. 6, a rendering of an article may comprise an icon and/or a description. Selection of an article may provide a feed to topic-related information form the article. For example, article 1 may provide a link to a YOUTUBE video. Selection of article 1 may result in a rendering of the YOUTUBE video. The rendering of the YOUTUBE video may be filtered as described above. The description of the article may comprise any appropriate description. For example, as depicted in FIG. 6, the description article may comprise a title of the article, and a time and a description of the source. For example, in accordance with the foregoing example scenario, the description may comprise a title of the YOUTUBE video, the time the video was obtained, and the name of the source (i.e., YOUTUBE).

The interface 70 may provide a mechanism for updating an intelligence channel via selection of item 84, depicted as "Curate" in FIG. 6. Selection of item 84 may allow an intelligence channel to be updated in any appropriate manner. For example, selection of item 84 may provide a link to a web page, or the like, wherein the intelligence channel may be updated, by providing a source, removing a source, combining source, adjusting filtering, adjusting filtering criteria, or the like, or any appropriate combination thereof.

Figure 7:
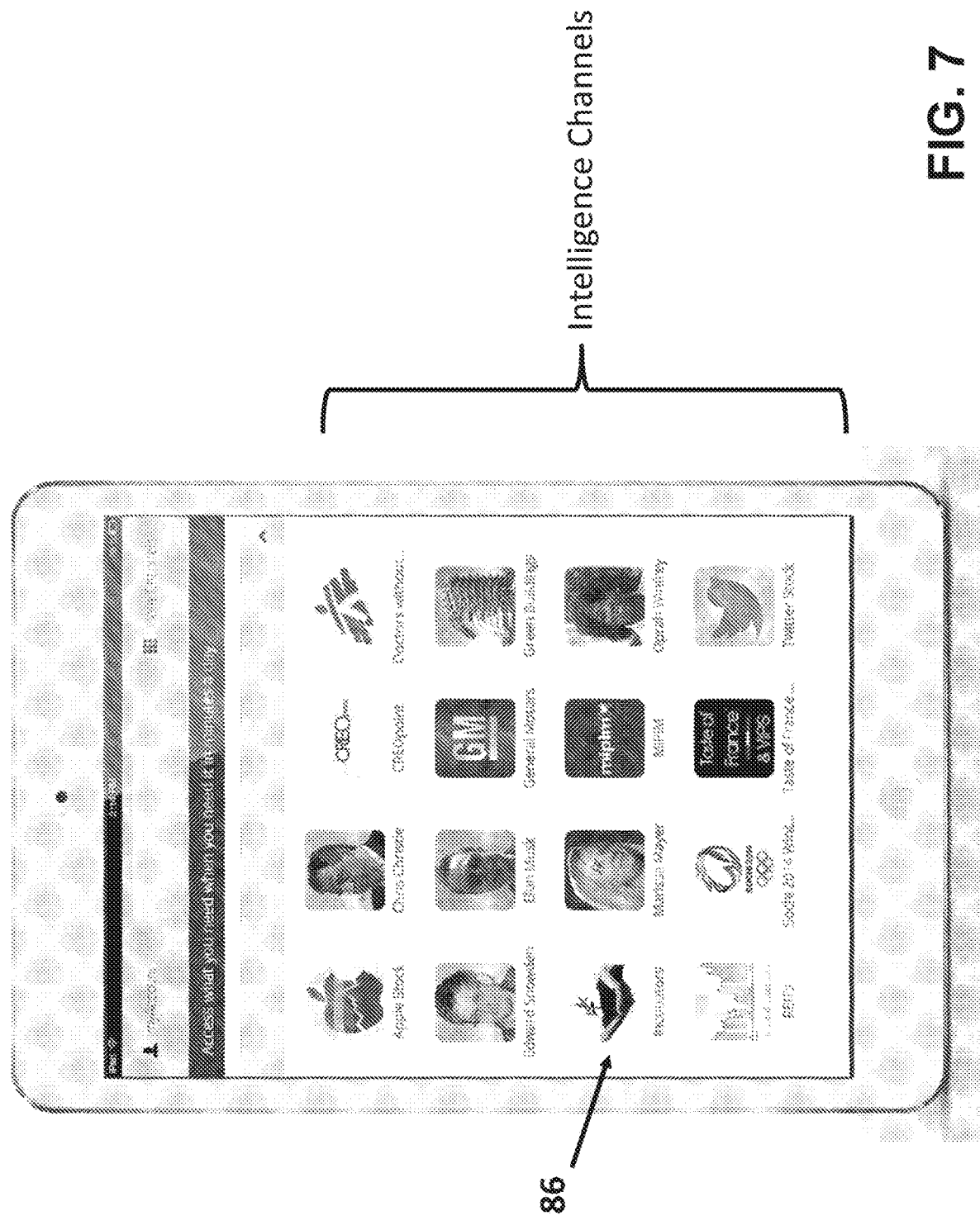
FIG. 7 illustrates an example interface for providing access to a plurality of intelligence channels.

FIG. 7 illustrates an example interface for providing access to a plurality of intelligence channels. As shown in FIG. 7, each intelligence channel may be represented by an icon and/or a description of the intelligence channel. For example, intelligence channel 86 is depicted by a graphic logo and textual description "Incubators," indicating the topic of the intelligence channel. Selection of intelligence channel 86 may provide link to an interface that provided topic related information.

Figure 8:
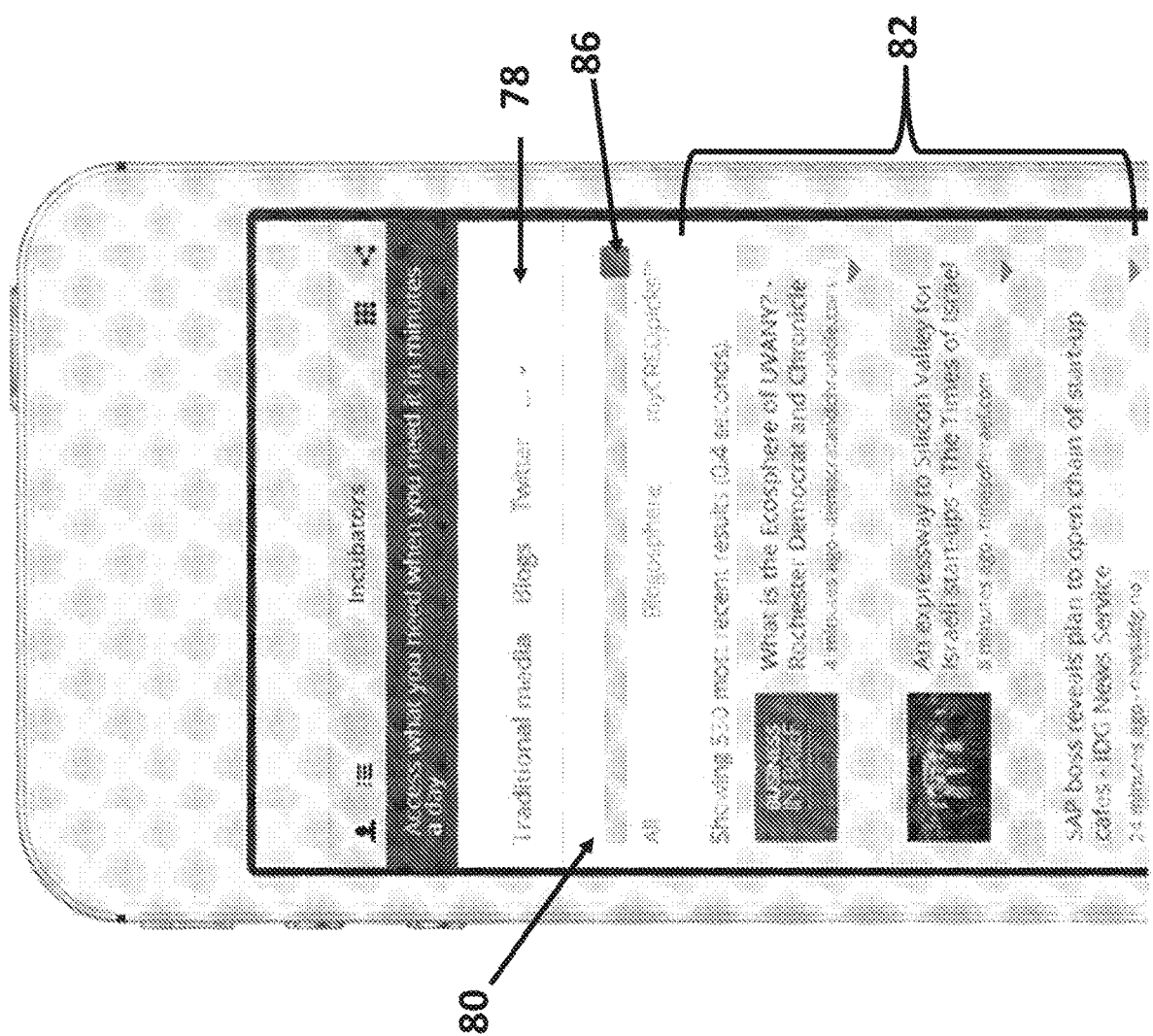
FIG. 8 illustrates an example interface that provides topic related information pertaining to incubators.

FIG. 8 illustrates an example interface that provides topic related information pertaining to incubators. Labels 78, 80, 82, and 86 on FIG. 8 correspond to labels 78, 80, 82, and 86 of FIG. 6, respectively, to identify items that function as previously described.

Referring again to FIG. 1, an intelligence channel may be updated at step 22 in any appropriate manner. As previously described, an intelligence channel may be updated based on filtering. An intelligence channel may be updated in an iterative fashion (self-learning closed loop) wherein problems found from quality testing and user experience may be fed back to improve channel development and refine the channel. This manner of updating may occur continuously, periodically, aperiodically, based on the occurrence of an event, or any appropriate combination thereof. In an example embodiment, an intelligence channel may be updated based on a user of an intelligence channel designating unwanted channels or designate channels to be combined or fused.

Crowdsourcing may be utilized to update an intelligence channel. An intelligence channel and/or information provided by an intelligence channel may be distributed and comments and/or suggestions may be received. The comments and/or suggests (e.g., clicks on a like or dislike button, clicks to remove an article, clicks through to review the article, etc.) may be utilized to update an intelligence channel. For example, an intelligence channel and/or information provided by an intelligence channel may be provided via for example, email, social media, TWITTER, LINKEDIN, FACEBOOK, GOOGLE, GOOGLE+, a social network, news articles, or the like, or any appropriate combination thereof. Recipients thereof may "like" a channel, article, source, or the like. A recipient thereof may request that a channel, article, source, or the like, be removed. This type of feedback may be utilized to update an intelligence channel. In an example embodiment, a database or the like, of such feedback may be generated and utilized for subsequent updates.

Figure 9:
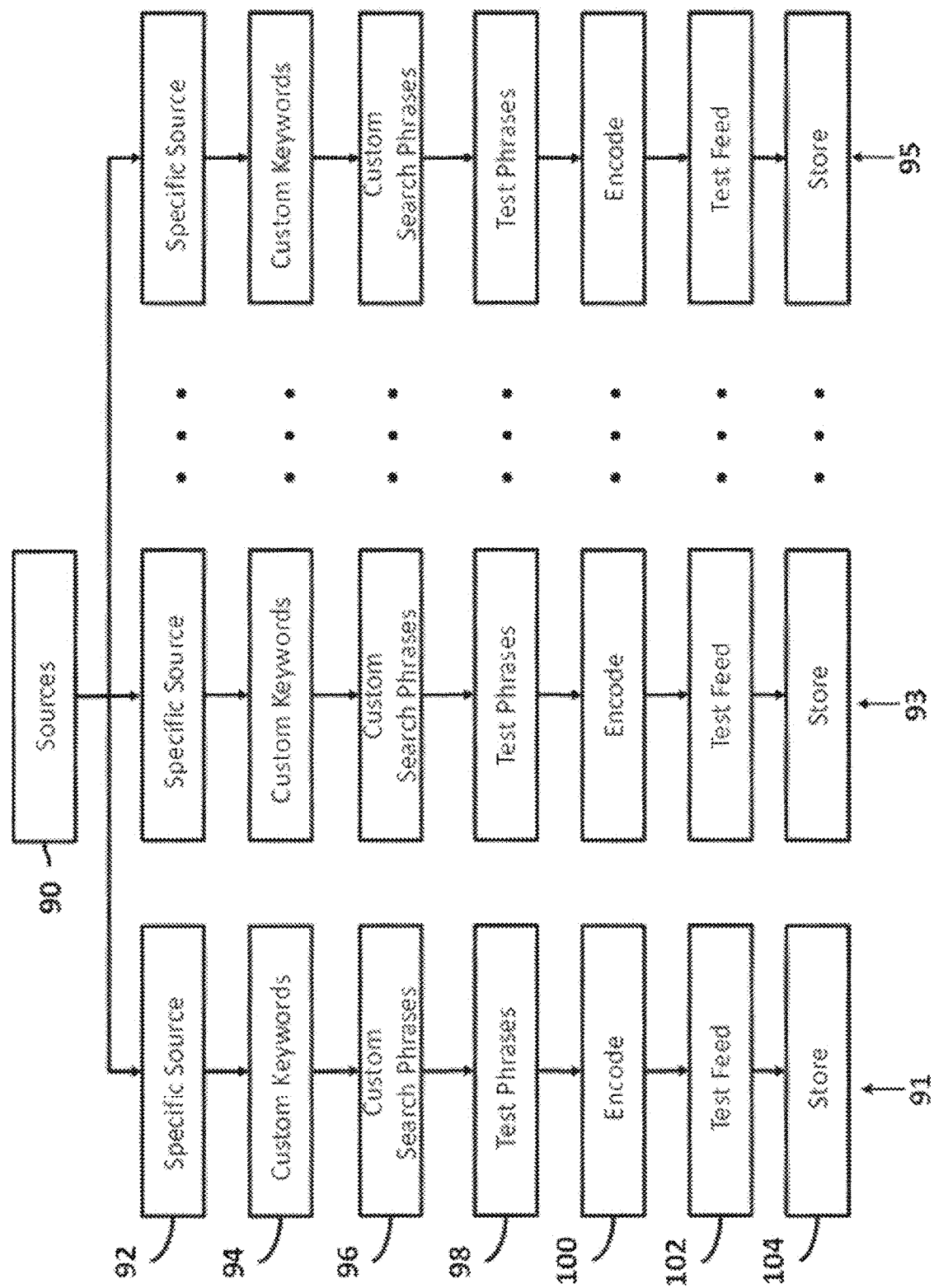
FIG. 9 is an example functional block diagram for developing an intelligence channel.

FIG. 9 is an example functional block diagram for developing an intelligence channel. Available sources 90 may be provided to multiple functional paths, depicted in FIG. 9 as columns 91, 93, and 95. Each functional path may perform operations on a specific source. A specific source may comprise any appropriate source. For example, specific source 92 may represent TWITTER, GOOGLE, GOOGLE NEWS, GOOGLE BLOGS, YOUTUBE, FACEBOOK, BING, YAHOO, WIKIPEDIA, a direct feed, or the like. Note, functional components are labeled with numbers only in functional path 91 for the sake of simplicity. However, functions performed in functional path 91 may be performed in other functional paths (e.g. 93, 95) in a similar manner on the respective specific source of the functional path.

A specific source may be searched for keywords via a custom search at functional block 94. The custom search may be customized for the specific source based on the topic and/or by the user. For example, a custom search on TWITTER may comprise the URL (Uniform Resource Locator) https://twitter.com/search-advanced, a custom search on GOOGLE NEWS may comprise the URL http://news.google.com, a custom search on GOOGLE BLOGS may comprise the URL http://blogsearch.google.com, a custom search on YOUTUBE may comprise the URL http:www.youtube.com, a custom search on FACEBOOK may search a company or the like FACEBOOK page, or a custom search for a direct feed (e.g., RSS feed) may comprise searching for topic-related information via the direct feed, company web sites, news feeds, or the like.

Custom search phrases for topic related information using specific source search parameters may by generated at function block 96. For example, TWITTER may be searched using TWITTER specific search parameters and semantic structure, GOOGLE NEWS may be searched using GOOGLE specific search parameters and semantic structure, GOOGLE BLOGS may be searched using GOOGLE BLOGS specific search parameters and semantic structure, YOUTUBE may be searched using YOUTUBE specific parameters and semantic structure, or FACEBOOK may be searched using a FACEBOOK ID, user name, other FACEBOOK appropriate specific parameters and semantic structure, or the like.

Custom test phrases may be tested at functional block 98. Custom test phrases may be tested on the respective specific source utilizing an appropriate URL, and semantic structure for the specific source. For example, a custom phrase for TWITTER may be tested by using the URL https://twitter.com/search-advanced, a custom phrase for GOOGLE NEWS may be tested by using the URL http://news.google.com, a custom phrase for GOOGLE BLOGS may be tested by using the URL http://blogsearch.google.com, a custom phrase for YOUTUBE may be tested by using the URL http:www.youtube.com/rss/search/[SEARCH], or a custom phrase for FACEBOOK may be tested by using the URL https://www.facebook.com/feeds/page.php?id, or the like.

Search phrases may be encoded at functional block 100. Search phrase encoding may handle special characters that are not allowed in URLs, which are limited to the ASCII character set and cannot contain spaces. As terms often contain characters outside the ASCII character set or spaces, the URL may be converted to a valid ASCII format. URL encoding may replace non-ASCII characters with a "%" followed by two hexadecimal digits. For example, the normal text Michelle Gunter may be encoded as Michelle%20G%C3%BCnter Encoded search phrases may be tested at on custom feed at functional block 102. And custom feeds and search phrased may be stored at functional block 104.

Figure 10:
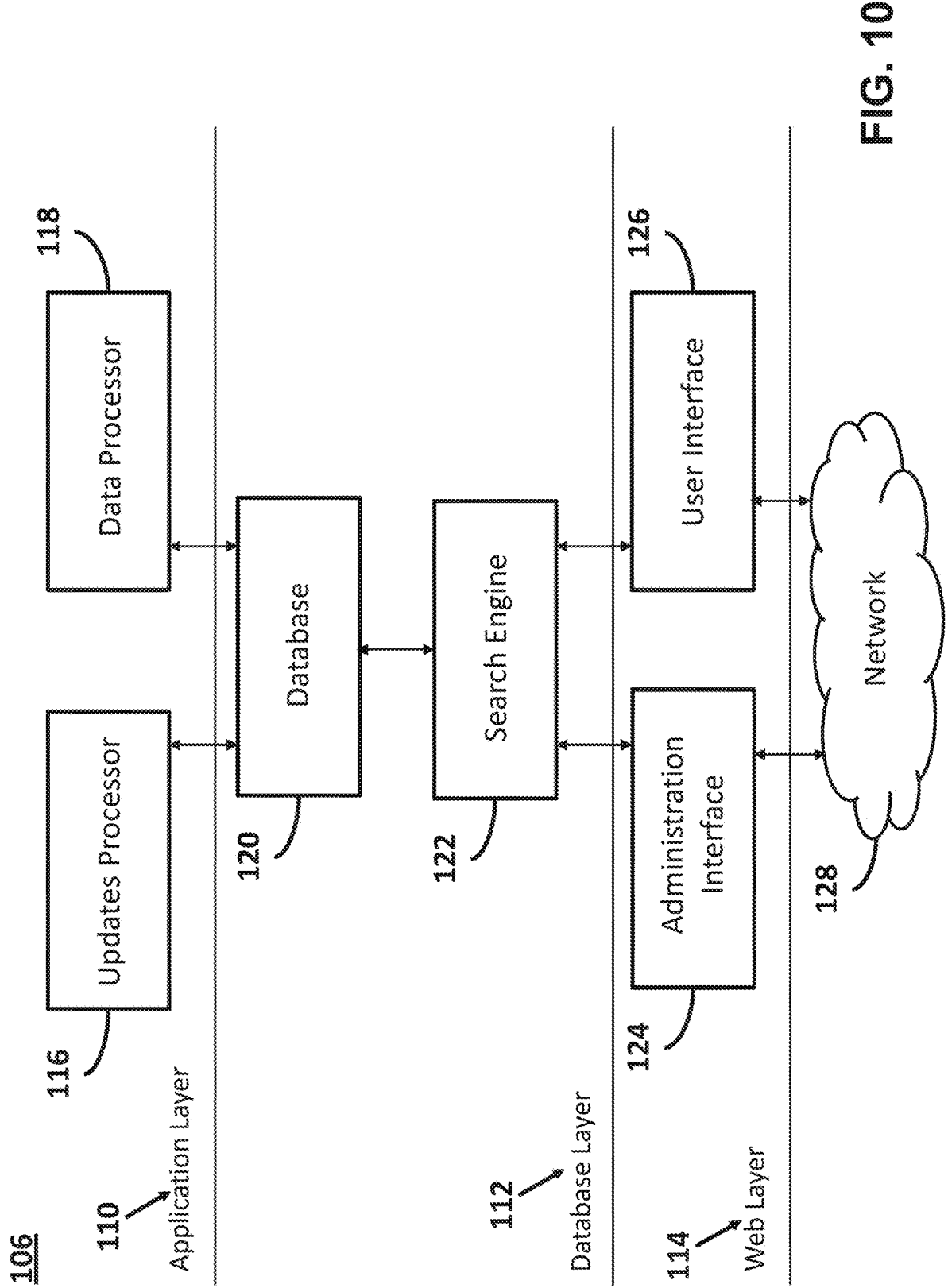
FIG. 10 is an example block diagram of a system for generating an intelligence channel and providing information via an intelligence channel.

FIG. 10 is an example block diagram of a system 106 for generating an intelligence channel and providing information via an intelligence channel. In an example embodiment, the system 106 may comprise an application layer, 110, a database layer 112, and a web layer 114. The application layer 110 may comprise any appropriate combination of an updates processor 116 and a data processor 118. The database layer 112 may comprise any appropriate combination of a database 120 and a search engine 122. The web layer 114 may comprise any appropriate combination of an administration interface 124 and a user interface 126, each of which may be coupled to a network 128.

In an example embodiment, the database 120 may be a mongo db, an open source program, and open sourced tools. The data processor 118 may generate the search parameters which may be implemented through the search engine, which may be GOOGLE or another commercially available search engine. The data processor handles the raw item data processing, analysis and enrichment, and interacts with the database by requesting raw items and storing enriched items to the database. The search engine delivers filtered keyword results and interacts with the database by requesting raw data and with the user interface by returning filtered data. The administration interface 124 may be utilized to define and refine the search parameters and keywords, includes and excludes, which operate through the search engine to generate results delivered to the database which are delivered to users through the user interface. The updates processor 118 may repeat the process periodically to update all results by scheduling source updates, requesting load balancing, requesting search preparation and execution, data aggregation, and low-level filtering. The database 120 may track each article returned as associated with a search during the update process. The database 120 also may maintain all user information for purposes including payment processing and history, data mining, and crowd-sourced article or source ratings and determinations. The database is where all data is stored, including all searches, items retrieved, user information, including all clicks, likes, dislikes, curations, click-throughs, click-through destinations, curation information, billing information and the like. All other components interact with the database by requesting data for processing or display and sending data for storage.

Figure 11:
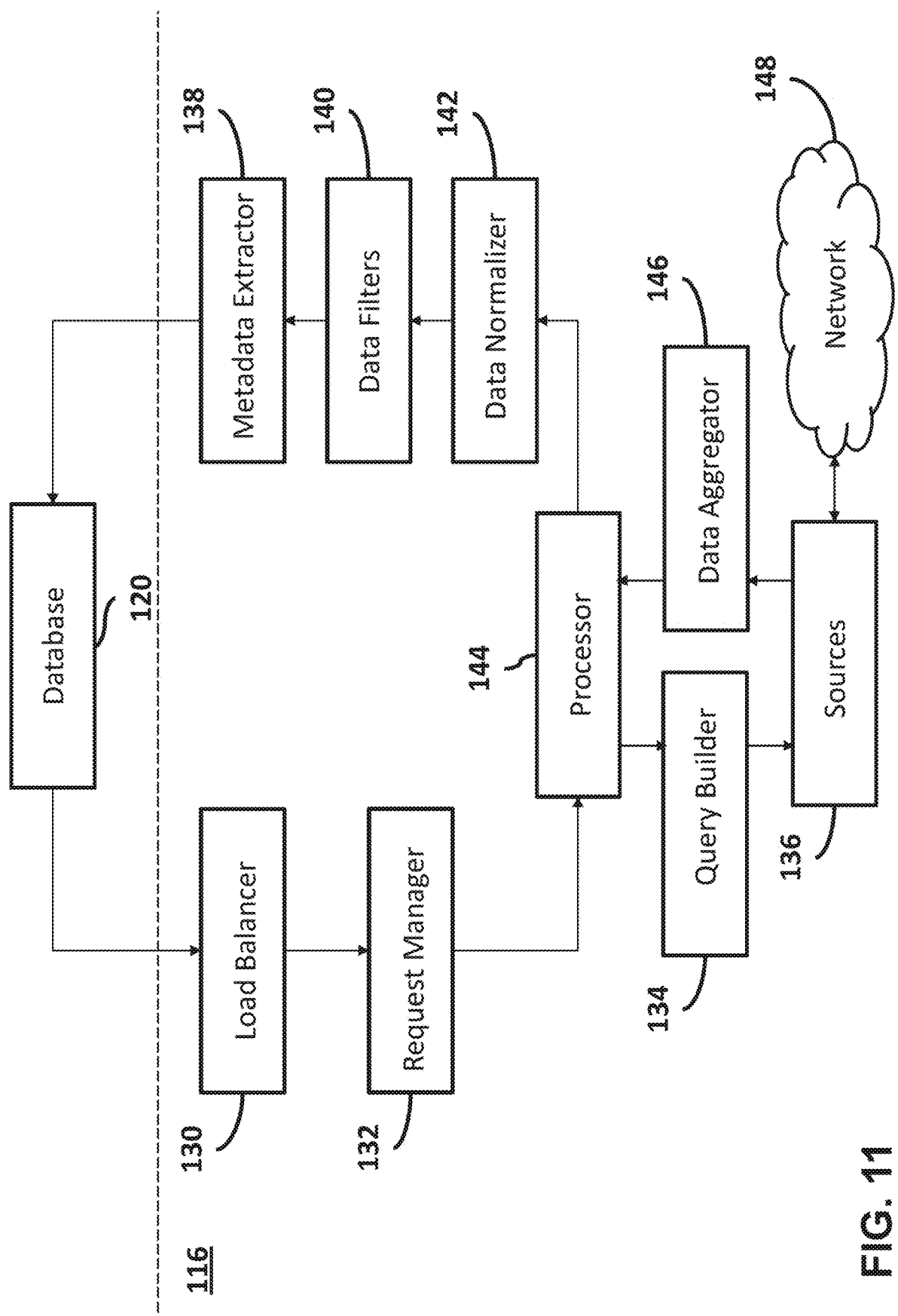
FIG. 11 is an example block diagram of the updates processor.

FIG. 11 is an example block diagram of the updates processor 116. In an example embodiment, the updates processor 116 may comprise any appropriate combination of a load balancer 130, a request manager 132, a metadata extractor 138, data filters 140, a data normalizer 142, a processor 144, a query boulder 134, a data aggregator 146. The updates processor schedules source updates and requests load balancing, request preparation and execution, data aggregation, and low-level filtering. The updates processor interacts with the database by requesting data about channels and sources and storing raw items in the database. The query builder 134 and the data aggregator may be in communications with sources 136, which a may be in communications with a network 148.

The system may be designed to be horizontally scalable. The database and search engine(s) may be scaled as demand requires by adding additional servers (nodes). The updates processor and data processor may also be scaled horizontally by adding additional servers (nodes), provided that each server (node) acts as an individual instance of the updates processor and data processor. Load balancing is provided on a system database level.

In an example embodiment, the load balancer 130 may optimize usage of hardware and communications resources to minimize processing time and allow multiple searches to proceed simultaneously to reduce response time. The request manager 132 may interact with the load balancer 130 so requests from sources or to search engines are efficiently managed. The metadata extractor 138 may identify the appropriate metadata for identifying and indexing each article within the database and may identify API versions and settings associated with particular sources. Data filters 140 may be used to remove irrelevant items identified through exclude statements, as including profanity or as duplicates. The query builder 134 may comprise a listing of the defining sources, keywords, includes, excludes, and filters for an intelligence channel. The data aggregator 146 may assemble data for delivery to the user through the user interface and filters duplicates.

Figure 12:
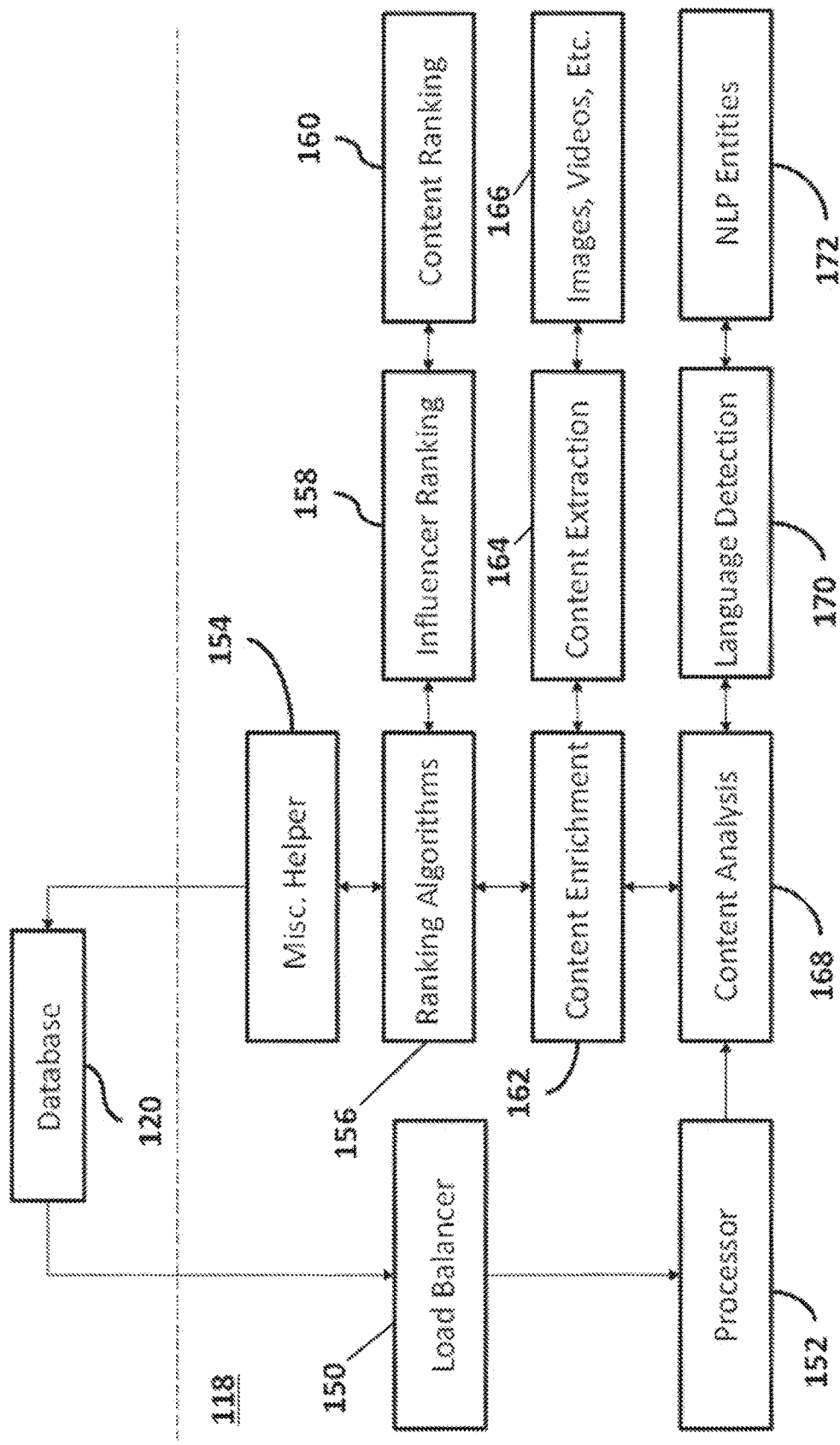
FIG. 12 is an example block diagram of the data processor.

FIG. 12 is an example block diagram of the data processor 118. In an example embodiment, the data processor 118 may comprise any appropriate combination of a load balancer 150, a processor 152, a miscellaneous helper 154, a ranking algorithm processor 156, an influencer ranking processor 158, a content ranking processor 160, a content enrichment processor 162, a content extraction processor 164, an images, video, etc. processor 166, a content analysis processor 168, a language detection processor 170, and a nature language processing (NLP) processor 172. The load balancer may monitor available request limits and scheduling requests. The ranking algorithm processor may comprise a system structural unit including "CREOrank", which may calculate the influence of a source based on prior instances of the source items and may be crowd-sourced, and content ranking, which may calculate item content relevance based on characteristics such as headline length, ration of keywords/stopwords to all words in item, occurrence of #hashtags and @usernames in the headline or item, content length, occurrence of keywords/stopwords in content, and the like. A content enrichment processor is a system structural unit which may extract content from text to provide structured data and extracts media elements (images, video, sound, etc.) from text. The content analysis module is a system structural element that includes language detection, which may include or exclude an item based on its language (French, German, English, Mandarin, Hebrew etc.) and natural language processing, which may detect and highlight certain types of data elements such as names of individuals, names of entities monetary values, times or dates or the like.

Figure 13:
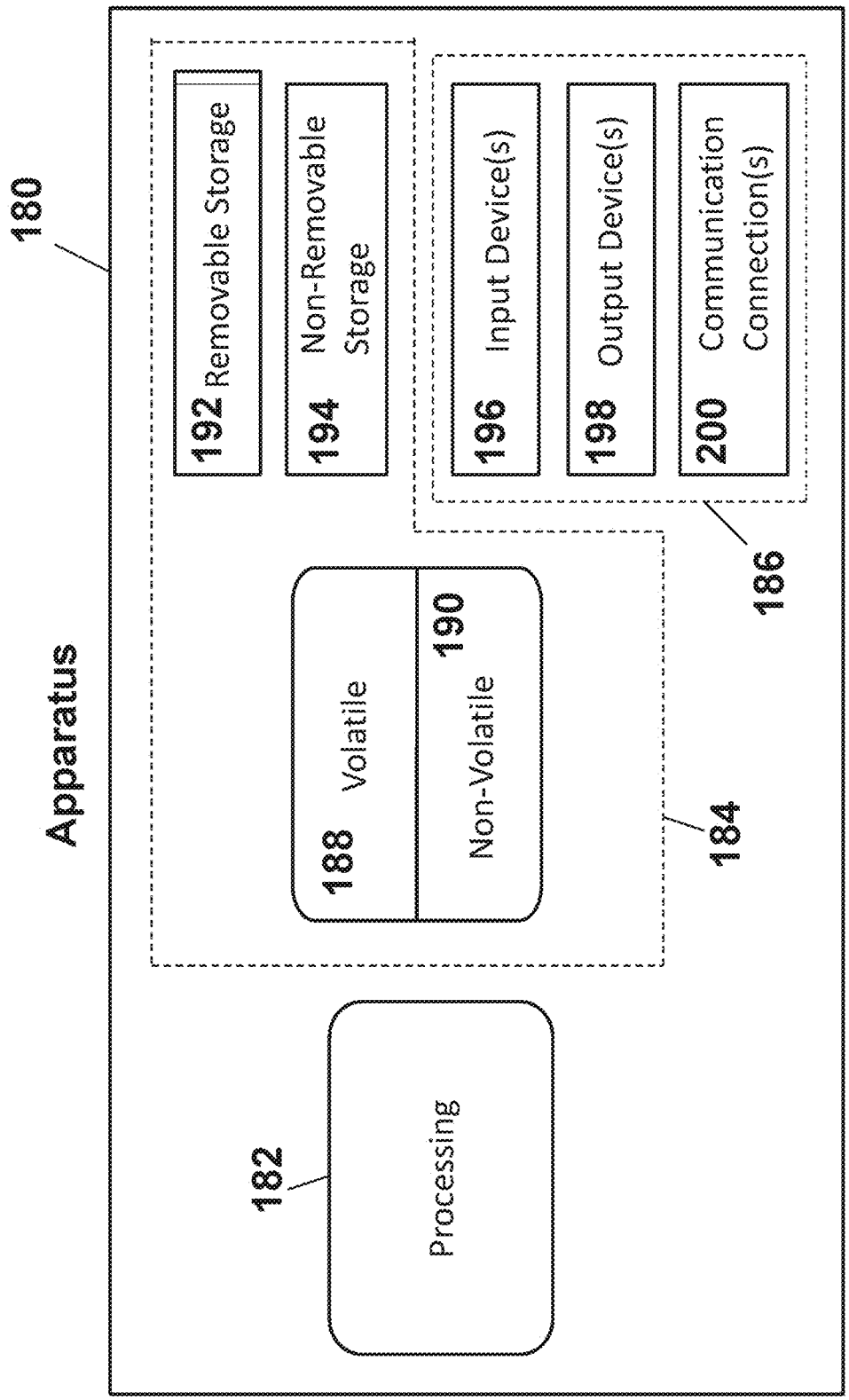
FIG. 13 is a block diagram of an example apparatus that may be utilized to implement and/or facilitate an intelligence channel.

FIG. 13 is a block diagram of an example apparatus 180 that may be utilized to implement and/or facilitate an intelligence channel as described herein. The apparatus 180 may comprise hardware or a combination of hardware and software. The apparatus 180 depicted in FIG. 13 may represent any appropriate apparatus, device, processor, server, a gateway, a node, a database, or the like, or any appropriate combination thereof. For example, the apparatus 180 may comprise an apparatus, a device, a processor, a server, a gateway, a node, a database, the updates processor 116, the data processor 118, the database 120, the search engine 122, the administration interface 124, the user interface 126, each of which may be coupled to a network 128, the load balancer 130, the request manager 132, the metadata extractor 138, the data filters 140, the data normalizer 142, the processor 144, the query boulder 134, the data aggregator 146, or the like, or any appropriate combination thereof. It is emphasized that the block diagram depicted in FIG. 13 is exemplary and not intended to imply a specific implementation or configuration. Thus, the apparatus 180 may be implemented in a single apparatus or multiple apparatuses (e.g., single server or multiple servers, single gateway or multiple gateways, single apparatus or multiple apparatuses, single node or multiple nodes, single processor or multiple processors, single database or multiple databases, single device or multiple devices, etc.). Multiple apparatuses may be distributed or centrally located. Multiple apparatuses may communicate wirelessly, via hard wire, or any appropriate combination thereof.

In an example embodiment, apparatus 180 may comprise a processor and memory coupled to the processor. The memory may comprise executable instructions that when executed by the processor cause the processor to effectuate operations associated with an intelligence channel as described herein. As evident from the herein description apparatus 180 is not to be construed as software per se.

In an example configuration, apparatus 180 may comprise a processing portion 182, a memory portion 184, and an input/output portion 186. The processing portion 182, memory portion 184, and input/output portion 186 may be coupled together (coupling not shown in FIG. 13) to allow communications therebetween. Each portion of the apparatus 180 may comprise circuitry for performing functions associated with an intelligence as described herein. Thus, each portion may comprise hardware, or a combination of hardware and software. Accordingly, each portion of the apparatus 180 is not to be construed as software per se. That is, processing portion 182 is not to be construed as software per se. Memory portion 184 is not to be construed as software per se. Input/output portion 186 is not to be construed as software per se. Volatile memory portion 188 is not to be construed as software per se. Non-volatile memory portion 190 is not to be construed as software per se. Removal storage portion 192 is not to be construed as software per se. Non-removal storage portion 194 is not to be construed as software per se. Input device(s) portion 196 is not to be construed as software per se. Input device(s) portion 198 is not to be construed as software per se. And communication connection(s) portion 200 is not to be construed as software per se. Each portion of apparatus 180 may comprise any appropriate configuration of hardware and software as would be ascertainable by those of skill in the art to perform respective functions of an intelligence channel.

The input/output portion 186 may be capable of receiving and/or providing information from/to a communications device and/or other apparatuses configured to generate and/or utilize an intelligence channel as described herein. For example, the input/output portion 186 may include a wireless communications (e.g., 2.5G/3G/4G/GPS) card. The input/output portion 186 may be capable of receiving and/or sending video information, audio information, control information, image information, data, or any combination thereof. In an example embodiment, the input/output portion 186 may be capable of receiving and/or sending information to determine a location of the apparatus 180 and/or a communications device. In an example configuration, the input\output portion 186 may comprise a GPS receiver. In an example configuration, the apparatus 180 may determine its own geographical location and/or the geographical location of a communications device through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 186 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion may comprise a WIFI finder, a two-way GPS chipset or equivalent, or the like, or a combination thereof.

The processing portion 182 may be capable of performing functions associated with an intelligence channel as described herein. In an example embodiment, the processing portion 182 may be capable of, in conjunction with any other portion of the apparatus 180, installing an application for an intelligence channel as described herein.

In a basic configuration, the apparatus 180 may include at least one memory portion 184. The memory portion 184 may comprise a storage medium having a concrete, tangible, physical structure. Thus, the memory portion 184, as well as any computer-readable storage medium described herein, is not to be construed as a transient signal. The memory portion 184, as well as any computer-readable storage medium described herein, is not to be construed as a propagating signal. The memory portion 184, as well as any computer-readable storage medium described herein, is to be construed as an article of manufacture. The memory portion 184 may store any information utilized in conjunction with an intelligence channel as described herein. Depending upon the exact configuration and type of processor, the memory portion 184 may be volatile 188 (such as some types of RAM), non-volatile 190 (such as ROM, flash memory, etc.), or a combination thereof. The apparatus 180 may include additional storage (e.g., removable storage 192 and/or non-removable storage 194) such as, for example, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the apparatus 180.

The apparatus 180 also may contain communications connection(s) 200 that allow the apparatus 180 to communicate with other apparatuses, devices, network entities, or the like. A communications connection(s) may comprise communication media. Communication media may typically embody computer readable instructions, data structures, program modules or other data in a modulated data signal such as a carrier wave or other transport mechanism and includes any information delivery media. By way of example, and not limitation, communication media may include wired media such as a wired network or direct-wired connection, and wireless media such as acoustic, RF, infrared, and other wireless media. The term computer readable media as used herein includes both storage media and communication media. The apparatus 180 also may include input device(s) 196 such as keyboard, mouse, pen, voice input device, touch input device, etc. Output device(s) 198 such as a display, speakers, printer, etc. also may be included.

Figure 14:
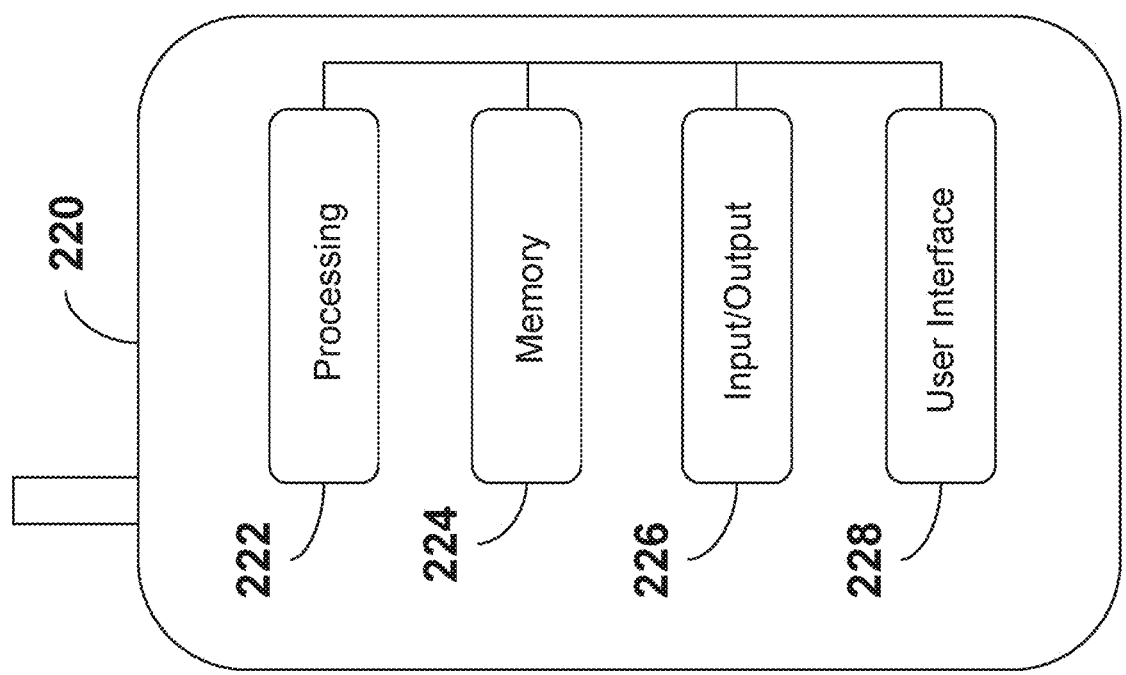
FIG. 14 is a block diagram of an example device that may be utilized to generate and/or implement an intelligence channel.
Figure 15A:
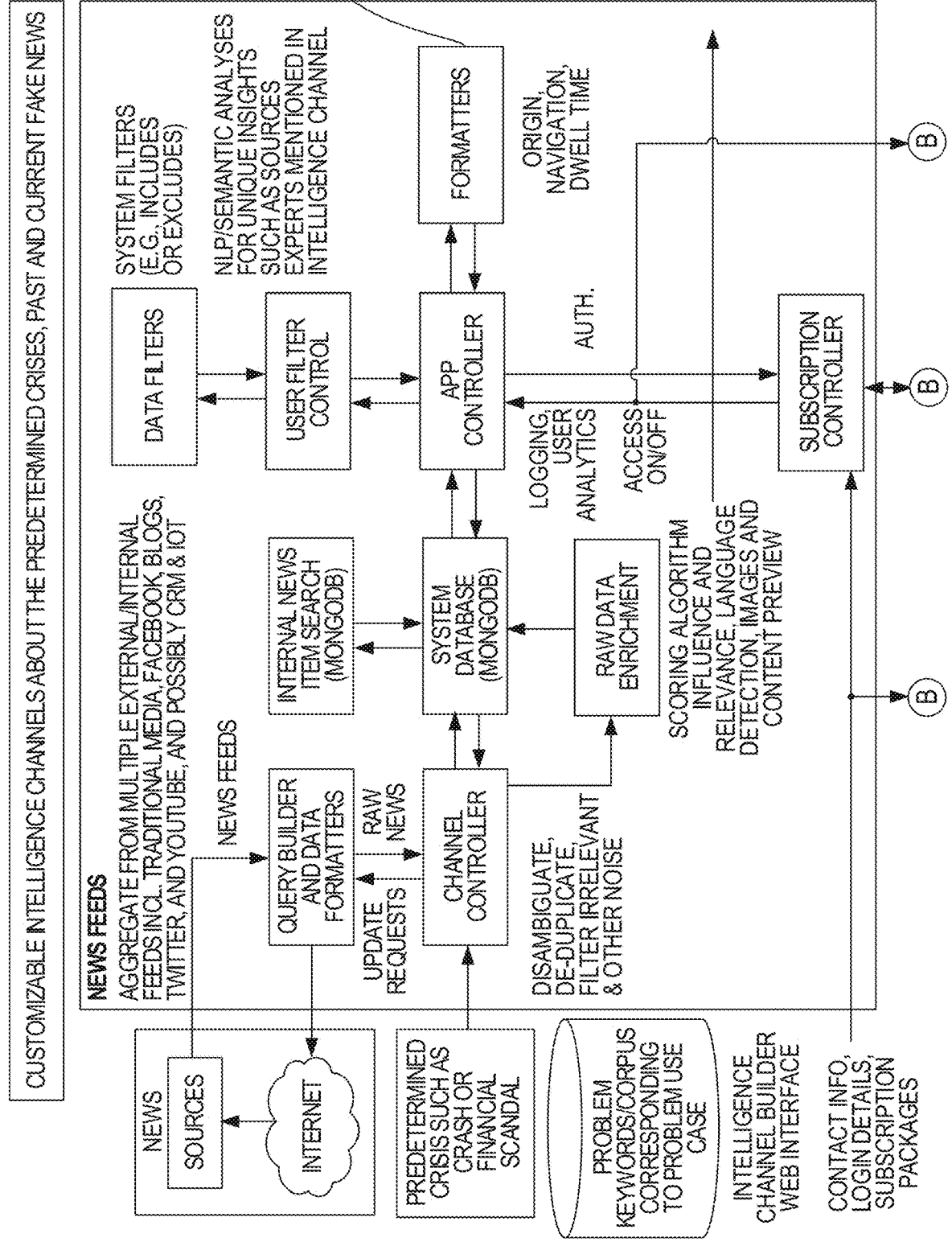
FIG. 15 is a sample block diagram of a system for containing disinformation spread using customizable intelligence channels in a sample embodiment.
Figure 15B:
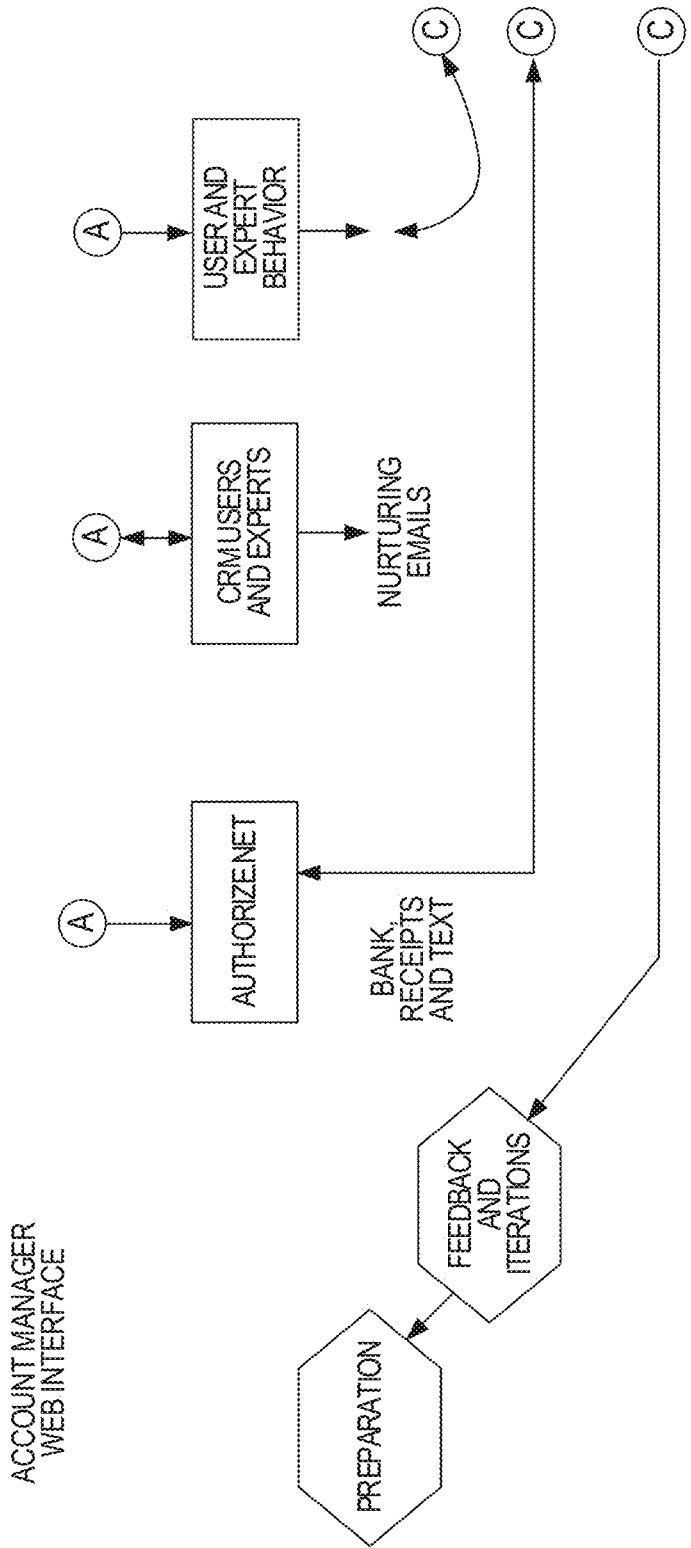
Figure 15C:
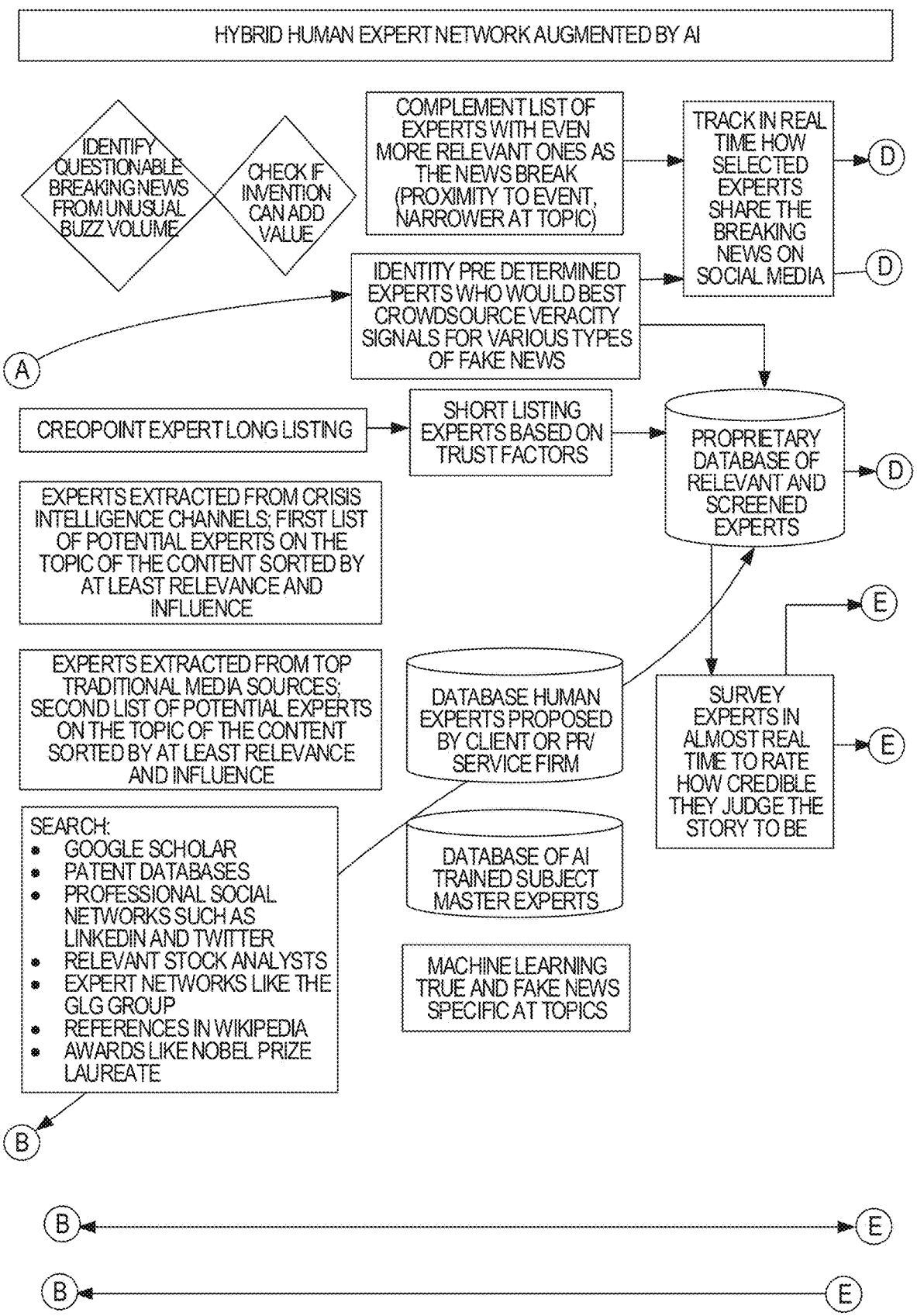
Figure 15D:
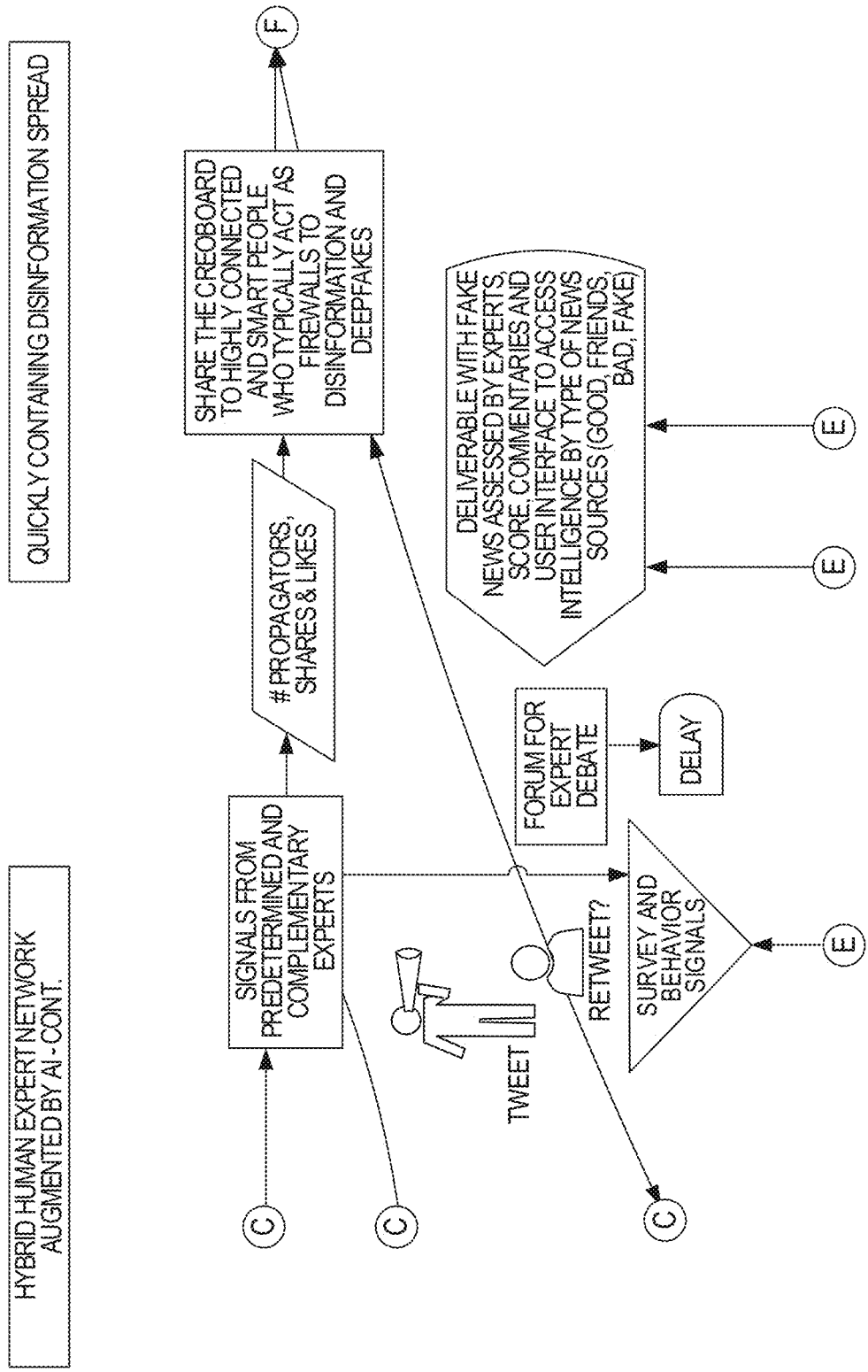
Figure 15E:
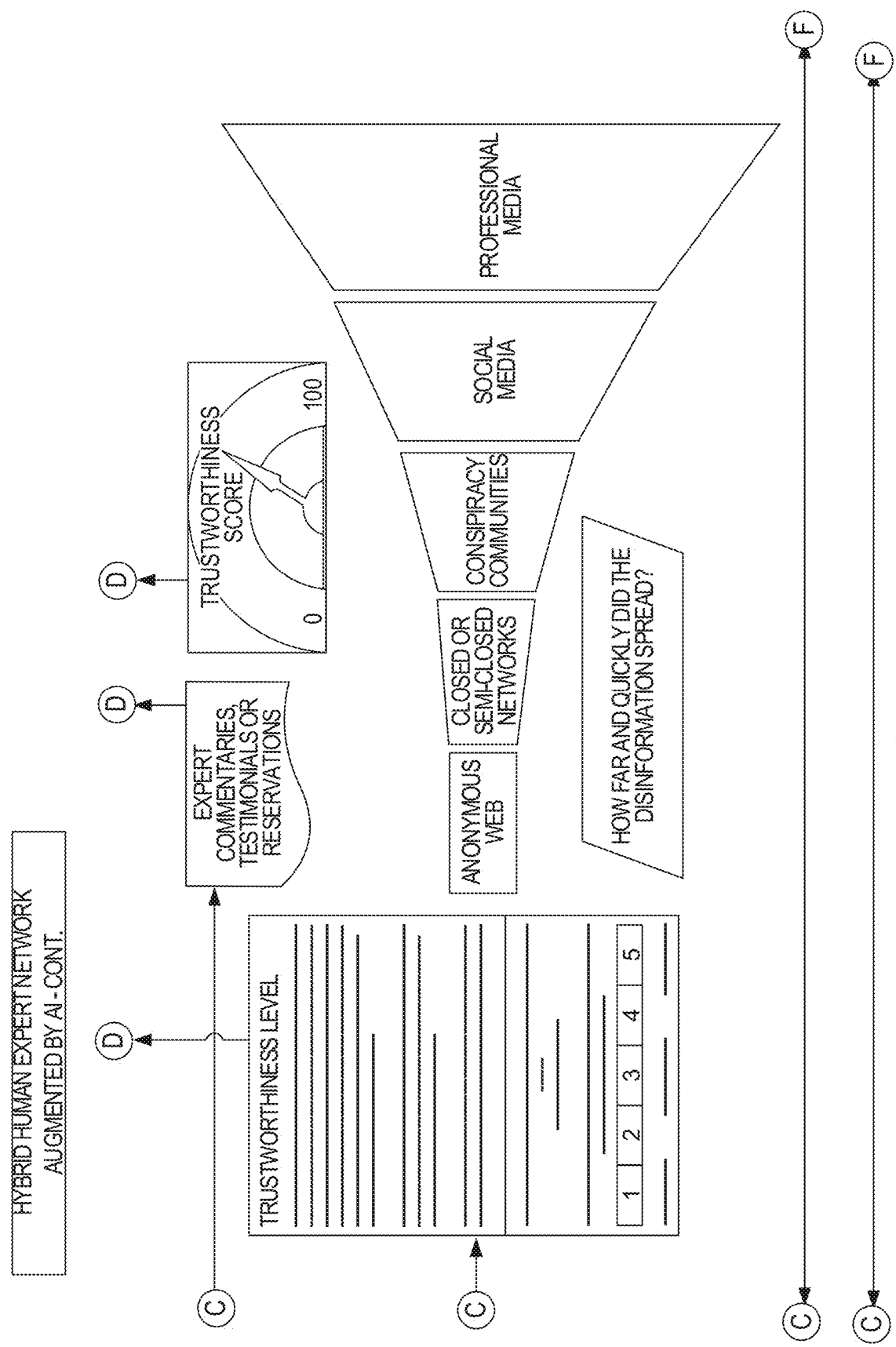
Figure 15F:
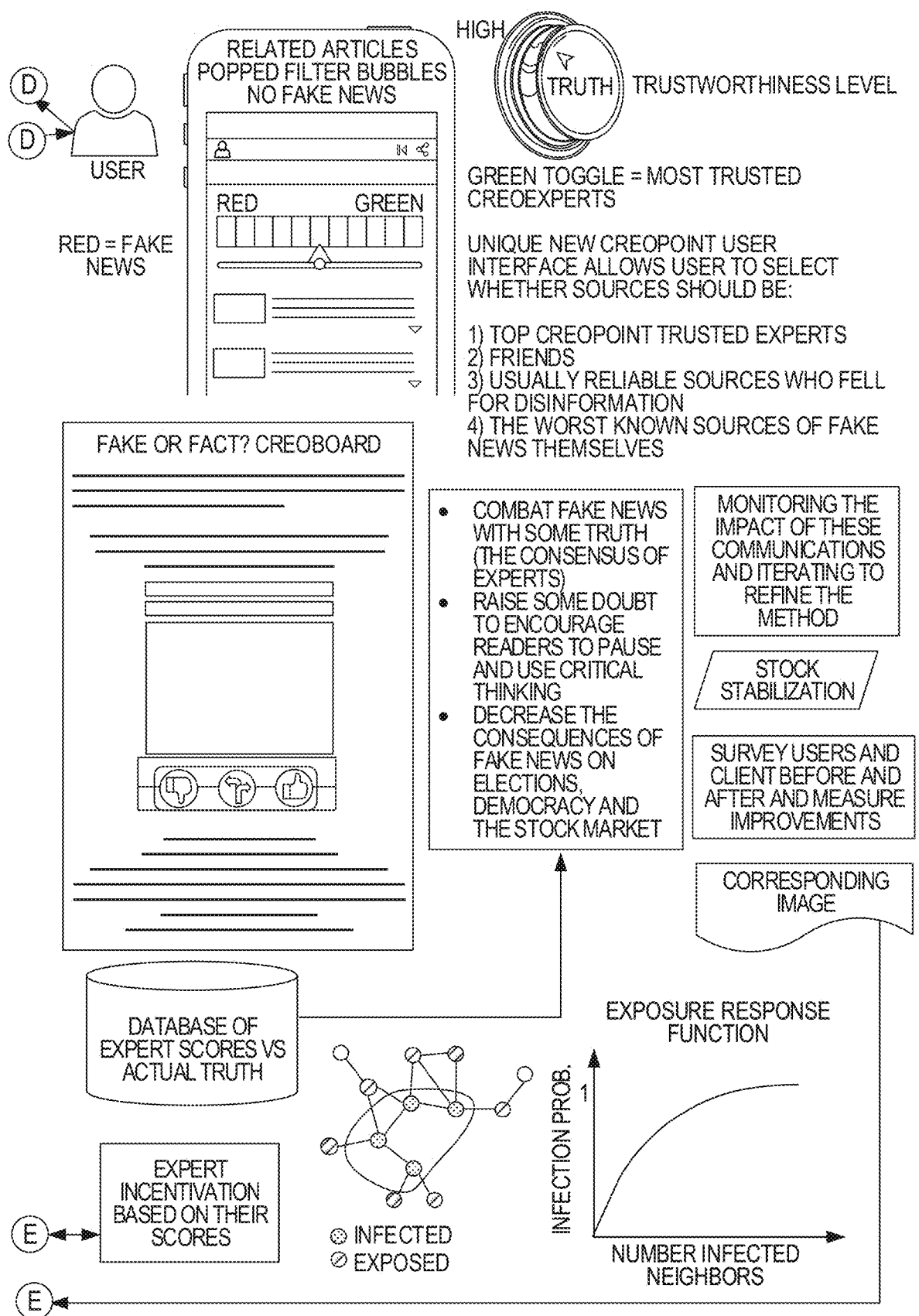

FIG. 14 is a block diagram of an example device 220 that may be utilized to generate and/or implement an intelligence channel as described herein. The device 220 may comprise and/or be incorporated into any appropriate device, examples of which may include, a mobile device, a mobile communications device, a cellular phone, a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a Walkman, etc.), a portable navigation device (e.g., GPS compatible device, A-GPS compatible device, etc.), or a combination thereof. The device 220 can include devices that are not typically thought of as portable, such as, for example, a public computing device, a navigation device installed in-vehicle, a set top box, or the like. The mobile device 220 can include non-conventional computing devices, such as, for example, a kitchen appliance, a motor vehicle control (e.g., steering wheel), etc., or the like. As evident from the herein description device 220 is not to be construed as software per se.

The device 220 may include any appropriate device, mechanism, software, and/or hardware for facilitating and/or implementing an intelligence channel as described herein. In an example embodiment, the ability to generate and/or implement an intelligence channel is a feature of the device 220 that may be turned on and off. Thus, in an example embodiment, an owner and/or user of the device 220 may opt-in or opt-out of this capability.

In an example embodiment, the device 220 may comprise a processor and memory coupled to the processor. The memory may comprise executable instructions that when executed by the processor cause the processor to effectuate operations associated with an intelligence channel as described herein.

In an example configuration, the device 220 may comprise a processing portion 222, a memory portion 224, an input/output portion 226, and a user interface (UI) portion 228. Each portion of the device 220 may comprise circuitry for performing functions associated with each respective portion. Thus, each portion may comprise hardware, or a combination of hardware and software. Accordingly, each portion of the device 220 is not to be construed as software per se. That is, processing portion 222 is not to be construed as software per se. Memory portion 224 is not to be construed as software per se. Input/output portion 226 is not to be construed as software per se. And user interface portion 228 is not to be construed as software per se. Each portion of device 220 may comprise any appropriate configuration of hardware and software as would be ascertainable by those of skill in the art to perform respective functions of an intelligence channel as described herein. It is emphasized that the block diagram depiction of device 220 is exemplary and not intended to imply a specific implementation and/or configuration. For example, in an example configuration, the device 220 may comprise a cellular communications technology and the processing portion 222 and/or the memory portion 224 may be implemented, in part or in total, on a subscriber identity module (SIM) of the device 220. In another example configuration, the device 220 may comprise a laptop computer and/or tablet device (laptop/tablet). The laptop/tablet may include a SIM, and various portions of the processing portion 222 and/or the memory portion 224 may be implemented on the SIM, on the laptop/tablet other than the SIM, or any combination thereof.

The processing portion 222, memory portion 224, and input/output portion 226 may be coupled together to allow communications therebetween. In various embodiments, the input/output portion 226 may comprise a receiver of the device 220, a transmitter of the device 220, or a combination thereof. The input/output portion 226 may be capable of receiving and/or providing information pertaining to an intelligence channel as described herein. In various configurations, the input/output portion 226 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or any appropriate combination thereof.

The processing portion 222 may be capable of performing functions pertaining to an intelligence channel as described herein. In a basic configuration, the device 220 may include at least one memory portion 224. The memory portion 224 may comprise a storage medium having a concrete, tangible, physical structure. Thus, the memory portion 224, as well as any computer-readable storage medium described herein, is not to be construed as a transient signal. Further, the memory portion 224, as well as any computer-readable storage medium described herein, is not to be construed as a propagating signal. The memory portion 224, as well as any computer-readable storage medium described herein, is to be construed as an article of manufacture. The memory portion 224 may store any information utilized in conjunction with an intelligence channel as described herein. Depending upon the exact configuration and type of processor, the memory portion 224 may be volatile (such as some types of RAM), non-volatile (such as ROM, flash memory, etc.), or a combination thereof. The mobile device 220 may include additional storage (e.g., removable storage and/or non-removable storage) such as, for example, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile device 220.

The device 220 also may contain a user interface (UI) portion 228 allowing a user to communicate with the device 220. The UI portion 228 may be capable of rendering any information utilized in conjunction with an intelligence channel as described herein. The UI portion 228 may provide the ability to control the device 220, via, for example, buttons, soft keys, voice actuated controls, a touch screen, movement of the mobile device 220, visual cues (e.g., moving a hand in front of a camera on the mobile device 220), or the like. The UI portion 228 may provide visual information (e.g., via a display), audio information (e.g., via speaker), mechanically (e.g., via a vibrating mechanism), or a combination thereof. In various configurations, the UI portion 228 may comprise a display, a touch screen, a keyboard, an accelerometer, a motion detector, a speaker, a microphone, a camera, a tilt sensor, or any combination thereof. The UI portion 228 may comprise means for inputting biometric information, such as, for example, fingerprint information, retinal information, voice information, and/or facial characteristic information.

The UI portion 228 may include a display for displaying multimedia such as, for example, application graphical user interfaces (GUIs), text, images, video, telephony functions such as Caller ID data, setup functions, menus, music, metadata, messages, wallpaper, graphics, Internet content, device status, preferences settings, map and location data, routes and other directions, points of interest (POI), and the like.

In some embodiments, the UI portion may comprise a user interface (UI) application. The UI application may interface with a client or operating system (OS) to, for example, facilitate user interaction with device functionality and data. The UI application may aid a user in entering message content, viewing received messages, answering/initiating calls, entering/deleting data, entering and setting user IDs and passwords, configuring settings, manipulating content and/or settings, interacting with other applications, or the like, and may aid the user in inputting selections associated with an intelligence channel as described herein.

In accordance with the herein description of intelligence channels, an intelligence channel may be utilized in various applications. In various example embodiments, an intelligence channel may comprise compilations or fusions of related topics into a single channel. The intelligence channel may comprise channels for a topic as a single "thought" channel encompassing a variety of opinions and ideas. An intelligence channel may comprise a "pack" of individual intelligence channels directed to topics in selected market segments, regions, and other areas of interest. The mechanisms for interfacing with intelligence channels may provide a user to search within an intelligence channel for subtopics of interest, and to generate intelligence channels directed to the subtopics. A user may define a private intelligence channel that is available to only designated recipients. Locations, addresses, or the like, from information provided via an intelligence channel may be automatically inserted into a map (e.g., GOOGLE MAPS, geocoding utilities, etc.). Automatic translation of information provided via an intelligence channel may be accomplished. A word cloud display may be generated from information provided via an intelligence channel for use in a presentation, display, posting, or the like. In an example embodiment, a word cloud display is a visualization of the frequency of use of the words in a document, in which the size of the font for each word is related to its frequency or use. Words may be scrambled and may be shown as in a cloud.

In various example embodiments, use of an intelligence channel may be monitored to observe user behavior to predict events that may be of interest to a user, to provide alerts that may be applicable to a user, to provide information of interest to a user, to generate a custom intelligence channel, to combine intelligence channels, or any appropriate combination thereof. A data feed may be provided (e.g., RSS, or other data feeds) comprising user requested intelligence channels for use on websites and displays, and potentially customized to employ user graphic formats, and user system feed requirements. Information provided via an intelligence channel may be viewed via any appropriate mechanism, such as, for example, offline viewing, standard readers, GOOGLE READER, KINDLE, or the like.

Containing Disinformation Spread Using Customizable Intelligence Channels

As will be explained below, techniques are provided for rating the veracity of content distributed via digital communications sources by creating an ontology and selecting keywords for a topic of the content and creating customizable intelligence channels of the type described above to identify and extract from the customizable intelligence channel a first list of potential experts on the topic sorted by at least relevance and influence. The list of experts may be supplemented by mining trusted media sources to extract a second list of potential experts or witnesses on the topic. The first and second lists of potential experts are evaluated as a function of at least one of professionalism, reliability, proximity, experience, responsiveness, and lack of self-interest in the topic to identify a short list of experts. The content is provided to the short list of experts for evaluation. The experts are then polled about the veracity of the content to create a veracity score for delivery with the content. By promptly evaluating and delivering the content with the veracity score as well as "fake news" warnings and metrics relating to the content as appropriate, the spread of disinformation may be contained.

Several features of sample embodiments are described below in connection with features illustrated in FIG. 15. It will be appreciated that each of these features forms a part of a system and process for containing the spread of disinformation in the sample embodiments.

Feature 1: Providing an Interactive Interface that Aggregates and Summarizes News Content Veracity Signals into a CREOs Core with Possible Fake News Warnings and Rebuttals A hyperlink to a custom-built web page called CREOBoard (see, for example, FIG. 16) is created that includes the following:

1. An introduction summarizing benefits;
2. The initial headline (e.g., "Robot was killed by a self-driving Tesla car"—CES Jan. 6, 2019 with hyperlink) from the breaking news story with photo or video (including possibly deepfake);
3. A color-coded warning (red: proceed with caution, orange: undecided, green: OK, with accommodations for color blind persons by, for example, including some blue in the green light); however, a 3-color sign may be replaced by a large warning if/when enough experts opine (e.g., 80% of the experts feel there is an 80% or more chance that the presented new is fake news);
4. A new measure such as "Unlikely fake based on a CREOscore of 86 on a scale of 1-100" (the actual wording may be A/B tested by experts);
5. The corresponding CREOscore color coded chart (being updated in near real time);
6. Background about the originating media, including for example whether it is a site that comes with a clear satire disclaimer;
7. Learn how: Hyperlinks are provided to frequently asked questions including the methodology applied;
8. Selected rebuttals from a few credible experts debunking the falsehood, or testimonials from witnesses on the scene or others who confirm the claim;
9. An intelligence channel with unique interface/toggle "separating the wheat from the chaff" where rather than a slider from myCREOpicks to All Sources, a user could conveniently switch between 4 positions to observe various modes of news reports. "The good", "the friendly", "the bad", and "the ugly" would be isolated in different news feeds derived from:
    a) Reliable experts who provided original quality content;
    b) My friends (where the user could toggle to enable duplicates to show the filter bubble);
    c) Generally reliable sources who were fooled by the fake news; and
    d) Known fake news sources and other bad actors (e.g., extremist sites, Russian bots, Macedonian teenagers, existence of long dormant accounts suddenly activated, accounts posting similar content and/or using same hashtags).
10. An icon could also be used to graphically show how progressively fake the news stories are.

As soon as the CREOpoint system is activated it displays information disclosing when the results will be ready (e.g., show an image that 14 out of 30 minutes of wait time has elapsed until results will be reported) and the percentage of experts who have been asked or weighed in (e.g., with a spinning Mac type wheel of death to show experts are at work).

To encourage persons who know something to say something, crowdsourced input is provided from users that would have to provide their LinkedIn profile as initial validation (e.g., click to a simple form to be filled out or access confidential encrypted communications channel).

Preliminary information about the source of the news story also may be provided from credible press association directories. If no Wikipedia page is available for the topic of the news story, this could be useful as a red flag. Depending on the topic (e.g., vaccine hesitancy, one of the top 10 threats to global health per the World Health Organization), especially if relevant to possibly "real world harm," a link to a corresponding Encyclopedia Britannica entry may provide initial insights to users (including for example fraudulent claims that have been falsely made about the supposed dangers of the HPV cervical cancer or MMR measles, mumps and rubella vaccines). Other links to the source (e.g., the news source Facebook page and Twitter handle) are added so that the user can also access and rate the quality of their other content.

A temporary warning "Rated false by fact checking organizations" with top worst fake news stories about that industry sector may be pre-populated into the interface. For example, assuming the CREOpoint system was activated further to the "news" breaking Sep. 5, 2018 that "Michael Jordan Resigns From The Board At Nike—Takes 'Air Jordan's With Him," while predetermined experts are contacted, the interface displays proven fake news. Such articles would have included "Nike CEO Resigns After Massive Kaepernick Blunder," "Nike Stock Drops 260 Points In A Single Day Thanks To Colin Kaepernick," "Florida Man Accidentally Burns Home Down After Lighting Nike Shoes On Fire In Protest Of Nike's Colin Kaepernick Ad," "Federal Government Cancels $80 Million Nike Contract," "Nike Fires Colin Kaepernick After Arrest." An icon could be selected to graphically show how quickly these fake news stories spread.

From curation of the CREOpoint Intelligence Channel, the CREOpoint system curates top real news about the topic or client (e.g., Nike) such as the following story from Forbes "Continued success of Nike's Jordan Brand has pushed Michael Jordan's net worth to $1.65B." As soon as available, the CREOpoint system would also post rebuttals from such sources as the Associated Press https://www.apnews.com/2bb2b4a6a4f843a17b0251bc61ad5e. It is expected the CREOpoint system activated immediately would have created an immediate warning and decreased the close to one million Facebook engagements initiated by a known online satire site about Michael Jordan parting ways with Nike.

From a link making a possible fake statement, the user may scroll down or open anew page with corresponding data and the following intro:

So, "who ya gonna trust?"

1. Known fake news sources and bad actors or others with similar characteristics, i.e., remote from the subject matter, unknown in field, etc.;
2. Your friends/filter bubble;
3. Generally reliable sources who have been fooled by fake news; and
4. Independent experts with high reliability scores.

Figure 17:
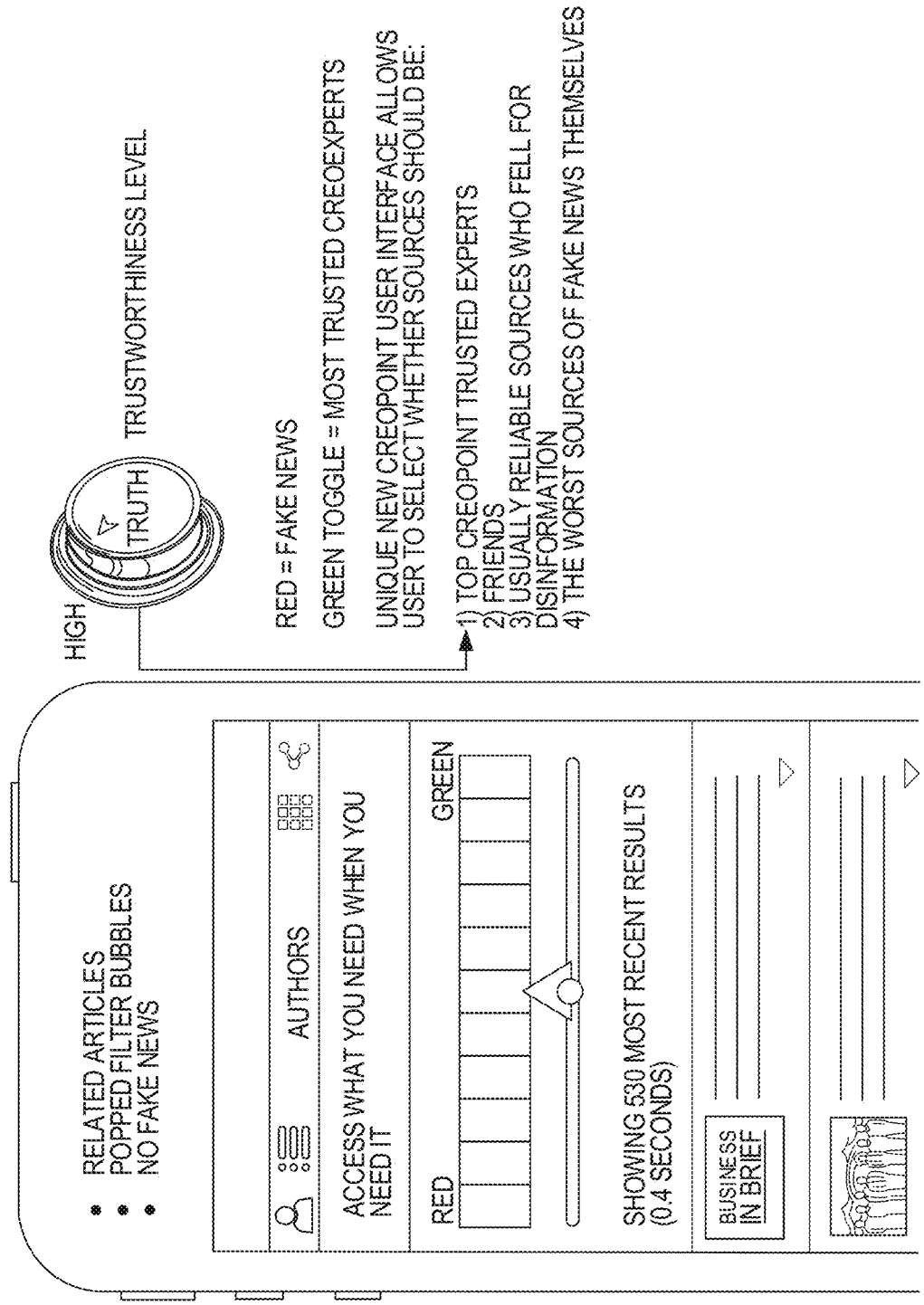
FIG. 17 illustrates a sample interface with an associated toggle for allowing users to select their desired types of news sources.

This is followed by a customized intelligence channel with unique interface/4 position toggle rather than the slider from myCREOpicks to All Sources (see, for example, FIG. 17).

To better inform users by giving them more context on the information they see, users are provided additional information, by sharing more details on the articles and quality of the sources with various levels of credibility.

A user could conveniently switch among the following 4 positions to observe various concurrent "realities" from:

1. The ugly
2. The bad
3. The friendly
4. The good

Case Study: Autonomous Vehicles Safety and Trust

On Jan. 7, 2019, a group of automated vehicle developers, suppliers, and advocacy groups announced the Partnership for Automated Vehicle Education (PAVE), a new coalition for public education on automated vehicles as follows: "Media interest is picking up, public attention is dialing in, and people are, understandably, a bit confused . . . . There's a lot misinformation floating around, and it's on all of us, especially this group here, to help correct that," said PAVE member GM's Kyle Vogt, chief technology officer at the autonomous vehicle developer Cruise. The CREOpoint system described herein makes it possible to access experts to take action to debunk misinformation. For example, assuming PAVE, GM, Allianz (who insures the autonomous industry), or Tesla were clients, the CREOpoint system described herein would be activated to prevent the fake news from spreading. A headline published during CES on Jan. 6, 2019, was actually a PR stunt, and it had an impact on trusted companies. From such as statement, the following categories of news stories followed:

1. The fake/ugly

In fact, the CREOpoint system would have detected in near real-time (after noise filtering described above) that the breaking "news" was a Russian disinformation/PR stunt from a robot company on Jan. 6, 2019. https://promo-bot.ru/press-releases/tesla-sbila-robota-promobot-v-las-vegase/

2. The bad

The Verge was not fooled by the story: (https://twitter.com/promobot/status/1082367428330434560), but many other news outlets published this as news on Jan. 7, 2019, including:

The Daily Mail (noting the possible PR stunt but still publishing details) the next day on Jan. 7, 2019: https://www.dailymail.co.uk/sciencetech/article-6566655/Oops-Autonomous-robot-struck-killed-self-driving-Tesla-Las-Vegas-ahead-CES.html The Washington Times (with the wrong picture of a destroyed Tesla): https://www.washingtontimes.com/news/2019/jan/8/tesla-self-driving-car-mows-down-kills-robot-law-v/

TheDaily Show on Jan. 8, 2019: https://www.facebook.com/thedailyshow/videos/robot-vs-self-driving-tesla/547635175753232

The Consumer Editor of USA Today shared the press release as is: https://twitter.com/mmaltaisLA/status/1082380540584517632

The Las Vegas Post (Las Vegas news you can trust!): https://thevegaspost.com/watch-an-autonomous-robot-get-hit-by-a-self-driving-tesla-at-ces/

AutoWeek: https://autoweek.com/article/car-life/autonomous-tesla-s-kills-robot-hit-and-run-las-vegas-ces-show "The AV and robot wars of 2019 have begun"

3. The friendly

Ideally, the face of the friend, group, or page who initially shared the post is provided noting that "friends" shared way beyond "the end of times is upon us": https://twitter.com/search?f=tweets&q=tesla%20robot%20CES&src=typd https://www.facebook.com/search/top/?q=ces%20tesla%20robot&epa=SEARCH BOX https://www.linkedin.com/search/results/content/?keywords=CES%20Tesla%20R obot&origin=SWITCH_SEARCH_VERTICAL 4. The good (unfortunately Jan. 8, 2019, 2 days after the press release):

Derek Kessler, Managing Editor at Mobile Nations: https://teslamotorsclub.com/tmc/threads/tesla-hits-robot-in-vegas.139856/

Wired: https://www.wired.com/story/tesla-promobot-pave-self-driving-education

Electrek: https://electrek.co/2019/01/08/tesla-crash-robot-pr-stunt-media

Polygraph: https:www.polygraph.info/a/did-self-driving-tesla-destroy-a-robot-fact-check/29705179.html Electrive: https://twitter.com/ElectriveCom/status/1085467176042221568

Feature 2: Pre-Determining Experts who Could Best Crowd Source Veracity Signals

The first step is to aggregate a long list of prospective experts based on their recognition and skills. The objective is to constantly improve the quality of the veracity signals by including the CREOpoint Expert Trust Ratings (CREOExpert Rating), which will only be as effective as the experts selected (garbage in, garbage out), the level of their engagement, and how exhaustive and diversified the list is.

Experts are selected for a set of high potential crisis situations. A number of relevant use cases are preselected (e.g., autonomous vehicle crashes or other fatality from an accident, financial scandal, sexual harassment by executives, data breaches, etc.).

Next, an ontology and most used keywords are built for each set of crisis situations. For example, in the case of autonomous vehicle "crashes" at CES leading to fake news that implies AI will kill us all, see: https://www.digitaltrends.com/cars/self-driving-bus-crash-vegas-account https://www.wired.com/story/tesla-promobot-pave-self-driving-education The CREOpoint system extracts from the most relevant articles words such as ("self-driving OR autonomous) AND (Tesla OR Uber Lyft OR Cruise OR Ford OR NAVYA OR Car etc.) AND (crash OR hit OR struck OR victim OR injured OR killed OR fatality OR Accident).

Sources of experts for the selected topic are mined by creating a CREOpoint channel for each possible crisis situation and extracting corresponding experts. Corresponding CREOpoint customizable real-time intelligence channels and natural language processing (NLP) processes are used to identify authors of traditional and social media news items sorted by relevance, influence and when they last covered this topic, and experts quoted in articles from the authors of these most relevant and influent niche sources (e.g., Ars Technica). Top media sources generally accepted as quoting real experts (rather than opinionated TV news show commentators) are also leveraged. The CREOpoint system starts by mining trusted media sources such as AFP, AP, Axios, BBC, Bloomberg, CBS News, CIO, Christian Science Monitor, Le Monde, The Economist, The Guardian, Information Week, The New York Times, The Wall Street Journal (US, Europe, and Asia), The Washington Post, NPR, Politico, Propublica, and Reuters (not Reuters Plus sponsored content). Other sources could be added based on the reliability of experts they quote. The objective is to identify the relevant experts the top media sources quote the most. For example, using natural language processing (NLP), the CREOpoint system would have pre-identified experts quoted in top publications during previously reported serious crashes. Examples include:
Tesla:
Bryan Walker Smith, a University of South Carolina law professor who studies self-driving cars and is quoted in: www.bloomberg.com/news/articles/2018-03-31/tesla-says-drivers-s-hands-weren-t-on-wheel-at-time-of-accident;

National Transportation Safety Board agency spokesman Chris O'Neil (www.bbc.com/news/technology-43617752);
Uber:
Anthony Foxx, who served as US Secretary of Transportation under former President Barack Obama quoted in https://bbc.com/news/business-43459156;

Carla Bailo, president of the Center for Automotive Research (also in www.bbc.com/news/business-43459156); and Michael Bennett, an associate research professor at Arizona State University (quoted in https://www.nytimes.com/2018/03/19/technology/uber-driverless-fatality.html?module=inline).

To extract names, organizations and quotes from articles, the following tools could be used:
https:www.diffbot.com/products/automatic/article
http://www.opencalais.com/opencalais-demo The CREOpoint system also mines other searchable media sources to extract expert information from such sources as:
1. Google Scholar
2. Patent databases
3. Professional social networks such as LinkedIn and Twitter
4. Relevant stock analysts
5. Expert networks like the GLG Group
6. References in Wikipedia
7. Awards like Nobel Prize laureates For example Google Scholar will help identify the most cited Professors such as: https://scholar.google.com/scholar?q=%22Autonomous+car+crash%22+&hl=en&as_sdt=0.9

Starting from the top, the first search item identifies the author/expert Alexander Herd, and links to 5 people citing the article. The CREOpoint system is set up to continue the discovery process by, for example, identifying one of the experts citing Alexander Herd as Sarah J Fox in Georgetown.edu "Planning for density in a driverless world" by S J Fox—NEULJ, 2017—HeinOnline. This paper was cited by 8 people, so she would also be identified as an expert and exported to a database.

Other sources mentioned above are searchable such as Microsoft LinkedIn and Sales Navigator, which offer filtering by keyword, profession, industry, location (e.g., https://www.linkedin.com/in/holden-benon-146a1a58). These sources enable credentialization of experts and their networks of influence.

Clients or their service providers (such as public relations, government relations, or technology consulting firm) also could provide a list of known experts within their networks to expand the expert population. They would not have to meet the short-listing screening criteria (defined below) to be polled, except lack of self-interest.

The CREOpoint system may supplement the results with fact checkers and experts in fighting fake content (e.g., "news," fake "fact-checks" discrediting authentic news stories, doctored photos and deepfake videos among other fakes). A database of the most frequently quoted experts on key topics including, for example, cybersecurity and deepfakes (artificial intelligence has allowed malicious actors to make convincingly fake videos of key politicians, distorting the truth and raising issues of digital impersonation spreading online). With changing expectations of the public, and the potential for legislation and greater regulation of cybersecurity and weaponized disinformation on social media, deepfakes may need to be actively monitored and taken down by social networks even faster than fake news. CREOpoint envisions quickly polling deepfakes experts so they can provide a quick signal and an ability to flag these videos in areas beyond cyberdefense. Imagine, for example, the stakes given a fake video of a limping New England Patriots quarterback minutes before the close of betting on the Super Bowl, or pornographic videos that realistically superimpose the face of his celebrity model wife when the spotlight is on the red carpet events at the Oscars or the Cannes Film Festival.

The results may also be supplemented with a list of AI trained subject matter expert machines. In addition to human expertise, it is anticipated that machine learning will help AI experts do well in some subject matter areas, so the CREOpoint system also identifies and selects such situations where there is sufficient training data to provide useful responses. It is possible that some of these algorithms would be black boxes with no way to check for bias, so these expert machines would skip the short-listing filters below, but their CREOExpert Trust ratings would be computed to see how they are doing over time.

The resulting list of experts is exported to a database with fields including, for example, first name, last name, organization, title, profession, industry, location, keywords, relevance (% of times they author on topic), influence, # times quoted in last year, last quoted, social media metrics, CREOTrust Rating (see below), topics, LinkedIn skills, universities, degrees, associations, corporate affiliations, noted possible conflicts, tags with crisis situations where their expertise is relevant and the source of the name (e.g., quote in Bloomberg, skill in LinkedIn, client). Regarding their CREOpoint Reliability score, sources who reported a news story that was ultimately found to be fake, or merely a public relations or stock manipulation stunt, would see their CREOpoint Reliability score penalized, and be red flagged as spreaders of fake news. Note that focusing on only rating sources with a nutrition or other public labels is not enough and could be misleading and offer a false sense of security. For example, when Bloomberg News unknowingly published a fake press release in November, 2016 about a financial scandal allegedly affecting Vinci, the market capitalization of the $40Bn European construction company declined by 18%. Reputable French news agency AFP also apologized for a mistake in reporting the death of Martin Bouygues, the CEO of another large multinational. The accuracy of this rating would improve based on validated facts over a significant time (possibly with uncertainty percentage).

The CREOpoint system described herein also includes a rating mechanism to rate and rank experts based on how they are trusted. The CREOExpert Trust Rating is a function of Professionalism, Reliability, Proximity, Experience, Responsiveness and Lack of Self Interest, where:
1. Professionalism=qualities that characterize an expert related to his or her mastery of specialized knowledge and competence, and deep personal commitment to develop and improve their skills and credentials;
2. Reliability=degree of consistency of the expert's prediction versus what turns out to be the truth;
3. Proximity=closeness in space, time, or relationship;
4. Experience=the process of getting knowledge or skill from practical contact with and observation of subject matter facts or events;
5. Responsiveness=how quickly an expert reacts to question(s) posed by the CREOpoint system; and
6. Lack of self-interest=focus on other people and problem at hand, rather than primarily on his or her own interests.

The weights assigned to each factor are adjusted over time based on the use case and CREOpoint system performance. For example, some experts with self-interest have the ability to make objective judgements. At times experience and responsiveness could negatively correlate. Also, a reporter with 20 years of experience covering automobiles who responds promptly does not make him or her an expert in breaking fake news about how a discovery in new battery science affects Tesla.

The CREOpoint system described herein improves the rating instruments and weight for each of these screening criteria over time since poorly designed rating instruments may be useless or actually do more harm than good (see A. R. Jadad and A. Gagliardi, "Rating health information on the Internet: Navigating to knowledge or to Babel?", JAMA, 279 (1998), pp. 611-4.).

Professionalism Filter

For an extra layer of professionalism to increase its effectiveness and completeness, the CREOpoint system mines resumes and other online sources to add further fields to the expert database. These include:

a. Top awards (e.g., Nobel prize laureate)
b. Patent offices (e.g., # of patents granted or applied for)
c. Top universities (e.g., MIT, Penn State or SUPAERO)
d. Top associations (e.g., IEEE, IPCC, USGBC)
e. Research papers and citations in top respected peer-reviewed scientific publications in the field (e.g., see https://www.scimagojr.com/journalrank.php but not predatory or hijacked ones)
f. Top think tanks
g. Board memberships
h. Social media recognitions (e.g., LinkedIn influencer, verified Twitter handle)
i. For journalists one might look at how well they meet existing or future standards Reliability Filter The CREOpoint system starts with sources whose predictions have been consistently accurate. Rather than search online only for examples where prospective experts were clearly wrong, for real time due diligence the CREOpoint system creates and leverages a customizable intelligence channel about reliability. The search query for this Intelligence Channel is perfected over time to remove false positives (such as the expert himself or herself using these words) and include key words indicating negative qualities such as "wrong, fake, lie, fail, failed, negative, screwed up, over confident, biased, misleading, unfounded, incorrect, mistaken, careless, inept, erroneous, inaccurate, invalid, untrue, fallacious, false, mistaken, in error, incorrect, fallacious, untrue, unsound, prejudiced, erratic, deceiving, ungrounded, off target" etc. The CREOpoint system then searches for expert name matches that would flag an expert in a long list database whom may have been reported wrong or have been associated with significant controversy. These names would be subjected to further human review and curation, with contentious experts not making the list.

Individual experts on the long list are asked to vote on the probability of a chosen news story being fake. A proprietary dynamic reliability score is then generated based on how their predictions fared versus the consensus of experts and the reality.

Proximity Filter

Proximity is defined as closeness in space, time, or relationship. Proximity information is collected and used as a factor in evaluating the extraction of the experts:
1. Home location (extracted from LinkedIn for example).
2. Location at the time of the crisis incident (extracted from Twitter if available depending on location privacy setting, otherwise possibly from early reporting just after the crisis breaks). For example, one can assume a UK-based soccer referee or security manager working at the 2022 FIFA World Cup in Qatar during an incident may be more likely to be credible and available than someone with the same professionalism but located on the other side of the world and with less access to eye witnesses.
3. The time zone is also noted in the database since availability to respond quickly to a crisis/poll is key.
4. Friends and family relationships (e.g., someone closer to a VIP like Michael Jordan or Martin Bouyguesis more likely to know how fake the rumor about that person is).

Referring to the previous example, one can assume an expert with a home base in Silicon Valley and attending CES during the fake Tesla crash may be more likely to be credible and available than someone with the same professionalism but located on the other side of the world and with less access to eye witnesses.

Experience Filter

Experience is the process of acquiring knowledge or skill from practical contact with and observation of subject matter facts or events. This factor is less important and will have a lower weight in the weighting formula. As this information may also be of interest to people questioning the results, the CREOpoint system nevertheless extracts the number of years of experience since last year of university (e.g., direct from LinkedIn), whether the person is being quoted in the press or journals, directorships in associations, and the like. The CREOpoint system may also take into account the time this expert has been in the database (account age), assuming that an expert who has been consulted a number of times would have seen its reliability score become a better indicator.

Responsiveness

The expert database further includes whether the expert indicates they are prepared to respond quickly if and when polled as well as how quickly the expert actually reacts to a polling question(s) after they receive it, or at least the promptness of their response to the initial polling question. The CREOpoint system attempts to take into account where they are when the question is sent (they might be sleeping or in a plane). Tools that could be used with expert permission include Twitter location, Snap's Zen.ly and possibly Internet of Things (IOT) health sensors detecting sleep.

Avoiding Conflicts of Interest

Conflicts of interest are minimized by short listing experts with high integrity who would focus on other people and the problem at hand, rather than primarily on their own interests. For example, note the backlash when Elon Musk, concerned and frustrated with sensational negative reviews driving $TSLA's market value down, proposed PRAVDA, his own "Yelp for Journalists."

Also, rather than search online once for examples where prospective experts were clearly self-interested, for real time due diligence, the CREOpoint system creates and leverages a customizable intelligence channel about independence. The search query for this Intelligence Channel is perfected over time, and, for the expert population, individual names are matched to such key words as "activism, activist, aligned, accused, bias, biased, ideologies, conflict, conflicted, censured, guilty, delinquent, felonious, dishonest, dishonorable, corrupt, violation, infringement, infraction, improper, incongruous, transparency, indicted, convicted, suspect, confidence, honesty, dishonesty, integrity, immoral, unlawful values, autonomy, independence, ethics, belligerent, blame, accountable, objectivity, funding sources, disclosures, and promotional talks." For example, the CREOpoint system may identify and reduce the reliance on any potentially interested or compromised experts, such as doctors known or credibly accused of being paid by medical device or pharmaceutical companies, in connection with any related content.

The CREOpoint system may then search for expert name matches that would flag that an expert in the long list database may have been reported to be associated with any of these qualities. These names may be subjected to further human review and curation, but if there is any doubt, individuals in the long list of experts would not make the short list. When people lose objectivity or become overly invested in their predictions, their judgement may be impaired—no matter how experienced or educated or intelligent they are.

Once the breaking news and the companies in question are known, the shortlisted experts would be required to:

1. Confirm they have no direct or indirect self-interest in their answer;
2. Decline to opine about matters pertaining to their current employer (whether public or private), government agency or any company where they are a major shareholder;
3. May not discuss his/her employer and confidential information concerning its relationship with a customer or supplier; and
4. Respond only to qualifying questions in the survey questionnaire when they do not have a financial interest for a company subject to a possible fake news item.

The CREOpoint system takes into account best practices. For example, the Good Housekeeping Institute (GHI) has been around for almost a century and has built a stellar reputation for independence despite the fact that many of Good Housekeeping advertisers apply for GHI accreditation. Consequently, the GHI Seal Of Approval is seen by consumers as valuable and authentic. In order to maintain GHI's independence (and the value of the GHI brand), Hearst strenuously upholds a wall between the GHI and GH's (and all other Hearst entity's) commercial and editorial teams and ensures that GHI operates as a separate, independent organization. For example, access to the GHI lab in New York is passcode restricted and by appointment only.

The CREOExperts may also be prepared to answer questions about perceived conflicts due to compensation for their participation in the program. If experts are indirectly paid by CREOpoint or its client company, it is expected that experts on both sides of the question will be compensated the same, so they are independent since their shared compensation is not linked to their opinion.

To decrease chances of experts lying and given the increase in wearables, cues to deception such as an elevated heart rate, verbal and textual cues (e.g., excessive quantity, reduced complexity) may be measured using IoT and AR/VR devices, with the prior consent of the expert involved.

The CREOpoint system may also leverage recent research including findings by Cornell University about two new approaches for developing classifier-based empirical trust-sensor models that specifically use electroencephalography and galvanic skin response measurements ("A Classification Model for Sensing Human Trust in Machines Using EEG and GSR" March 2018).

Information, fake or not, will evolve beyond real-life, via virtual technologies such as in AR/VR, 3D, and other immersive environments. Words with verbal cues should help, and the CREOpoint expert networks from around the world are likely to be able to collaborate more dynamically with better context.

Per "Behind the Stars: The Effects of User and Expert Reputation Ratings on Users' Belief in Fake News on Social Media" (Department of Operations and Decision Technologies, Indiana University, August 2018). "it is possible to erode people's trust in experts by labeling them as biased with an agenda. Hence, experts need to manage their reputation, and the entity proving the ratings must be judicious in choosing the experts." Using the CREOpoint system described herein, experts who have a consistent bias will see their reliability rankings drop as their predictions will likely tend to be consistently erring in a way that is systematic in one direction. The CREOpoint system identifies such bias by cataloging errors of experts to determine if these errors are systematic and therefore indicative of bias—indicating either prejudged thoughts or conflicts of interest—or random and therefore just incorrect without bias. It is understood that most experts build knowledge through a combination of education, specialization, problem solving, career development, experience, extensive investigations into past research, articles and practices and by evaluating current news sources and breaking stories based on sound facts, experience, and evidence.

Given that the experts are being asked for a quick "judgment call" based on their "educated guess" and without much time for their due diligence investigation in order to develop a quick News Veracity Score, the experts are likely to be subjected to their own biases. For instance, experts who believe that people are going to lose their jobs or die as a result of the advance of AI may be better at detecting fake news articles that praise AI in cars but may do poorly at detecting fake articles that are negative towards AI in cars. This is taken into account by the CREOpoint system as their reliability rankings would drop.

Feature 3: Preparing to Complement the Predetermined Expert List as Soon as the News Breaks The CREOpoint system may expand the list of predetermined experts based their proximity to items extracted from the breaking story. For example:
BREAKING NEWS—TF1 France Television: "Tragic fire in a crucial SNCF high-voltage substation near Paris expected to bring weekend railway traffic at Montparnasse Station to a standstill shortly. Investigators believe the fire was started by a 53-year-old SNCF conductor (photo) who was found dead near the scene. No suicide note has been found yet. Jean-Eric Drouaix, reported to be an active "Yellow Jacket" movement leader, had been vocal about SNCF refusal to pay train tickets for the activists as well as upcoming job loss due to autonomous trains being tested. Drouaix had recently been arrested and released following a group fight with journalists in Rouen. EDF and RTE released no further details Friday night. No comments yet either from authorities as Elizabeth Borne, French Transport Minister and Guillaume Pepy, CEO of SNCF railway company are in a plane on their way to a conference in Qatar. For more from his Deputy Agnes Ogier, follow the exclusive interview by TF1 Julien Beaumont also on my TF1.fr, @TF1 Facebook Live and LCI."

Unfortunately, almost anyone can create and instantly spread this type of tragic news around the world. Is it fake or fact? The perceived veracity of a news item such as this is enhanced by local events such as the French "Yellow Jacket" movement's actions in early February 2019; frequent train service disruptions in France; transit employee suicides reported in France; previous strikes; and growing opposition to autonomous vehicles. When such a news item is detected, the CREOpoint system considers the following factors:

1. Location in question (Paris, France): For example, a local authority, e.g., a Public Information Officer with the Police or Fire Department previously quoted as well as reported eye-witnesses would be added to the expert list since the CREOpoint system would closely track their reported reactions. They are likely to be one of the first quoted in a rebuttal article, but not necessarily (see SNCF-funded Navy a shuttle "crash" www.digitaltrends.com/cars/self-driving-bus-crash-vegas-account).

2. Narrower topics relevant in this example and that could have been pre-identified ahead of time, especially if a major transportation company had previously engaged an entity using the CREOpoint system. In this example, topics would have pre-identified with such terms as French "Yellow Jackets", SNCF employee suicides, French Transport Industry VIPs, activism against autonomous vehicles, fires at critical sites, and disruptions of train stations. The CREOpoint system described herein would have pre-identified reporters who covered major events such as prominent TV anchorman Julien Beaumont of TF1; Les Echos Lionel Steinman who routinely covers SNCF, and William Audureau who covers fake news about the "Gilets Jaunes" at the French daily "Le Monde." The time savings resulting from pre-identification would be crucial since the CREOpoint system would immediately monitor and take into account whether they retweeted the story or warned their readers about the possibility that the news item could be fake news.

3. Relationship to the companies in question (SNCF, Keolis, Mairie de Lyon, Ministere de l'Interieur etc.,).

4. Type of fake news: Misleading news not based on facts, fabricated to be intentionally deceptive, deepfake, fabricated picture, PR stunt, hoax, satire or parody, sloppy agenda-driven reporting, misleading news without context, origin of the fake news (e.g., local activists, Russia), financial scandal, sexual harassment, etc. The CREOpoint system indirectly provides readily available fake news detection and debunking tools thanks to and experts who are well informed and routinely and quickly fact check various types of fake news. For example, local French experts evaluating French fake news (e.g., "Les Décodeurs" from "Le Monde", CheckNews from "Liberation", CrossCheck from First-Draft) would have a higher weight in the overall scoring mechanism than a predetermined expert further from the incident/county.

It is anticipated that, as anticipated also by the former Chief Technologist at the University of Michigan's Center for Social Media Responsibility, the CREOpoint proprietary database of screened experts could also be made available (for a fee or not depending on situations) to an organization helping reporters and others looking to improve their work and sources they quote as they respond to breaking news. https://www/buzzfeednews.com/article/charliewarzel/the-terrifying-future-of-fake-news#.rxR63Kb8BZ Feature 4: Developing Mechanisms to Incentivize these Experts to be Active in Near Real-Time when Consulted In the CREOpoint system described herein, the short-listed experts would:

1. Be contacted early in the process to establish a personal contact, possibly by mail, e-mail (which helps verify the address), text, secure encrypted apps such as WhatsApp, phone or sometimes face to face. Studies have shown that invitation letters by e-mail with links to the poll tend to have lower response rates compared to an invitation sent out before the actual poll is carried out (Andrews 2003; Cook 2000).

2. Understand the program's aims and rationale and communicate to the experts that they would be among the few asked to answer a simple question about the veracity of a breaking news story relevant to their expertise or an important organization in their sector.

3. Be asked how they prefer to be contacted by CREOpoint (email, Messenger, Slack, WhatsApp, Twitter Direct Messaging . . . ) and possibly by other experts.

4. Receive a simple, single and focused sample question so they can immediately see what would be expected of them, including the ability to respond on the go from their mobile phone.

5. Have the opportunity to access FAQs (Frequently Asked Questions) and ask follow-up questions if needed.

6. Understand that communications will be via secured communications (and that they will be reminded by a call if their response/participation is delayed).

7. Ensure that their privacy can be protected. Although false identities will not be allowed, to ensure anonymity if required, an address register replaces e-mail addresses by identification numbers, available only to a single administrator.

8. Receive drill notifications when relevant so the experts recognize that the system inquiry is not spam.

9. Not be surprised with new frameworks, definitions, formats, survey questions, or anything new without a proper well-explained business reason.

10. Have assurance that their contact or personal information will not be resold or shared with any other parties or entities without their express permission.

Since the credibility of the CREOpoint system is likely to be criticized on whatever criteria, scores and experts are chosen, few details are made public. Instead, with their permission, few experts who provided the most robust rebuttals/testimonials are featured.

Experts would also benefit from unique advantages including:

1. Unique content such as fake news in their sector provided 24/7 thanks to the predefined Intelligence Channel and/or Knowledge Board (e.g., monthly spreadsheet with curated intelligence news).

2. Being part of a partial list of influencers CREOpoint and/or a media partner would publish with comments about fake news in the industry like what BuzzFeed did for 2016-2018 but with more focus on corporates and impactful fake news that hurt a company's equity valuation.

3. When the experts provide a response (percentage probability news is fake+supporting comment), the experts receive early and more detailed access to the CREOscore and real time commentary from other experts (assuming they have signed a NDA and will not release early incomplete and unvetted information).

4. Experts will be provided the opportunity to use the data and the research when the study is finished.

5. CREOpoint will seek alliances with trusted institutions and other organizations that may display the CREOScore and other deliverables.

6. Any compensation to the expert may be designated to a charity most relevant to the expert or victims involved in a crisis news event.

Experts may also be ranked in a leaderboard and advanced on the leaderboard as they get closer to and on the right side of the final CREO Veracity Rating (e.g., 14% true per consensus of experts), and then to the truth or reality (100% true after fact checking). These rankings based on corresponding trust-driven CREOpoints may be accompanied by unique badges that could be shared on social media for even more recognition and transparency.

An example of how the CREOExpert scoring system works is as follows. When a news item is determined to be suitable for rating the veracity of the story, the CREOpoint experts are polled. When poll results are finally compiled, out of 100 experts surveyed, 30 experts have responded and therefore they are credited with CREOpoints with the pie distributed based on some pro rata distance (positive or negative) to average veracity score (say consensus is 86% fake). People who responded the furthest ("Absolutely no way this is fake") would see their CREOExpert Trust rating penalized the most since their opinion was wrong. The experts who responded 100, the furthest positive distance to 86 would be given a higher rating than the expert who responded 86. Some who consistently have a bias (e.g., anti AI, anti-technology) could see their rating refined based on the relative accuracy of their predictions. Eventually the veracity of the news item is resolved, and it is either fake or factual, or grey somewhere in between, and the CREOpoint system automatically adjusts the CREOExpert Trust Ratings.

It is noted that since reliability is one factor in CREOpoint expert trust rating, in this example, some of the 70 non-responders scores would decline if they could have physically responded but, in this instance, they did not respond to the CREOpoint poll.

As blockchain applications mature in the marketplace, the CREOpoint system may use a distributed, shared and secure ledger to enable transparency and trust in the polling and commentary process. To provide opinion traceability, each step of the polling process is registered and tracked on the blockchain. Each of the expert's votes, and any additional individuals identified by the CREOpoint system as eyewitnesses or indicating significant objective knowledge of the situation will have a unique digital token, enabling the CREOpoint system to verify every step of the distribution of potentially fake news items to the expert group, the subsequent vote by each expert, and any commentary provided. The ledger will provide a digital history of this information including data on location, source, content, timestamps, origin and path of messaging, expert opinions, scores, rankings and how the CREOScores were derived, all of which is presented and available to users via an interface they can access through Quick Response (QR) codes, Near Field Communication-enabled (NFC) labels, or location-based services, among others. A blockchain may also be applied to protect the original opinion, votes and comments from validated sources from "invisible" tampering, hacking, or cheating, including voting by non-experts posing as experts.

Expert compensation may also be accomplished using smart contracts leveraging cryptocurrency or altcoin platforms such as Etherium, Litecoin, Bitcoin, and other global payment networks employing digital currency and/or blockchain technology. Among other benefits, this would:

1) Help allocate the compensation of experts based on how good their predictions are;

2) Make the register including the expert scores, ranking and how we got there not cheatable/hackable;

3) Enable the experts to be compensated on a timely basis; and

4) Decentralize or diversify trust and allow CREOpoint to not be central point.

Oracles, in the context of blockchains and smart contracts, are agents that find and verify real-world actions and occurrences and submit this information to a blockchain to be used by smart contracts. Smart contracts only unlock value if certain predefined conditions are met. Within the CREOpoint system, oracles may be deployed to ensure the satisfaction of the terms of the smart contracts Feature 5: Preparing to Quickly Identify Potentially Fake News As noted above, the CREOpoint system extracts keywords and develops a search query such as ("self-driving OR autonomous OR AV) AND (Tesla OR Uber Lyft OR Cruise OR Ford OR NAVYA OR Car etc.) AND (crash OR hit OR struck OR victim OR injured OR killed OR fatality OR Accident) for a topic of interest. Relevant hashtags may be identified and used to develop an intelligence channel relevant to the topic using the techniques described above. One of the Channel Interface settings may allow the display of all news from traditional and social media sources (called Setting T All). On the other hand, predetermined short listed experts would be expected to be notified early and serve as potential early identifiers of fake news about a topic within their area of expertise. One setting would display only posts from these experts (call Setting T Ex).

Since fake news is often likely to be published in known fake news sources such as "SpicyAmericaNewz.Ru" and other sources/super spreaders and bots who have been known to frequently post and amplify fake news previously, the Channel T may be constrained to these Fake News Sources rather than All Sources.

The CREOpoint system may also further leverage the Interface Capability described above to adapt a toggle so that a user could conveniently switch between All Sources or only the most influential and relevant ones. Among others, the adaptable interface may be adapted so that a user could conveniently toggle between All Sources to Only Fake News Sources (called Channel TFN, or to an XFN channel displaying all sources except those likely to contain disinformation.

It is noted that the Channel TFN may at times include some limited content from a few previously unknown fake news sources. This is due to constantly new fake news sources as well as "domain cycling" where bad actors launch sites with one or more fake stories and then quickly shift to new domain names once the story has been flagged by fact-checkers and/or blacklisted by Facebook or other platforms.

To quickly develop coordinated countermeasures, CREOpoint will work closely in partnerships between social media platforms who, among others, have expert investigators manually searching for sophisticated bad actor networks, fact checkers, academic researchers (e.g., ASU), foundations and software companies (e.g., MetaCert). Fake news sources can be identified and aggregated from such sites as:

http://blogtrackers.fulton.asu.edu:3000/#/dashboard
http://www.opensources.co
https://en.wikipedia.org/wiki/List_of_fake_news_websites
https://en.wikipedia.org/wiki/Wikipedia:Reliable_sources/Perennial_sources
https://www.factcheck.org/2017/07/websites-post-fake-satirical-stories/
https://mediabiasfactcheck.com/appsextensions/#gsc.tab=
Hoaxy project
List by Grinberg et al. (2018, 490 sites)
PolitiFact's guide to fake news websites and what they peddle (Gillin 2017, 325 sites)
Snopes
BuzzFeed on fake news (e.g., Silverman 2016; Silverman et al. 2017a; Silverman et al. 2017b; 223 sites+over 10,000 news items December 2018)
An academic paper by Guess et al. (2018, 92 sites)
FactCheck's article titled "Websites that post fake and satirical stories" (Schaedel 2017, 61 sites)
Lists assembled by blogger Brayton (2016)
Media studies scholar Zimdars (2016)

It is noted that the MetaCert Protocol already detects fake news by checking domains, websites, and news sources against the world's largest network of fact-checking databases. The classification of each news source is verified by fact-checking organizations and stored in the MetaCert Protocol registry to provide unbiased, democratically assessed information on the integrity of each website and news source. The CREOpoint system described herein may aggregate signals indicating possible fake news sources to add to the above list.

In addition, to complete the list of fake news sources, signals such as from "The Manipulation of Social Media Metadata Data & Society" (Data & Society, November 2018) indicate that often fake news sources can be flagged given their "Double consonants, default avatars, random numbers, Screen name different from user name, Name contains the words "Official" or "Real", recent account creation followed by large numbers of suspicious accounts, nonsense comments from followers, sudden growth in followers or following, replies are automated messages, reshares, lack of transparency about the account, previous dormancy followed by sudden reactivation, use of similar hashtags or links, or responses with links etc.

The CREOpoint system may also explore the most "engaged" content relative to a given topic or domain (Facebook, Twitter and/or tools such as Buzzsomo, get.trendolizer.com, or CrowdTangle—now owned by Facebook). A custom notification (text, slack alert) may be programmed if the online reactions is at levels X times above the average reactions expected.

It is also noted that, given anti-big business movements, extremists and toxic business models of engagement on social networks, fake news centering on a well-known multinational corporation spreads quickly and an unusual amount of negative online buzz is created, threatening the reputation of the company and their brands. Partnerships also may be developed with social networks such as Facebook, Instagram, WhatsApp, Twitter, YouTube, Snapchat, Reddit, LinkedIn, Tencent's Qzone, and Sina Weibo to surface specific news relevant to a corporate client and their major brands. Social networks, corporations, and brands have a major stake in attenuating fake news.

International Fact-Checking Networks provide a place for collaboration between fact checkers worldwide. Potential fake news stories are flagged by social and traditional media readers and reviewed by Fact Checkers in key countries, sometimes as a service to Social Networks. The CREOpoint system may access this early data from fact-checkers who may also identify stories to review on their own.

The CREOpoint system may also use the blockchain to track users who first reported to CREOpoint a breaking story relevant to a client or topic covered by the CREOpoint system. A bounty system, similar to what's now used to report bugs, may be implemented. For example, to mark a post as a possible false news a user may share on Twitter the post #CREOFakeNews and that would be a signal to start analyzing it and possibly rewarding the user given the corresponding time stamp.

The impacted party may confirm an attack by fake news such as "Carnival cruise ship overturned off the coast of Mexico Nov. 5, 2018 resulting in 32 deaths (https://archive.fo/MRAIv). The issue is then acknowledged at least internally and with technical advisors with expertise in such disciplines as public relations, public affairs, government relations, and external communications. The CREOpoint system and human intelligence would be applied to determine if this were a situation where the CREOpoint experts should be polled to help determine the veracity of the story in the near-term.

Feature 6: Deciding how Beneficial Activating the CREOpoint System could be as Soon as the Problem News is Identified A decision matrix may be used to score how valuable the CREOpoint system is based on:
  1. The nature of crisis (see examples I-III below);
  2. Whether initiated by a usually reliable source or via a known fake news source that will not be taken seriously;

3. Whether the crisis has been identified as a possible event in advance with the subject or entity where the CREOpoint system is being applied;
4. Whether a relevant population of experts has been identified in advance;
5. How likely a new population of credible independent experts more likely to have specific insights could be quickly identified to complement the predetermined expert list;
6. The likelihood, speed and quantity of proper responses by a panel of experts compared to credible journalists or other experts in the field;
7. Deciding if a proper and useful poll question can be crafted. Say the news item is a report that a corporate executive assaulted 12 women, but the truth is 5 only and 6 cannot be proven. Fake or fact? The CREOpoint system may activate the team survey professional to carefully craft the question such as "What's the probability of veracity of this breaking news that the corporate executive is a sexual predator (with definition)?"

For illustration, three different types of crises can be distinguished, assuming the news is not fake.

I. Accidental Crisis (Technical Disruption)

1. Rumor of crash or industrial accident

Small scale: This is likely the most suitable assuming a small scale; for example, the capability of an autonomous vehicle fatality, since the stakes are high. The industry requires public trust and transport & travel companies almost always put safety first.

Medium scale: A train accident such as https://www.e-cowatch.com/train-derailment-iowa-river-2581127525.html would be quickly covered by local TV if not fake. Live coverage, on the scene, would tend to confirm the facts of the event and subsequent reports. The CREOpoint system may be helpful if it is difficult for camera crews to access the site (e.g., a ship sinking in a remote area).

Large scale: In a tragedy such as the World Trade Center attack or Fukashima breaking story, the CREOpoint system has little application since TV footage would go on all TV Channels almost immediately.

2. Product recalls—There are always opposing viewpoints and arguments, e.g. in J&J's talcum powder litigation, there are big gaps between the company and the litigators, and various interests and opinions of the public.

3. Threat of additional litigation

II. Preventable Crisis (Human Failure, Sometimes Self-Inflicted)

1. Financial scandal—Such as fake news about Vinci shared by

Bloomberg News that resulted in an 18% decline in Vinci's market value before the company's denial. The advantage is that the CREOpoint system could be integrated into broader systems from Big 4 risk mitigation firms and Financial Communications crisis-focused firms. The CREOpoint system described herein could also be used to detect stock price manipulation or assist in hostile takeover situations. For example, small biotech firms are often subjected to rumors or disinformation concerning the results of drug trials or patient reactions, for the purpose of manipulating stock prices.

2. Sexual harassment or serious abuse by a top executive—For example, for claims and accusations tagged as #me too (real and fake) some cases took place for many years before becoming public, even though people with insider knowledge had reasons to be aware. The veracity of some crisis news items may not be resolved quickly (e.g., sexual harassment, oceans rising due to climate change), so the CREOpoint system focuses on use cases where the response to a fake news story could have a high impact within minutes or hours.

3. Brand safety and celebrity reputation—Beyond fake products and fake news about brands and stars, there is a growing industry of "influencers" (including some with fake followers) who push brand products. Brands, their contracted ambassador stars, mega YouTubers and Instagrammers, or even rogue micro influencers could directly or indirectly pay for the CREOpoint system. For example, Chanel and Burberry fired brand ambassador Kate Moss over cocaine allegations. Tiger Woods lost his Accenture sponsorship due to extramarital affairs, with investors in the three sports-related companies (Nike, Gatorade, and Tiger Woods PGA Tour Golf) faring the worst, a 2009 UC Davis found. They experienced a 4.3% scandal-generated drop in stock value, equivalent to about $6 billion. Fast forwarding to a recent situation one can imagine a situation where a cannabis brand whose $5 Mn Super Bowl TV ad was rejected by CBS would re-allocate its advertising budget to social media micro-influencers promoting its retail outlets. Would established brands like Philip Morris or Unilever want to be unwittingly caught up in fake news spambot warfare about the danger of medical cannabis? In the above high stakes situations, CREOpoint experts would know or could contact their sources, just as detectives and journalists might do. In the case of deepfakes doctored videos or "virtual influencers" like Dior's doll-like CGI influencer Noonoouri going rogue and sharing damaging fake LVMH news, analyzing social media signals supplemented by a CREOpoint network of polled experts is likely to provide faster better technical judgements. Meanwhile, with spambots, the cost of the false positive rate with artificial intelligence is high (e.g., making a mistake in mistakenly blocking regular accounts is not acceptable even if 1% of hundreds of millions of users).

4. Executive rumor involving sensitive matters

For example, executives being accused of compromising situations leading to divorce of a billionaire e-commerce CEO and spouse; a serial tech entrepreneur accused of smoking pot or rumored to be quitting, or an executive being arrested in a foreign country.

5. High profile closures and redundancies
6. Regulatory or media investigations
7. Allegations from political leaders—This use case is unlikely to be used immediately. Political experts often cherry pick information favorable to their position or point of view. Also, note expert predictions in this field are often wrong (starting with https://www.newyorker.com/magazine/2005/12/05/everybodys-an-expert)
8. Company contributes to a cause that does not align with company's core values—probably not something experts would definitely know/can opine about, and therefore this use case is a lower priority use case.

III. Victim Crisis

1. Major hacking and data breaches—easy to identify companies like Equifax and Marriott that would seek to stop the spread of fake news or further data breaches.
2. Malicious rumors like the death of a political or business leader or celebrity. Given the high stakes on commodity or security prices, it is possible to be asked to prepare a group of experts to be polled on Syria, oil, etc. and to rate Syrian President death rumors (https://mashable.com/2012/08/07twitter-rumor-oil-price/#0MLzDPMrO8qL) and similar news reports.

3. Activist attacks and accusations

4. Terrorism and major crimes—This is unlikely to be a practical use case since usually these events are very visible by design from terrorists. On large scale news reports, TV networks quickly go live with evidence.

Feature 7: Polling all Selected Experts in Near Real-Time to Quickly Develop a Veracity Score for the Breaking News Content In the always-on information overload mode of modern society, it does not help that some people tend to be time-starved, lazy, do not take time to apply critical thinking and/or, among others, suffer from confirmation bias (the headline supports the person's initial position) and sometimes delusionality, dogmatism, fundamentalism. Some people believe blatantly inaccurate news headlines such as "The Pope endorses Trump" because they have unfortunately already seen shared a number of times from their "friends" (Eli Pariser "Filter Bubble" 2011). The customizable intelligence channel described above provides NLP-powered ways to only display a news item headline once. This allows the CREOpoint system to not only deflate the devastating and polarizing filter bubble effect but also contributes to important health and wellness "Time Well Spent" initiatives.

The CREOpoint system described herein attenuates disinformation by seeking to stop the falsehood in its tracks with robust content including a warning. MIT's David Rand has also showed the benefits of carefully worded warnings ("The implied truth effect: Attaching warnings to a subset of fake news stories increases perceived accuracy of stories without warnings" 2017).

Among others, Facebook has been experimenting with various warnings and pop-ups such as "disputed" (Adam Mosseri, VP News Feed December 2016 and Tessa Lyons, Product Manager. December 2017). For example, affecting Google's Android, it took days to get to the facts and the "disputed" warning. On 26 Feb. 2017, the Seattle Tribune website published an article concerning President Donald Trump, reporting that his Android cell phone was believed to be the source of recent intelligence leaks from the White House. That article cited two non-existent "intelligence agencies," A.R.H. Intelligence and Z113 Security, as its primary source, and hijacked the social media hashtag #DitchTheDevice, which has been used to encourage cell phone users to spend more time away from their tech. On March 2, Snopes declared this as a bogus news story. On March 3 at 4:28 pm, Politifact labelled this as a false news story. Finally, using these two signals, Facebook added a "disputed" flag to the post.

Speed of response matters. Also due to sometimes deeply held user beliefs, Facebook found that showing "Related Articles" rather than "Disputed Flags" was found to help give people better context. "Related articles" is the foundation of the customizable intelligence channel described above as curating articles related to a topic, organization, personality or event is an important part of the customization of the intelligence channels. The CREOpoint system described herein refines a single and simple score in a user interface providing people justification not only for a strong warning if needed but only related input from vetted CREOpoint experts who did not fall for the fake news.

Since fake news may commonly mix true statements with falsehoods, rather than a binary value, the likelihood that the news is fake or fact is predicted (e.g. 86% likely accurate). A quick CREOpoint system poll of these trusted experts instantly refreshes a weighted CREOpoint Veracity Score that is posted on a pre-prepared and private dark site.

Figure 18:
FIG. 18 illustrates a sample poll for experts in sample embodiments.

Although the CREOpoint system may be used by clients, interested parties and survey experts may draft and evaluate the pros and cons of other questions to elicit ideal results. The expert panel would typically be asked to opine on a single and simple poll question as illustrated in FIG. 18, for example. A/B testing may be performed to optimize a question such as: "Please respond to the question below on a scale of 1 to 10, considering all you know right now, and the impact on your reputation: How likely are you to vouch for its veracity by recommending this breaking story to a colleague by sharing it as is?" This question grounds the CREOpoint system in the existing knowledge of NPS (net promoter score): https://en.wikipedia.org/wiki/Net_Promoter into a way to see how comfortable the experts are in recommending the news content.

In the interest of turnaround time and to maximize expert participation, automated phone surveys may be added as a systematic, lower cost and faster collection mechanism. Calls may be made automatically to the preset list of experts with the aim of collecting information and gain feedback via the telephone. Interactive voice response, or IVR, technology may be set up to automate telephone contact between humans and machines. Teleservice company call centers, market research, expert networks and other partners may also be used to warn experts that a written poll is going their way, or to follow up if they are not fast enough in responding to it.

CREOExperts would either be detractors, passive/neutral, or promoters (e.g., super sharers on social media):

1. Low (not at all likely to share)=Detractors: Experts who feel the news item is fake might even be active detractors by retweeting with a factual debunking comment (Marked as RED in interface);

2. Medium (neutral/undecided yet): People who are not sure whether fake or fact are unlikely to repost, given the risk of being wrong; and 3. High (extremely likely/sharers as is): Experts who feel it is valuable news will feel the urge to share it, possibly even with enthusiastic reinforcing comments.

The CREOVeracity Score of the news item being questioned may also be refined by offering a forum for experts who are confident in their disagreements. Responses may form a normal Gaussian distribution, looking like a bell-shaped curve, and it is possible that during a poll, values will follow a normal distribution with an equal number of measurements above and below the mean value. To improve the dynamic CREOVeracity Score, as a refinement to the initial answer, the CREOpoint system may ask experts who gave divergent opinions and answered high to the question "What level of confidence do you have in your answer? (Low Confidence to Near Certainty)" to try to convince either other one way or another in a dedicated forum.

Adequate time should be allowed so the experts can form an informed opinion but not too long to avoid their consensus being obsolete when it becomes public because other sources have proven the news fake or fact. Experts have some time to think about the breaking news, see who is saying what on the provided CREOpoint Intelligence Channels, Twitter, call their sources, etc. To prevent a herd mentality, they would not have access to the dynamic score until after they have opined (similar to Airbnb reviews). A certain statistically-valid critical mass of expert responses needs to be reached before the results are deemed usable.

To complete the list of sources to be considered for addition, the CREOpoint system may also ask the experts which other priority sources should also be monitored.

Also, to improve the dynamic CREOScore, as a refinement to the scaling system applied by the experts, the CREOpoint system may be refined into a predictive market system. Predictive markets are collections of people speculating on future events or outcomes. Prediction markets essentially are event derivatives, where the value of the derivative will in most cases reflect the probability of an outcome actually occurring. The technology to implement a prediction market is under development by: Augur, an open-source, decentralized, peer-to-peer oracle and prediction market platform; and Gnosis, a prediction market platform. Both platforms are built on the Ethereum blockchain.

It is anticipated that CREOpoint system may accommodate clients or licensees requiring technical and UX adaptation of the timing, ratings or others to align with their brands (e.g., CBS may require the best expert judgement available after "60 Minutes" and Amazon may prefer to display expert ratings in a format similar to their 1-5-star customer reviews). Optimization models for the question, polling protocol, modeling, notifications, workflows, forum and real time conference coordination will be refined thanks to drills and real KPIs from fake news in a safe client drill area. This would also allow advocates who could also be pre-identified and tracked over time before they might be helped to augment the message more authentically. The resulting CREOscore could be a number between 1-100 or a number of stars (e.g., 1 to 5 stars).

Feature 8: Adding Other Veracity Signals from the Behavior of Experts and Crowds Sourcing Other Trusted Sources Sharing or not Sharing the Breaking News on Social Media Social Media Signal Analysis Tracking what CREO point experts and trusted media sources (e.g., see earlier list including AP, Reuters and Bloomberg) post or repost will allow the CREOpoint system to provide an indication, leaning towards fake or fact, that is helpful to rate the veracity of the news content. The CREOpoint system may then analyze the text of retweets, Facebook posts or other messages from detractors (still from this expert group, not from laypeople) who post comments like "I can't believe this! #fakenews", or similar to John McEnroe famous "You cannot be serious." That rebuttal would be computed as a negative in the calculation of the news item veracity score. For example, Cedric Ingrand from reputable LCI French TV debunked the Promobot PR stunt at CES as fake news.

The CREOpoint system also monitors key sources who take their comments down. For example, when controversial meal replacement drink company Soylent claimed "Furloughed Federal Workers Surviving on Soylent" reporters from BuzzFeed and Gimiodo did not accept its validity. Note how their tweets referenced in this article https://www.eater.com/2019/1/22/18192875/soylent-furloughed-federal-employees-government-shutdown have now been removed. The CREOpoint system may count these as a signal of fake news.

New Sources

After confirming the high relevance and influence of a commentating source, the CREOpoint system may add the commentator to the trusted media source list and count the commentator's insight. These types of new sources are tagged in the CREOpoint database with classifiers such as activists, fans, persuaders, clarifiers, spreaders as is, or debunkers identified post incident.

To identify people who could help identify and/or debunk fake news, the CREOpoint system may also use NLP to create a corpus by analyzing what words and hashtags are used by the first people debunking fake news such as in the BuzzFeed of 10,000 fake news and hoaxes (e.g., and would include words like fake, false, hoax, misinformation, disinformation, lie, debunk, correction, no basis in fact, lie, said no, no fact at all, chain mail, fallacious, bullshit, BS, etc.)."

For benchmarking purposes and to measure the effectiveness of the CREOpoint system, the ratio of the rumor posts divided by the news items and one of the keywords would be measured. The lower the ratio, the more effective the performance of the CREOpoint system.

The sources to be added to CREOpoint monitoring would be identified from the initial list of experts and trusted media sources who they recommended as other potentially useful sources to be considered for inclusion in the database and short listing. This information may be added to the CREOpoint system to complement the database by short listing these possibly useful sources based on metrics such as influence and relevance.

New Intelligence Channel Searching for the News Item Being Questioned

As noted above, the CREOpoint system also may develop a customizable intelligence channel using the search query including the news item being questioned. For example, thanks to a query checking on the early February 2019 fake news about the death of a European movie star: "Gerard Jugnot" AND "mort") followed by AND NOT (hoax OR canular OR "fake news" OR lie OR debunk etc. based on the ontology described earlier), the CREOpoint system would identify many people including traditional media reporters on social media who doubt the veracity of this statement. The CREOpoint system also may be supplemented by a human curator (to avoid false positives due to sarcasm) who would add evidence, counter-evidence, and record all sources in an online spreadsheet or database. Sources who are consistently found to report fake news may be considered for addition to the CREOpoint list.

Enriched Database of Reposts and Commentaries

Any high-value relevant content may be curated in a proprietary online library to create an enriched database of reposts and commentaries. Relevant reposts (e.g., "this is fake and here's why") would be saved by offering the CREOpoint system user the ability to simply click on a browser extension that enable the post to be tagged in one of the above categories (e.g., super spreader as is, debunker) and saved. Users are also allowed to enrich posts on the fly using notes and highlights.

The CREOpoint system may allow enriched posts to be shared through:

A comprehensive online spreadsheet (including columns such as post headline, date, URL, # of engagements to date, source, influence and relevance of the source, CREOpoint Trust Rating if the source is an expert in the database, type of sources, team highlights, # of posts supporting and debunking the claim, team comment, recommended actions, etc.);

Dedicated emails to an internal team member;

Newsletters (e.g., integrating with Mailchimp or similar, for internal and/or external purpose for example automated transmittal of top debunking tweets from other reporters going to other reporters);

Twitter direct message;

Slack; and

Dedicated "Creme de la creme" CREOpoint Intelligence channels (or separate interface toggle setting in the user interface) with just the best content post AI+human curation (possibly from a team).

Visualization

The CREOpoint system may further leverage a tool such as Table 2 Net (from leading French University Sciences Po MediaLab) to extract a scientometrics network. The scientometrics network could then be visualized with a tool like Gephi (https://medialab.sciencespo.fr/blog/how-to-extract-and-visualize-a-scientometrics-network).

Feature 9: Alerting Influencers and the Public about the Low Veracity of the News Content and Reducing the Spread of the Fake News As part of risk management and mitigation plans, the CREOpoint system may use a hybrid human+AI designed for a worst-case scenario with "weakest links in the chain" in mind:

Support staff available on call 24/7 in regional centers in the Americas, Europe and AsiaPac, including Account Executives, Project Managers as well as trained CREOpoint Curators and quick access fact checkers in key languages;
   Multiple accessible interfaces and visible spokespeople for the client organization and their advisors;
   A capability developed to contact and poll key stakeholders quickly and directly;
   Possibly working with industry organizations with capability to back the messaging; and
   Other technology companies, researchers, academics, law enforcement, regulators, election commissions, and civil society groups.

Knowing in advance the countries that will be the theater of the fake news is important for preparation and a quick reaction. Some countries and upcoming events can be anticipated as a future hotbed of fake news and attacks at scale from ideologically-motivated networks of anonymous trolls (e.g., the spotlight on Qatar and the 2022 World Cup). Others will be more important to a client than others due to the location of their people, operations, customers, and supply chains.

In other countries outside the United States, like places such as Brazil where internet access is very expensive, fake news can have a significant impact depending on the economic stakes, e.g., Net Neutrality debates focusing on the impact of price discrimination. Zero Rating models (free internet access under certain conditions) are mainly implemented on mobile networks and are based on subsidizing a limited set of sponsored applications, whose data consumption is not counted against the users' data allowance (often in exchange for user data and low quality/fake news).

The immediate objective of the CREOpoint system is to contain the infectious agent locally if possible. To do so, the CREOpoint system may purchase the most relevant keywords in advance for Google adwords, organize Facebook and Twitter campaigns, prepopulated with major cities where key journalists are based (New York, Washington D.C., San Francisco, London, Paris, etc.). The campaign may be adapted by adding several keywords and locations even more directly relevant to the breaking news story. For example, in the case of the Russian PR stunt damaging to Tesla at CES, Las Vegas would be added so anyone in the area checking on early rumors would be directed to the dedicated webpage. The proprietor of the CREOpoint system may also coordinate with a corporate client for other types of counter-messaging and counter-narrative communications and advertising should the crisis and crisis avoidance requirements be very serious.

The CREOpoint system may also produce and offer access to more positive and loud messages to overcompensate and attenuate the negatives of fake news sources by, for example, featuring anew page called a CREOboard explaining:

Upcoming CREOscore;
   Expert comments; and
   Meanwhile informing people by disclosing the top 5 worst fake news about that industry sector.

This CREOboard may have its own identify/URL such as CREOpoint.com/CESRussianRobotTesla.

Fact checkers may be helped by being provided with relevant Intelligence Channels to help filter out the problematic noise (duplicates, false positives, low value sources) inherent in news reports, enabling the fact checkers to improve productivity and turnaround time.

To prevent spread to local and regional super spreaders (network influencers spreading ideas, information), nano influencers and influencers, the CREOpoint system proprietor or licensee may make contacts in local and regional expert and influencer communities and develop such relationships before they are needed. A predetermined database of local and regional influencers and experts (as well as other people they recommend) may also be cross-referenced with the list of people on site (available from a conference attendee list, self-check ins on Twitter, etc.) and add key local reporters and regional press focused on the event (e.g., CES) press list (they would be the most likely to care and have good local sources that could help). The key possible fake news spreaders closest to the incident would receive a short message adapted from a template, such as "(First name) did you see (add link)?! I know you think twice about sharing this type of video" (message to be A/B tested).

Proven solutions to push voice, text/SMS, and email notifications may be integrated with the CREOpoint system. This allows the next focus to quickly be on a wider influencer network, including key in-country influencers who may be provided early and exclusive approved quotes from CREOExperts.

The CREOboard may be strategically shared with a select group of highly connected influencers who typically act as firewalls to fake news and more authentically spread the CREOpoint-provided expert content. Given that these "in the know" influencers may have previously visited a CREOpoint website such as a CREOboard, the CREOpoint system may trigger retargeting, the process of following or tracking website visitors online after they have left a website. When a person visits a CREOboard, the browser drops a cookie (a piece of data that embeds itself in the browser of the user, enabling tracking of the websites they visit). The cookie then implements the retargeting strategy by placing CREOpoint ads on other sites that the user is visiting, enticing them to click through and return to the CREOboard. These ads are only targeted at users who have previously visited a CREOpoint site (i.e. shown interest in a previous CREOboard) but have not yet completed a call to action such as Share a Fake News Warning. This is why it is called 'retargeting'—the website is targeting prior visitors again. The CREOpoint system also may shortlist this select group based on their influence, relevance and popularity and other criteria relating to authentically communicating the truth. Metrics that may populate the algorithm may further include # uniques on TV in the last 12 months, number of followers on LinkedIn, Twitter, YouTube, Facebook, Instagram and others.

The overall CREOpoint system is designed to attenuate the amplification of harmful content from specific relevant actors from the ultra-densely connected core of heavily followed accounts that repeatedly link to fake or conspiracy news sites, knowing that "80% of the ones active in 2016 are still active as of the October 2018 writing of "Seven ways misinformation spread during the 2016 election" George Washington University and Graphika for the Knight Foundation.

After an outbreak of fake news to some users in countries beyond the country of incident, the contamination may begin to spread internationally (e.g., from the Western United States CES Jan. 6, 2019 evening to the UK when people wake up in the morning of Jan. 7, 2019 to the Daily Mail story). The objective is to contain fake news in key countries, regions, cities by engaging with key stakeholders and possibly government authorities in these key areas. The time would then come to provide a tool to people wherever they get their news, including in their email as well as on social network (e.g., Facebook, Twitter) or Apps (e.g., Google News, Apple News, BBC News, Flipboard, Feedly, Reddit, SmartNews, News Break or others including CREOpoint apps—HTML5newsfeeds powering intelligence channels about various topics, brands, personalities and events.

A mobile application may be used to share CREOpoint Veracity Scores for news items directly on user's phones. For example, news items that have been identified as possible fake news, and subjected to CREOpoint expert polling and scoring, may be flagged with a CREOpoint Veracity Score and a link to the page describing the basis for the score and explaining why caution is required.

The fake news should not only be constrained to key in country influencers, but they should be engaged to stop spreading fake news. To address this issue, CREOexperts may be engaged to gather some early quotes that could be shared with key influencers. The experts would focus on a wider influencer network, including key in country influencers. The CREOpoint page would be shared with highly connected and smart people who typically act as firewalls to fake news and spread the CREO truth. The CREOpoint system would look at influence, relevance and popularity. Although it does not increase the professionalism criteria, it would be better if experts can also leverage their social influence to authentically communicate the truth. Metrics that would populate the expert rating algorithm would further include:

uniques on TV in the last 12 months
# of followers on LinkedIn
# of followers on Twitter
# of followers on Facebook
# of followers on Instagram Emails may go out to pre-rented mailing lists with a message like "Tell your friends about this fake news: Hit reply to this email, add three friends to the CC line, and write a line or two of background if you'd like. People may also be directed to copy the hyperlink to the CREOBoard to his or her clipboard and be prompted to click on a provided hyperlink to a CREOpoint system generated search query on Facebook (e.g. https://www.facebook.com/search/top/?q=Carnival%20cruise%20%20sinks.&epa=SEARCH_BOX), Twitter (https://twitter.com/search?f=tweets&q=Carnival%20cruise%20ship%20sinks&src=typd), Google, etc. The user may be allowed to conveniently add the CREOpoint hyperlink in the Facebook comments or retweet of friends or others sharing the news. This would provide for the warning and supporting content to be shared in friend's news feeds.

As and when necessary, a pre-populated press release may be adapted and sent. Such a press release may include:
  The breaking "news"
  Corresponding veracity metrics and warnings
  Denial from the affected CREOpoint client company
  More authentic quotes from a couple CREOExperts
  Quote from a local witness if available
  Quote from a relevant influencer
  Supportive audio video All these steps would be tested in crisis simulations (e.g., fire drills) where company personnel and crisis/PR firms could improve their response to a fake news situation.

Feature 10: Monitoring the Impact of the CREOpoint System and Iterating to Refine The CREOpoint system provides a countermeasure against smart and potentially well-funded adversaries who are constantly adapting and changing their tactics. The CREOpoint system is continuously improved by developing metrics and benchmarks to improve its predictive and attenuation model and its impact, such as for example:

Independent surveys of the perceptions and behavior of users before and after seeing the CREOBoard;

Changes in the number of fake news items about a client, or a person, a subject or organization;

A change in the number of fake news items quickly reported;

A change in the time needed to verify a relevant fake news item;

Average time to "kill the fake news in the egg" from people dominating the topic before it resonates with influencers who propagate the message, possibly leading some traditional media to pick it up;

Independent surveys of CREOpoint experts;

Reliability of CREOpoint experts versus others quoted in the media;

Number of mentions for CREOscore;

Number of sources and social networks leveraging the CREOpoint system;

The number of propagators;

The number of Shares and Likes on social media;

Applying predictive market concepts to increase the engagement of experts and the accuracy of their predictions and polling;

Applying blockchain and smart contracts to the news item distribution, polling, communication and compensation process;

Impact on customer trust and sales volume, retention of clients or stock value;

Impacts on brand image, perception, and equity; and

How many influential nodes and information brokers are connected to various sets of networks (influencers are enormously powerful and may easily diffuse misinformation and disinformation with limited consequence to their reputation within a network). See as early as in 1992 with Burt, R. S. "Structural holes: the social structure of competition" Harvard University Press.

The CREOpoint system further envisions incorporating best practices in success measurements and constant improvements from research in social media, neurocognition and other fields including aircraft maintenance as well as fire and pandemics and other health risk propagation. Ideas to be evaluated include, for example:

"Inoculating the Public against Misinformation" (Dr. S. van der Linden et al Department of Psychology, University of Cambridge 2017);

If tech addiction and viral engagement around fake news are "the new cigarettes", warnings could be tested leveraging learnings from the tested mandatory warning "Smoking seriously harms you and others around you;"

Finding Outbreaks Faster National Institutes of Health 2017 April https://www.ncbi.nlm.nih.gov/pmc/articles/PMC5404242; and Providing a dashboard for say 30 companies in a Dow Jones Index rather than 30 counties in: http://emergency.vic.gov.au/prepare/#understanding-warnings (see other tabs).

While intelligence channels and uses thereof have been described in connection with the various embodiments of the various figures, it is to be understood that other similar embodiments may be used, or modifications and additions may be made to the described embodiments of an intelligence channel without deviating therefrom. For example, one skilled in the art will recognize that embodiments and application of an intelligence channel as described in the instant application may apply to any environment, whether wired or wireless, and may be applied to any number of such devices connected via a communications network and interacting across the network. Therefore, an intelligence channel as described herein should not be limited to any single embodiment, but rather should be construed in breadth and scope in accordance with the appended claims.

What is claimed is:

1. A computer-implemented method of rating the veracity of content distributed via digital communications sources, comprising:

creating an ontology and selecting keywords for a topic of the content;

creating a customizable intelligence channel for the topic of the content and extracting from the customizable intelligence channel a first list of potential experts on the topic of the content;

mining trusted media sources for the topic of the content to extract a second list of potential experts on the topic of the content;

providing the first and second lists of potential experts on the topic of the content to a database;

rating and ranking the potential experts based on a combination of factors selected from professionalism, reliability, proximity, experience, responsiveness, and lack of self-interest in the topic of the content to identify a short list of experts, wherein proximity is a measure of trustworthiness identifying a closeness in space, time, or relationship of the potential expert to the topic of the content;

providing the content to the short list of experts for evaluation;

polling the short list of experts about the veracity of the content to create a veracity score;

delivering the veracity score; and benchmarking the veracity scores to create a predictive fake news spread containment model and iterating to revise the model and overall performance of the model over time.

2. The method of claim 1, further comprising creating a third list of potential experts and any local witnesses on the topic of the content based on at least one of a relationship and a proximity of the potential experts to a breaking story on the topic of the content and providing the third list of potential experts to the database to complement the polling.

3. The method of claim 1, wherein delivering the veracity score comprises at least one of issuing a pre-populated press release, initiating a social media and press campaign including the veracity score and at least one of a warning and denial when the content is not completely true, issuing a quote from an expert from the short list of experts, issuing a quote from a local witness to the topic of the content, and issuing a quote from an influencer on the topic of the content and related reassuring metrics including information about trustworthiness of sources of the content.

4. The method of claim 1, wherein a fake news warning is presented with the veracity score and content along with insights and metrics relating to the content.

5. The method of claim 4, wherein the veracity score, content, fake news warning, insights and metrics relating to the content are delivered via an interactive interface enabling a user to select the types of sources by level of trust or proximity to the news content or user wherein the proximity of the type of source to the news content or user is a measure of trustworthiness identifying closeness in space, time, or relationship.

6. The method of claim 1, wherein providing the first and second list of potential experts on the topic of the content to a database includes predetermining a list of experts to crowdsource veracity signals for a given topic of content.

7. The method of claim 1, wherein mining trusted media sources for the topic of the content to extract a second list of potential experts on the topic of the content is performed upon the release of a news story.

8. The method of claim 1, further comprising incentivizing experts to be accurate and prompt when consulted by compensating experts based on how accurate and prompt the experts' predictions are and creating a decentralized register including expert trust ratings.

9. The method of claim 1, further comprising creating at least one customizable intelligence channel for the topic of the content relating to potential sources of fake news and the semantics of fake news content.

10. The method of claim 1, further comprising creating a decision matrix to evaluate a breaking news story to decide whether the news story is a candidate for determining a veracity rating based on at least one of the nature of the breaking news story, a source of the news story, and whether a relevant population of experts readily exists.

11. The method of claim 1, further comprising modifying the veracity score to reflect the behavior of additional experts and trusted sources in sharing and commenting upon a breaking news story.

* * * * *